United States Patent [19]
Takeuchi et al.

[11] Patent Number: 6,026,155
[45] Date of Patent: Feb. 15, 2000

[54] INCOMING CALL TRANSFER CONTROLLER AND INCOMING CALL TRANSFER CONTROL METHOD

[75] Inventors: Tatsuyuki Takeuchi; Masataka Mukaihara, both of Fukuoka, Japan

[73] Assignee: Fujitsu Limited, Kanagawa, Japan

[21] Appl. No.: 08/954,715

[22] Filed: Oct. 20, 1997

[30] Foreign Application Priority Data

Mar. 27, 1997 [JP] Japan ..................................... 9-076259

[51] Int. Cl.⁷ .................................................. H04M 3/42
[52] U.S. Cl. ........................... 379/211; 379/201; 379/212
[58] Field of Search ................................... 379/201, 211, 379/212, 242, 243, 244, 245, 246

[56] References Cited

U.S. PATENT DOCUMENTS

| | | | |
|---|---|---|---|
| 5,737,403 | 4/1998 | Zave | 379/211 |
| 5,768,348 | 6/1998 | Solomon et al. | 379/67 |

FOREIGN PATENT DOCUMENTS

| | | |
|---|---|---|
| 60-196055 | 10/1985 | Japan . |
| 4-237295 | 8/1992 | Japan . |
| 5-236129 | 9/1993 | Japan . |
| 6-276293 | 9/1994 | Japan . |
| 7-203039 | 8/1995 | Japan . |
| 7-221854 | 8/1995 | Japan . |

*Primary Examiner*—Scott Wolinsky
*Assistant Examiner*—David Huynh
*Attorney, Agent, or Firm*—Helfgott & Karas, P.C.

[57] ABSTRACT

There is disclosed an incoming call transfer controller for performing control so as to transfer a call incoming to a certain telephone terminal to another terminal. The incoming call transfer controller comprises an incoming call non-response transfer request detecting unit for detecting an incoming call non-response transfer request transmitted from the telephone terminal by a specified transfer operation performed on the former telephone terminal, a line number data creating unit for creating line number data regarding an incoming call to be transferred for each line number of the telephone terminal as a transfer control terminal on which the non-response transfer operation was performed, a transfer destination data creating unit for creating transfer destination data regarding the incoming call for each line number of the transfer control terminal and a transfer execution control unit for deciding a line number for the incoming call to be transferred and a transfer destination telephone terminal for a call incoming to the line number and transferring the incoming call to the transfer destination telephone terminal. Thus, a call incoming to the optional (alternatively, all) line number(s) of the telephone terminal capable of handling a plurality of line numbers can be transferred to a desired transfer destination telephone terminal.

30 Claims, 38 Drawing Sheets

FIG. 34
PRIOR ART
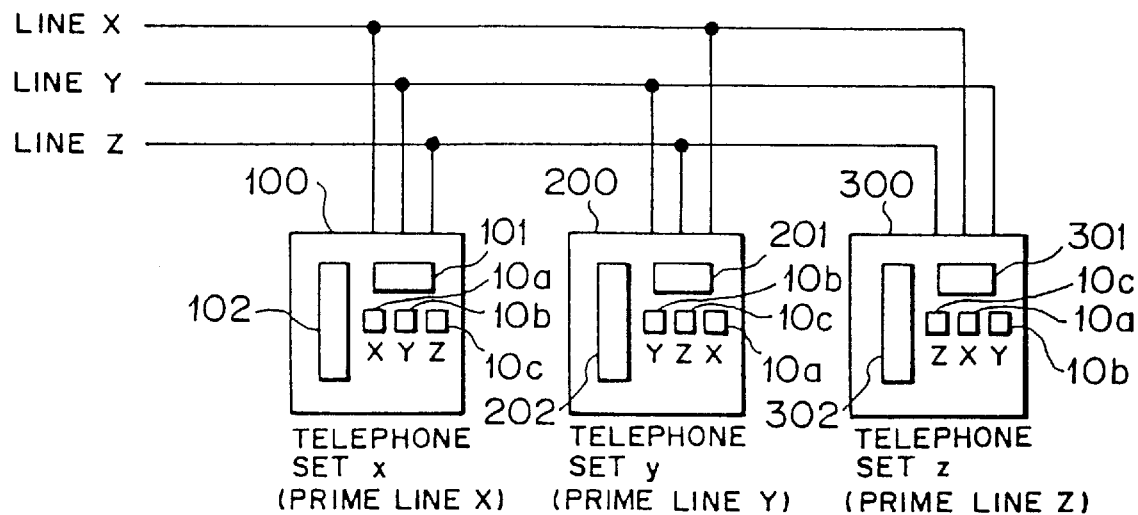
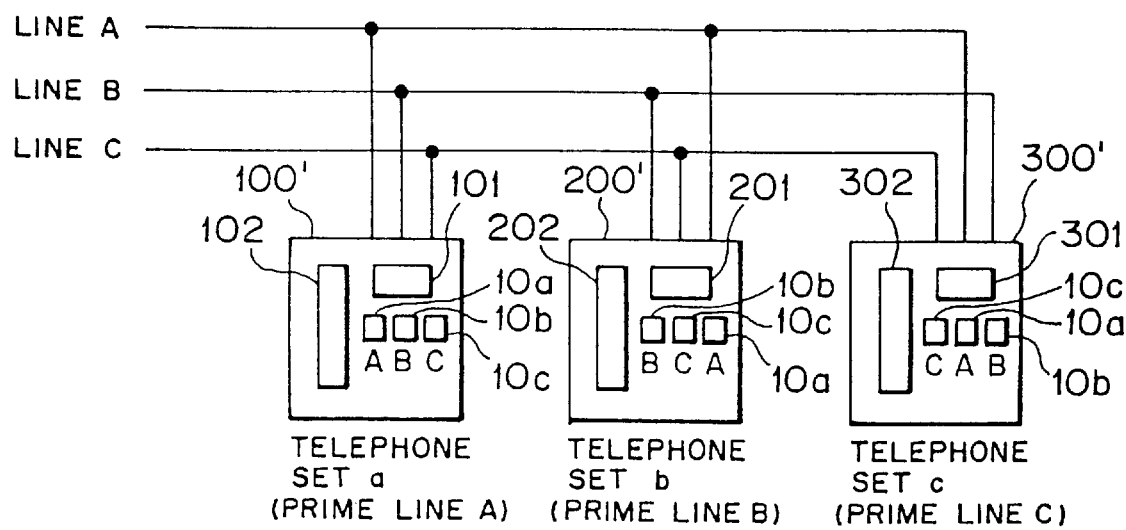

INCOMING CALL TRANSFER CONTROLLER AND INCOMING CALL TRANSFER CONTROL METHOD

BACKGROUND OF THE INVENTION (1) Field of the Invention

The present invention relates to an incoming call transfer controller and an incoming call transfer control method in a switching system which contains a telephone terminal capable of dealing with a plurality of lines (line numbers). The controller and the control method are provided for the purpose of performing control so as to transfer a call incoming to the telephone terminal which gives no response to the call to another telephone terminal.

(2) Description of the Related Art

In recent years, in a tele-marketing market or business receiving telephone calls including complaints from customers, and so on, there has been provided a function (switch box function for a multi-line operation) for enabling a receptionist (charge of reception) to respond to a call incoming to a multi-functional (line) telephone set and convey (transfer) the call to a person in charge according to the content of the call. This function can be realized by containing telephone sets (multi-line telephone sets) capable of dealing with a plurality of line numbers (telephone numbers) in various switching systems such as private branch exchanges and interfacing the switching systems with the multi-line telephone sets without using any special devices.

Accordingly, the multi-line telephone set is normally permitted to share the main line numbers of the other multi-functional telephone sets in addition to its own main line number (multi-line construction).

For example, referring to FIG. 32, there is shown a multi-line construction of multi-line telephone sets. If a switching system contains three multi-line telephone sets 100, 200 and 300 having prime line numbers (normally, the telephone numbers of telephone sets) X, Y and Z respectively as shown, the telephone set 100 can use the prime line numbers Y and Z of the other telephone sets 200 and 300 in addition to its own prime line number X. The telephone set 200 can use the prime line numbers X and Z of the other telephone sets 100 and 300 in addition to its own prime line number Y. Similarly, the telephone set 300 can use the prime line numbers X and Y of the other telephone sets 100 and 200 in addition to its own prime line number Z.

In other words, the telephone set 100 has slave telephone numbers Y and Z in addition to a master telephone number X. The telephone set 200 has slave telephone numbers X and Z in addition to a master telephone number Y. The telephone set 300 has slave telephone numbers X and Y in addition to a master telephone number Z.

In the telephone sets 100, 200 and 300 shown in FIG. 32, numerals 101, 201 and 301 respectively denote displaying units such as liquid crystal displays, numerals 102, 202 and 302 receivers respectively and numerals 10a, 10b and 10c display lamps respectively for informing users of calls incoming to corresponding telephone numbers or the ongoing use of line numbers (engaged in calling) by lighting or flushing on and off.

If a call comes into the user of the telephone set 100 (telephone number X) for example, since the telephone number X is shared by the other telephone sets 200 and 300, ring tones are made not only in the telephone set 100 but also in the telephone sets 200 and 300 simultaneously. At the same time, the display lamp 10a of each of the telephone sets 100, 200 and 300 corresponding to the telephone number X is caused to flush on and off and thereby the incoming call is notified to the users of each of the telephone sets 100, 200 and 300.

Thus, for example, even when the user of the telephone set 100 is absent, response can be made to a call which has come into the telephone set 100 (call incoming to the telephone number X) with the telephone set 200 (alternatively, the telephone set 300) by performing an off-hook operation by picking up the receiver 202 (alternatively, the receiver 302) of the telephone set 200 (or 300). The telephone set 100 can have telephone numbers Y and Z and use these numbers even if the telephone sets 200 and 300 do not exist. In this case, the telephone set 100 is permitted to use the three telephone numbers X, Y and Z exclusively for itself.

Referring to FIG. 33, there is shown in block an example of a multi-line operation system realized by using the above-described multi-line telephone set 100 (alternatively, the telephone set 200 or 300). The telephone set 100 shown is contained in a switching system 400 and connected through this switching system 400 to a public network 500. In this case, the telephone set 100 can handle totally three telephone numbers according to setting in the switching system 400 side. These telephone numbers are an outside line number "092-*-3211" (logical number of an incoming trunk 600) as a master telephone number X and outside line numbers "092-*-3212" (logical number of an incoming trunk 700) and "092-***-3213" (logical number of an incoming trunk 800) as slave telephone numbers Y and Z.

Thus, the telephone set 100 can be used for reception business including transferring of an incoming call to a specified person in charge according to the originator of this call, and so on. In other words, a person at the reception desk can identify the originator of a call incoming to the telephone set 100 by responding to the call and then transfer the call to a person in charge according to the caller.

For example, if the originator of a call incoming to the telephone number X ("092-*-3211") is a customer A (telephone set 501), the receptionist transfers the call to the telephone set 601 of a person in charge of the customer A of her own company (calls the telephone set 601). If the originator of a call incoming to the telephone number Y ("092-*-3212") is a customer B (telephone set 502), the receptionist transfers the call to the telephone set 602 of a person in charge of the customer B of her own company. If the originator of a call incoming to the telephone number Z ("092-***-3213") is a customer C (telephone set 503), the receptionist transfers the call to the telephone set 603 of a person in charge of the customer C of her own company. In reality, such transfer processing is executed by changing a called side included in data created for each call, which is called call control data, to a transfer destination with the switching system 400.

The above-described transfer operation is usually performed in a manner that the receptionist identifies the caller by responding to the incoming call and then dials the transfer destination by, for instance keeping the call on hold. In recent years, however, a request has been made for transferring an incoming call to a destination without actually responding to the call (non-response transfer).

Such a request has been made because if caller number notification services are rendered to the telephone sets 501 to 503 of the customers A, B and C by utilizing ISDN or the like, by displaying caller information including a telephone number, a caller's name, and so on, regarding the originator of a call which has come into the telephone set 100, on the displaying unit 101, the receptionist can identify the originator without actually responding to the call (without performing an off-hook operation).

Thus, in order to realize such non-response transfer, a call controller for performing transfer processing (incoming call transfer control method) like processing (1) or (2) described below has been provided in the switching system 400.

(1) An incoming call transfer destination is registered beforehand for each telephone set, in this case the telephone set 100 (for each prime line number X). When a call comes into the prime line number X of the free (no incoming call) telephone set 100, if no response is given to the call for over a certain period (alternatively, if a non-response transfer operation is performed by, for instance pressing a non-response transfer button), the call is then transferred to the destination which has been registered beforehand.

Processing performed by the call controller during such non-response transfer control will be described in detail below. It is assumed that as shown in FIG. 34, telephone sets 100' to 300' are contained in the switching system 400 in addition to the telephone sets 100 to 300, the telephone set 100' can use the prime line numbers B and C of the telephone sets 200' and 300' in addition to its own prime line number A, the telephone set 200' can use the prime line numbers A and C of the telephone sets 100' and 300' in addition to its own prime line number B and similarly the telephone set 300' can use the prime line numbers A and B of the telephone sets 100' and 200' in addition to its own prime line number C.

As shown in FIG. 35, the call controller registers the telephone set 100' (telephone set a) in a transfer destination registration table 401 in a main memory unit (not shown) beforehand as a transfer destination for an incoming call with respect to the telephone set 100 (logical number of a telephone set x).

In such a condition, for example, if a call for calling the prime line number X of the telephone set 100 comes in through the incoming trunk 600 (see FIG. 33), the call controller creates a terminal control table for dealing with line numbers of telephone sets (ETCM: Expanded Terminal Control Memory) 402 like that shown in FIG. 36, a terminal control table (TCM: Terminal Control Memory) 403 like that shown in FIG. 37 and call management information (CDB: Call Data Block) 404 like that shown in FIG. 38.

Specifically, the call controller registers the logical number of each of the telephone sets 100 to 300 which can handle the line number X (alternatively, Y or Z) in the terminal control table 402 for dealing with telephone set lines. The call controller also registers the logical numbers of each of the telephone sets 100' to 300' which can handle the line number A (alternatively, B or C) therein. The call management information 404 are registered in the terminal control table 403 for each of the logical numbers of the telephone sets 100 and 100' and the incoming trunk 600. The call management information 404 includes information indicating that a call origination (caller) is the incoming trunk 600 (logical number of the incoming trunk 600), information indicating that a call destination (receiver) is the telephone set 100 (logical number of the telephone set 100), information regarding the existence of a registered transfer destination, information regarding a calling state (during calling or during communication), and so on.

The call controller outputs a ring tone to the incoming trunk 600 (such that the caller can hear the ring tone) and calls the line number X (ring tones of all the telephone sets 100 to 300 which can use the line number X are sounded) based on the terminal control table 402. During this operation, the call controller sets timers for each call management information 404.

In such a condition, if the user of the telephone set 100 gives no response to the incoming call for a certain period, since the timer takes time out, the call controller then recognizes the existence of the registered transfer destination by referring to the call management information 404 (CDB #n) in which the time out has occurred. Then, the call controller recognizes that the transfer destination is the telephone set 100' by referring to the transfer destination registration table 401 based on the "receiver" (in other words, the logical number of the telephone set 100) registered in the call management information 404.

After the recognition of the transfer destination, for example as shown in FIG. 39, the call controller clears the information regarding the existence of the "registered transfer destination" included in the call management information 404, changes the information of the "receiver" to the information of the "logical number of the telephone set 100'" and stops calling the line number X, calls the telephone set 100' instead to execute the non-response transfer.

If the user of the telephone set 100 presses the non-response transfer button during calling the line number X, the logical number of the telephone set 100 and the pressing of the non-response transfer button are notified to the call controller. Accordingly, the call controller identifies the proper call management information 404 (CDB#n) by referring to the terminal control table 403 based on the notified logical number of the telephone set 100.

Then, the call controller recognizes that the transfer destination has been registered by referring to the call management information 404 (CDB#n) and refers to the transfer destination registration table 401 based on the "receiver" (in other words, the logical number of the telephone set 100) set in the call management information 404. Accordingly, the call controller recognizes the telephone set 100' as the transfer destination, stops calling the line number X and calls the telephone set 100' instead to execute non-response transfer.

(2) If there is a call incoming to the prime line number X of the free telephone set 100, by inputting transfer destination information by dialing or the like based on caller information displayed by the displaying unit 101 while the telephone set 100 is kept in an on-hook state, the call incoming to the prime line number X is transferred to the telephone set corresponding to the transfer destination information.

In this case, the call controller performs processing described below. Similarly to the procedure described above in (1), the call controller creates a terminal control table 402 (see FIG. 36) for dealing with telephone set lines, a terminal control table 403 (see FIG. 37) and call management information 404 (see FIG. 38). Then, the call controller outputs a ring tone to the incoming trunk 600 (such that the caller can hear the ring tone) and calls the line number X (ring tones of all the telephone sets 100 to 300 which can use the line number X are sounded) based on the terminal control table 402.

In such a condition, if a transfer destination telephone number is dialed by the telephone set 100 which is kept in an on-hook state, the logical number of the telephone set 100 and the dialed number are notified to the call controller. Then, the call controller identifies the corresponding call management information 404 by referring to the terminal control table 403 based on the notified logical number of the telephone set 100, stops calling the line number X by setting the logical number and the notified dialed number in a region for registering the "receiver" of the call management information 404 and calls the telephone set 100' instead to execute non-response transfer.

With the call controller (incoming call transfer controller), if there is a call incoming to the prime line number X of the free telephone set 100 from the customer A, the user can transfer the call to another telephone set 100' without responding to the call incoming to the prime line number X.

However, there are problems inherent in the incoming call transfer controller (control method) designed to execute the above-described processing (1) or (2). These control methods are effective when the telephone set of a transfer origin (transfer controller) controls only a single line number (prime line number X). But in the telephone set 100 which can handle a plurality of line numbers (X, Y and Z) as described above, it may occur that the plurality of line numbers simultaneously receive calls or are used. In such a case, the telephone set 100 cannot transfer calls incoming to the line numbers (slave telephone numbers) other than the prime line number (master telephone number) to the other telephone sets without any response.

More particularly, if a non-response transfer operation is performed (by pressing the non-response transfer button or dialing a transfer destination) by the telephone set 100 (alternatively, the telephone set 200 or 300) as described above, only the logical number of the telephone set 100 (200 or 300) which has performed the transfer operation is notified to the call controller. Since no information regarding the target line number of the transfer operation is notified, for instance even when the telephone set 200 of the prime line number Y executes non-response transfer for a call incoming to the line number X, the call controller must refer to the terminal control table 403 only based on the logical number of the telephone set 200. Consequently, the call controller cannot reach (recognize) the call management information 404 for managing the call (of the line number X) to be transferred.

In other words, in the non-response transfer operation performed by the telephone set 200, calls incoming to the prime line numbers X and Z of the other telephone sets 100 and 300 cannot be transferred. The same is true for the telephone sets 100 and 300 (alternatively, the telephone sets 100' to 300'). The telephone sets 100 and 300 (alternatively, 100' to 300') cannot perform non-transfer operation for calls incoming to the line numbers other than their own prime line numbers.

Thus, for instance even if she knows that calls incoming to the telephone set 100 are from the customers B and C, the receptionist cannot perform non-response transfer for each of the calls and must respond to at least one of the calls temporarily.

If the receptionist responds to the call incoming to the line number Y, the call which has come into the line number Y from the customer B is transferred to the telephone set 602 of a person in charge of the customer B. In the meantime, the call which has come into the line number Z from the customer C is kept waiting until the receptionist responds to the call incoming to the line number Z.

Also, if a call comes into the line number Z from the customer C while the receptionist is engaged in communication with the customer A by using the prime line number X, non-response transfer cannot be performed for the call incoming to the line number Z. Accordingly, the receptionist must cancel the communication performed by using the prime line number X or place the communication on hold and respond to the call incoming to the line number Z before transferring the call. Meanwhile, dealing with the call incoming to the main line number X from the customer A is discontinued or suspended.

As apparent from the foregoing, a problem inherent in the incoming call transfer controller (control method) is a great delay in dealing with calls incoming to the line numbers Y and Z other than the prime line number X. Such a delay occurs because if calls simultaneously come into the plurality of line numbers Y and Z other than the prime line number X of the telephone set 100, non-response transfer cannot be performed for any of these calls.

Another problem inherent in the incoming call transfer controller (control method) is not only a great delay in dealing with calls incoming to the line numbers other than the prime line number X but also a reduction in quality (service quality) of dealing with a party which has already been dealt with. This problem occurs because if new calls come into the line numbers Y and Z while the receptionist uses the prime line number X (e.g., during communication), the receptionist must place the communication with the opposite party performed by using the prime line number X on hold temporarily or discontinue the communication in order to deal with any of these incoming calls.

SUMMARY OF THE INVENTION

The present invention was made in order to solve the problems discussed above. It is an object of the present invention to provide an incoming call transfer controller and an incoming call transfer control method, whereby calls incoming to the optional (all) line numbers of a telephone terminal capable of dealing with a plurality of line numbers can be transferred to a desired transfer destination telephone terminal without making any response by the telephone terminal.

In order to achieve the above-described object, according to an aspect of the present invention, there is provided an incoming call transfer controller for performing control so as to transfer a call incoming to a telephone terminal to another telephone terminal without making any response by the former terminal in a switching system which contains the telephone terminal capable of dealing with a plurality of line numbers.

In this case, the incoming call transfer controller comprises an incoming call non-response transfer request detecting unit for detecting an incoming call non-response transfer request transmitted from said telephone terminal by a specified non-response transfer operation performed on the telephone terminal, a line number data creating unit for creating line number data regarding an incoming call to be transferred for each line number of the telephone terminal as a transfer control terminal on which the non-response transfer operation was performed when the incoming call non-response transfer request is detected by the incoming call non-response transfer request detecting unit, a transfer destination data creating unit for creating transfer destination data regarding the incoming call for each line number of the transfer control terminal when the incoming call non-response transfer request is detected by the incoming call non-response transfer request detecting unit and a transfer execution control unit for deciding a line number for the incoming call to be transferred and a transfer destination telephone terminal for a call incoming to the line number based on the line number data created by the line number data creating unit and the transfer destination data created by the transfer destination data creating unit and transferring the incoming call to the transfer destination telephone terminal.

According to another aspect of the present invention, there is provided an incoming call transfer controller for performing control so as to transfer a call incoming to a telephone terminal to another telephone terminal without making any response by the former terminal in a switching system which contains the telephone terminal capable of dealing with a plurality of line numbers.

In this case, the incoming call transfer controller comprises an incoming call non-response transfer request detecting unit for detecting an incoming call non-response transfer request transmitted from the telephone terminal by a specified non-response transfer operation performed by the telephone terminal and a transfer execution control unit for creating line number data at least regarding an incoming call to be transferred for each line number of a transfer control terminal which performs a transfer operation when the incoming call non-response transfer request is detected by the incoming call non-response transfer request detecting unit, deciding a line number for the incoming call to be transferred based on the line number data and transferring the call incoming to the line number to a desired transfer destination telephone terminal.

According to yet another aspect of the present invention, there is provided an incoming call transfer controller for performing control so as to transfer a call incoming to a telephone terminal to another telephone terminal without making any response by the former terminal in a switching system which contains the telephone terminal capable of dealing with a plurality of line numbers.

In this case, the incoming call transfer controller comprises an incoming call non-response transfer request detecting unit for detecting an incoming call non-response transfer request transmitted from the telephone terminal by a specified non-response transfer operation performed by the telephone terminal and a transfer execution control unit for creating transfer control date regarding an incoming call for each line number of the telephone terminal on which the transfer operation was performed when the incoming call non-response transfer request is detected by the incoming call non-response transfer request detecting unit and executing transfer control for the incoming call based on the transfer control data.

According to further aspect of the present invention, there is provided an incoming call transfer control method for performing control so as to transfer a call incoming to a telephone terminal to another telephone terminal without making any response by the former terminal in a switching system which contains the telephone terminal capable of dealing with a plurality of line numbers.

In this case, the incoming call transfer control method comprises the steps of detecting an incoming call non-response transfer request transmitted from the telephone terminal by a specified non-response transfer operation performed by the telephone terminal, creating line number data regarding an incoming call to be transferred and transfer destination data regarding the incoming call for each line number of the telephone terminal on which the non-response transfer operation was performed when the incoming call non-response transfer request is detected in detecting step, deciding a line number and a transfer destination telephone terminal for the incoming call to be transferred based on the line number data and the transfer destination data and transferring a call incoming to the line number to the transfer destination telephone terminal.

According to further aspect of the present invention, there is provided an incoming call transfer control method for performing control so as to transfer a call incoming to a telephone terminal to anther telephone terminal without making any response by the former terminal in a switching system which contains the telephone terminal capable of dealing with a plurality of line numbers.

In this case, the incoming call transfer control method comprises the steps of detecting an incoming call non-response transfer request transmitted from the telephone terminal by a specified non-response transfer operation performed by the telephone terminal, creating line number data at least regarding an incoming call to be transferred for each line number of the telephone terminal on which the non-response transfer operation was performed when the incoming call non-response transfer request is detecting in detecting step, deciding a line number for the incoming call to be transferred based on the line number data and transferring a call incoming to the line number to a desired transfer destination telephone terminal.

According to yet further aspect of the present invention, there is provided an incoming call transfer control method for performing control so as to transfer a call incoming to a telephone terminal to another telephone terminal without making any response by the former terminal in a switching system which contains the telephone terminal capable of dealing with a plurality of line numbers.

In this case, the incoming call transfer control method comprises the steps of detecting an incoming call non-response transfer request transmitted from the telephone terminal by a specified non-response transfer operation performed by the telephone terminal, creating transfer control data regarding the incoming call for each line number of the telephone terminal on which the non-response transfer operation was performed when the incoming call non-response transfer request is detected in detecting step and executing transfer control for the incoming call based on the transfer control data.

According to the incoming call transfer controller and the incoming call transfer control method provided by the present invention, even when a call comes into any line number of the transfer control terminal under any conditions, the incoming call to be transferred can always be transferred to a predetermined transfer destination quickly without making any response by the transfer control terminal. Accordingly, the present invention has the following advantages.

(1) Even if calls simultaneously come into the plurality of line numbers of the transfer control terminal, all the incoming calls can be transferred quickly without making any response by the transfer control terminal. Accordingly, service quality can be greatly improved, for instance in telephone reception business, by limiting the occurrence of a delay in dealing with all the incoming calls to a minimum.

(2) Even if a new call comes into another line number while a certain line number of the transfer control terminal is engaged (during communication), without placing the call incoming to the line number which has been dealt with on hold or canceling the communication (while this dealing with the line number is continued), the new incoming call can be transferred to another telephone terminal without making any response by the transfer control terminal. Accordingly, also in this case, service quality can be greatly improved, for instance in telephone reception business.

BRIEF DESCRIPTION OF THE DRAWINGS

This and other objects, features and advantages of the present invention will become more apparent upon a reading of the following detailed description and drawings, in which:

FIG. 34 is a block diagram illustrating another multi-line construction of the multi-line telephone set;

DESCRIPTION OF THE PREFERRED EMBODIMENTS (a) Aspects of the Invention

First, the aspects of the present invention will be described with reference to the accompanying drawings.

Figure 1:
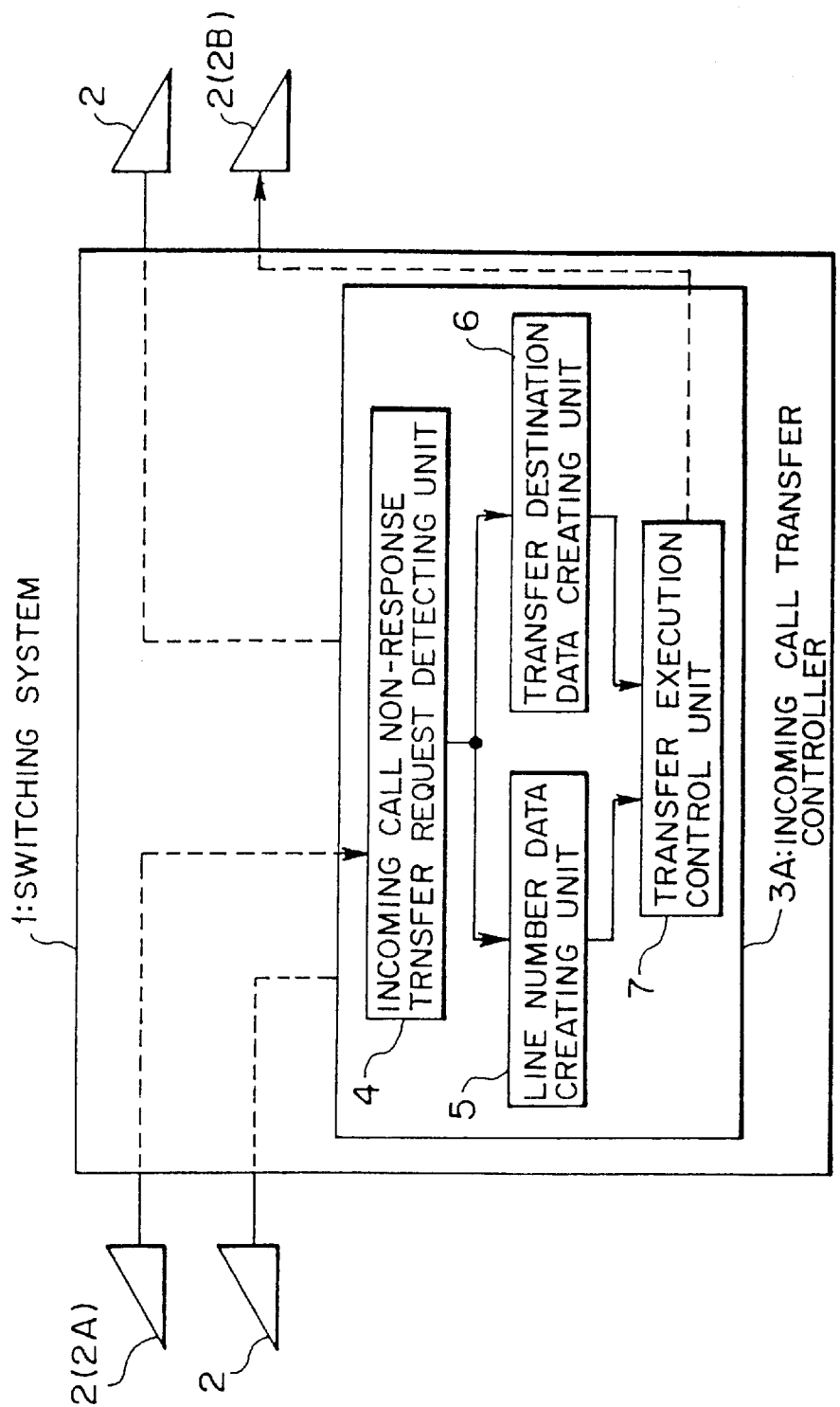
FIGS. 1 and 2 are block diagrams each showing an aspect of the present invention.

Referring to FIG. 1, there is shown in block an aspect of the present invention. In the drawing, a numeral 1 denotes a switching system and a numeral 2 denotes a telephone terminal contained in the switching system 1. In the switching system 1, at least the telephone terminal 2A can handle a plurality of line numbers. The switching system 1 includes an incoming call transfer controller 3A for performing control so as to transfer, for instance, a call incoming to the telephone terminal 2A to another telephone terminal (transfer destination telephone terminal) 2B without making any response by the telephone terminal 2A. The incoming call transfer controller 3A shown comprises an incoming call non-response transfer request detecting unit 4, a transfer line data creating unit 5, a transfer destination data creating unit 6 and a transfer execution control unit 7.

The incoming call non-response transfer request detecting unit 4 detects an incoming call non-response transfer request transmitted into by a specified non-response transfer operation performed by the telephone terminal 2A. The line number data creating unit 5 creates line number data regarding an incoming call to be transferred for each line number of the transfer control terminal 2A which has performed the transfer operation when an incoming call non-response transfer request is detected by the incoming call non-response transfer request detecting unit 4.

The transfer destination data creating unit 6 creates transfer destination data regarding the incoming call for each line number of the transfer control terminal 2A when the incoming call non-response transfer request is detected by the incoming call non-response transfer request detecting unit 4. The transfer execution control unit 7 decides a line number for the incoming call to be transferred and a transfer destination telephone terminal 2B for a call incoming to the line number based on the line number data created by the line number creating unit 5 and the transfer destination data created by the transfer destination data creating unit 6 and then transfers the incoming call to the transfer destination telephone terminal 2B.

With the incoming call transfer controller 3A of the present invention constructed in the above-noted manner, after an incoming call non-response transfer request from the transfer control terminal 2A is detected by the incoming call non-response transfer request detecting unit 4, line number data and transfer destination data regarding an incoming call to be transferred are created for each line number of the transfer control terminal 2A by the data creating units 5 and 6 and the transfer execution control unit 7 decides a transfer line and a transfer destination based on these data and then executes transfer processing. Accordingly, even when a call comes into any of the line numbers of the transfer control terminal 2A under any conditions, the incoming call can always be transferred to the transfer destination quickly without making any response by the transfer control terminal 2A.

Therefore, the incoming call transfer controller 3A has the following advantages.

(1) Even if calls simultaneously come into the plurality of line numbers of the transfer control terminal 2A, all the incoming calls can be transferred without making any response by the transfer control terminal 2A and a delay in dealing with each of the incoming calls can be reduced to a minimum. Accordingly, service quality, for instance in telephone reception business, can be greatly improved.

(2) Even if a new call comes into another other line number while a certain line number of the transfer control terminal 2A is engaged (during communication), without placing the call incoming to the line number which has been dealt with on hold or canceling the communication (the communication is continued), the new incoming call can be transferred to another telephone terminal without making any response by the transfer control terminal. Accordingly, also in this case, service quality, for instance in telephone reception business, can be greatly improved.

The line number data creating unit 5 may be constructed so as to create the line number data based on line number information inputted from the transfer control terminal 2A. In this case, since the transfer control terminal 2A leads the creation of data for deciding a line number for an incoming call to be transferred in the line number data creating unit 5, a line number data creating operation can always be performed according to the request of the user (referred to as a transfer controller, hereinafter) of the transfer control terminal 2A. Accordingly, any line numbers not requested for transfer by the transfer controller will never be decided as transfer line numbers and the reliability of the incoming call transfer controller 3A can be greatly improved.

Specifically, the line number data creating unit 5 may include a line number input requesting unit for requesting the transfer control terminal 2A to input a line number and a line number detecting unit for detecting line number information in response to the line number input request made by the line number input requesting unit. The line number data is then created based on the line number information detected by the line number detecting unit.

With the line number data creating unit 5, since the transfer controller of the transfer control terminal 2A is requested by the line number input requesting unit to input the line number information and the line number information is detected by the line number detecting unit in response to the request, the line number information necessary for creating the line number data can be surely obtained from the transfer controller (transfer control terminal 2A). Accordingly, line number data creation processing can be assured.

The transfer destination data creating unit 6 may be constructed so as to create the transfer destination data based on telephone number information inputted from the transfer control terminal 2A. In this case, since the transfer control terminal 2A leads the creation of data for deciding a transfer destination for an incoming call to be transferred in the line number creating unit 5, the transfer controller can optionally change a transfer destination for the incoming call for each line number of the transfer control terminal 2A. Accordingly, convenience during transfer processing can be greatly improved.

Specifically, the transfer destination data creating unit 6 may include a telephone number input requesting unit for requesting the transfer control terminal 2A to input the telephone number of the transfer destination telephone terminal 2B and a telephone number detecting unit for detecting telephone number information in response to the telephone number input request made by the telephone number input requesting unit. The transfer destination data is then created based on the telephone number information detected by the telephone number detecting unit.

With the transfer destination data creating unit 6, since the transfer controller of the transfer control terminal 2A is requested by the telephone number input requesting unit to input the telephone number information and the telephone number information is detected by the telephone number detecting unit in response to the request, the telephone number information necessary for creating the transfer destination data can be surely obtained from the transfer controller (transfer control terminal 2A). Accordingly, any transfer destination not requested by the transfer controller will never be decided as transfer destinations by mistake and the reliability of the incoming call transfer controller 3A can be greatly improved.

The line number data creating unit 5 may include a transfer line selection condition registering unit for registering a line number selection condition for an incoming call to be transferred for the telephone terminal 2 beforehand. In this case, if no line number information is inputted from the transfer control terminal 2A, the line number data is created based on the selection condition registered in the transfer line selection condition registering unit.

With the line number data creating unit 5 thus constructed, since the incoming call transfer controller 3A leads the creation of data for deciding an incoming call (line number) to be transferred in the line number data creating unit 5 according to the selection condition registered in the transfer line selection condition registering unit even when no line number information is inputted from the transfer control terminal 2A, the impossibility of incoming call transfer caused by the non-creation of the line number data because of non-inputting of the line number information can be prevented. Accordingly, normal line number data creation processing can always be continued, the transfer controller can leave the decision of a transfer line to the incoming call transfer controller 3A depending on situations and thus the degree of flexibility during transfer processing can be greatly increased.

The line number data creating unit 5 may include a transfer line selection condition registering unit for registering a line number selection condition for an incoming call to be transferred for the telephone terminal 2 beforehand, a line number input requesting unit for requesting the transfer control terminal 2A to input a line number, a transfer line number detecting unit for detecting line number information in response to the line number input request made by the line number input requesting unit and a line number input monitoring unit for monitoring the detection of the line number information by the transfer line number detecting unit within a specified time after the line number input request is made by the line number input requesting unit. In this case, if the line number information is not detected by the transfer line number detecting unit within the specified time in the line number input monitoring unit, line number data is created based on the selection condition registered in the transfer line selection condition registering unit.

With the line number data creating unit 5 thus constructed, the transfer control terminal 2A is requested to input a line number in order to obtain line number information necessary for the creation of line number data and if the line number information is not detected within a specified time after the inputting of the line number is requested, the line number data is created based on the selection condition registered in the transfer line selection condition registering unit. Accordingly, the occurrence of a delay in the transfer line deciding processing caused by a delay in the creation of the line number data for over a specified period after the inputting of the line number can be surely prevented. Thus, line number data creation processing (transfer line deciding processing) can always be executed quickly.

The transfer destination data creating unit 6 may include a transfer destination telephone number registering unit for registering transfer destination telephone number information for the line number of the telephone terminal 2A beforehand. In this case, if no telephone number information is inputted from the transfer control terminal 2A, transfer destination data is created based on the transfer destination telephone number information registered in the transfer destination telephone number registering unit.

With the transfer destination data creating unit 6, even if no transfer destination telephone number information is inputted from the transfer control terminal 2A, the incoming call transfer controller 3A leads the creation of data for deciding a transfer destination of an incoming call (line number) to be transferred in the transfer destination data creating unit 6 based on the transfer destination telephone number information registered in the transfer destination telephone number registering unit. Accordingly, the impossibility of incoming call transfer caused by the non-creation of transfer destination data because of the non-input of transfer destination telephone number information can be prevented and thereby normal processing for creating transfer destination data can always be executed. Thus, the transfer controller can leave the decision of a transfer destination to the incoming call transfer controller 3A depending on situations and the degree of flexibility during a transfer operation can be greatly increased.

The transfer destination data creating unit 6 may include a transfer destination telephone number registering unit for registering transfer destination telephone number information for an incoming call to be transferred for the telephone terminal 2A beforehand, a telephone number input requesting unit for requesting the transfer control terminal 2A to input the telephone number of the transfer destination telephone terminal 2B, a telephone number detecting unit for detecting the telephone number information in response to the telephone number input request made by the telephone number input requesting unit and a telephone number input monitoring unit for monitoring the detection of the telephone number information by the telephone number detecting unit within a specified time after the telephone number input request is made by the telephone number input requesting unit. In this case, if no telephone number information is detected by the telephone number detecting unit within the specified time in the telephone number input monitoring unit, transfer destination data is created based on the transfer destination telephone number information registered in the transfer destination telephone number registering unit.

With the transfer destination data creating unit 6 thus constructed, the transfer control terminal 2A is requested to input a transfer destination telephone number in order to obtain transfer destination telephone number information necessary for creating transfer destination data and then if no transfer destination telephone number information is detected within a specified time, transfer destination data is created based on the transfer destination telephone number information registered beforehand for the line number of the telephone terminal 2A. Accordingly, a delay in the creation of transfer destination data for over a specified period after the transfer destination telephone number input request is made can be surely prevented. Thus, processing for creating transfer data (transfer destination deciding processing) can always be executed quickly.

The line number data creating unit 5 may include a transfer line selection condition registering unit for registering line number selection condition for transfer for the telephone terminal 2 beforehand. In this case, line number data is created based on the selection condition registered in the transfer line number selection condition registering unit.

With the line number data creating unit 5 thus constructed, since data for deciding a line number for an incoming call to be transferred is automatically created upon receiving an incoming call non-response transfer request from the transfer control terminal 2A, the transfer controller of the transfer control terminal 2A does not need to input any line number information for specifying an incoming call to be transferred. Accordingly, a burden placed on the transfer controller during a transfer operation can be greatly reduced.

The transfer destination data creating unit 6 may include a transfer destination telephone number registering unit for registering transfer destination telephone number information for the line number of the telephone terminal 2A beforehand. In this case, transfer destination data is created based on the transfer destination telephone number information registered in the transfer destination telephone number registering unit.

With the transfer destination data creating unit 6 thus constructed, since data for deciding a transfer destination for an incoming call to be transferred is automatically created upon receiving an incoming call non-response transfer request from the transfer control terminal 2A, the transfer controller does not need to input any transfer destination telephone number information for specifying a transfer destination for an incoming call to be transferred. Accordingly, a burden placed on the transfer controller during a transfer operation can be greatly reduced.

The transfer execution control unit 7 may include a transfer result notifying unit for notifying the transfer control terminal 2A of the result of transfer-control of an incoming call to the transfer destination telephone terminal 2B.

With the transfer execution control unit 7 thus constructed, since the result of actual incoming call transfer processing, that is, a normal transfer completion (transfer success) or the occurrence of abnormality during transfer (transfer failure), can be notified to the transfer control terminal 2A which has made a transfer request by the transfer result notifying unit, the transfer controller can always understand a transfer processing situation and accordingly deal with the situation.

The transfer execution control unit 7 may include a transfer termination control unit for stopping transfer control when receiving a transfer stop request from the transfer control terminal 2A during the control for transferring the incoming call to the transfer destination telephone terminal 2B.

With the transfer execution control unit 7 thus constructed, since transfer control can be stopped by the transfer termination control unit upon receiving a transfer termination request from the transfer control terminal 2A even during transfer control, the transfer controller can always stop transfer processing easily. Accordingly, unnecessary transfer processing performed against the intention of the transfer controller can be effectively prevented.

The transfer execution control unit 7 may include a re-transfer control unit for performing a re-transfer control for an incoming call based on the line number data created by the line number data creating unit 5 when receiving a re-transfer control request from the transfer control terminal 2A if its transfer control for the incoming call fails. In this case, re-transfer control for the incoming call can be executed by the re-transfer control unit upon receiving the re-transfer control request even if the transfer control fails for the incoming call.

With the transfer execution control unit 7 thus constructed, since re-transfer control for an incoming call can be executed based on the line number data re-created by the line number data creating unit by the re-transfer control unit upon receiving a re-transfer control request even if transfer control fails for the incoming call, the non-transfer of the incoming call to be transferred for a long time against the intention of the transfer controller can be prevented extremely effectively.

In this case, the line number data creating unit 5 may include a transfer line selection condition registering unit for registering a line number selection condition for transfer for the telephone terminal 2 beforehand and re-create line number data based on the selection condition registered in the transfer line selection condition registering unit.

With the line number data creating unit 5 thus constructed, since line number data necessary for re-transfer control performed by the re-transfer control unit is automatically created, the failure of transfer control can be automatically prevented and the decision of a transfer line can be changed according the situation of a call incoming to the telephone terminal 2 as the occasion demands. Accordingly, the reliability and the degree of flexibility of the transfer control can be greatly increased.

This line number data creating unit 5 may be constructed so as to re-create line number data based on transfer line number information re-inputted from the transfer control terminal 2A.

With the line number data creating unit 5 thus constructed, since the transfer control terminal 2A leads the creation of data for deciding a line number for an incoming call to be transferred in the line number data creating unit 5, the transfer controller can optionally change the line number for the incoming call to be transferred to another for each line number of the transfer control terminal 2A even if transfer control fails. Accordingly, re-creation processing can be performed for line number data according to the request of the transfer controller, the decision of a line number for transfer against the request of the transfer controller is prevented and thereby the reliability of the incoming call transfer controller 3A can be greatly improved.

The transfer execution control unit 7 may include a re-transfer control unit for performing re-transfer control for an incoming call based on transfer destination data re-created by the transfer destination data creating unit 6 when receiving a re-transfer control request from the transfer control terminal 2A if transfer control for the incoming call fails.

With the transfer execution control unit 7 thus constructed, since re-transfer control can be performed for an incoming call by the re-transfer control unit upon receiving a re-transfer control request even if transfer processing fails for the incoming call, the non-transfer situation of the incoming call to be transferred for a long time against the intention of the transfer controller can be prevented extremely effectively.

In this case, the transfer destination data creating unit 6 may include a failure time transfer destination telephone number registering unit for registering the transfer destination telephone number information of a transfer failure time for the line number of the telephone terminal 2A beforehand and re-create transfer destination data based on the transfer failure time transfer destination telephone number information registered in the failure time transfer destination telephone number registering unit.

With the transfer destination data creating unit 6 thus constructed, since transfer destination data necessary for performing re-transfer control by the re-transfer control unit is automatically created mainly by the incoming call transfer controller 3A, a transfer control failure can be automatically prevented. Accordingly, normal transfer destination data creation processing can always be executed and an incoming call failed to be transferred to a predetermined telephone terminal can be transferred according to set failure time transfer destination telephone number information. Depending on set failure time transfer destination telephone number information, the incoming call failed to be transferred can be surely dealt with at the transfer destination and thus service quality during incoming call transfer can be improved more.

This transfer destination data creating unit 6 may be constructed so as to re-create transfer destination data based on transfer destination telephone number information re-inputted from the transfer control terminal 2A.

With the transfer destination data creating unit 6 thus constructed, since the transfer control terminal 2A leads the creation of data for deciding the transfer destination telephone terminal 2B, the transfer controller can optionally change a transfer destination for an incoming call to be transferred to another for each line number of the transfer control terminal 2A even when a transfer control failure occurs. Also, since processing for re-creating transfer destination data can always be performed according to the request of the transfer controller, the decision of the telephone number 2 as a transfer destination against the request of the transfer controller is prevented. Accordingly, the reliability of the incoming call transfer controller 3A can be greatly improved.

The re-transfer control unit may be constructed in any case so as not to perform the re-transfer control if the re-transfer control request is not received from the transfer control terminal within a specified time.

With the re-transfer control unit thus constructed, since erroneous re-transfer control can be prevented, an erroneous operation, such as re-transfer control against the intention of the transfer controller, can be prevented extremely effectively.

The transfer execution control unit 7 may include a level registering unit for registering a transfer permissible level for the telephone terminal 2 and a transfer regulating unit for regulating a transfer control performed for transferring an incoming call to the transfer destination telephone terminal 2B according to the transfer permissible level registered in the level registering unit.

With the transfer execution control unit 7 thus constructed, since transfer control for the incoming call to the transfer destination telephone terminal 2B is regulated according to the transfer permissible level registered in the level registering unit for each telephone terminal 2, the unconditional transfer of the incoming call to the transfer destination telephone terminal 2B can be prevented. Accordingly, transfer service quality can be greatly improved by preventing the transfer of an incoming call to the telephone terminal 2 inappropriate as a transfer destination or the transfer of an incoming call which should not be transferred.

The transfer regulating unit may be constructed so as to compare a transmission terminal side transfer permissible level registered for the telephone terminal 2 as the originator of an incoming call with a control terminal side transfer permissible level registered for the transfer control terminal 2A by referring to the level registering unit and perform transfer control for the incoming call only when the control terminal side transfer permissible level is higher than the transmission terminal side transfer permissible level.

With the transfer regulating unit thus constructed, since the execution/non-execution of transfer control can be regulated by the relation of the transfer controller and the caller using the transmission terminal 2, the transfer of an incoming call from an important caller can be surely prevented.

This transfer regulating unit may also be constructed so as to compare a control terminal side transfer permissible level registered for the transfer control terminal 2A with a transfer destination terminal side transfer permissible level registered for the transfer destination telephone terminal 2B by referring to the level registering unit and perform transfer control only when the control terminal side transfer permissible level is higher than the transfer destination terminal side transfer permissible level.

With the transfer regulating unit thus constructed, since the execution/non-execution of transfer control can be regulated by the relation of the transfer controller and the transfer destination, the transfer of an incoming call to the telephone terminal inappropriate as a transfer destination can be surely prevented.

This transfer regulating unit may be constructed so as to compare a transmission terminal side transfer permissible level registered for the telephone terminal 2 as the originator of an incoming call with a transfer destination terminal side transfer permissible level registered for the transfer destination telephone terminal 2B by referring to the level registering unit and perform transfer control only when the transmission terminal side transfer permissible level is higher than the transfer destination terminal side transfer permissible level.

With the transfer regulating unit thus constructed, since the execution/non-execution of transfer control can be regulated by the relation of the caller using the transmission terminal 2 and the transmission destination, an incoming call for transfer from an important caller can be surely transferred to a requested transfer destination.

Figure 2:
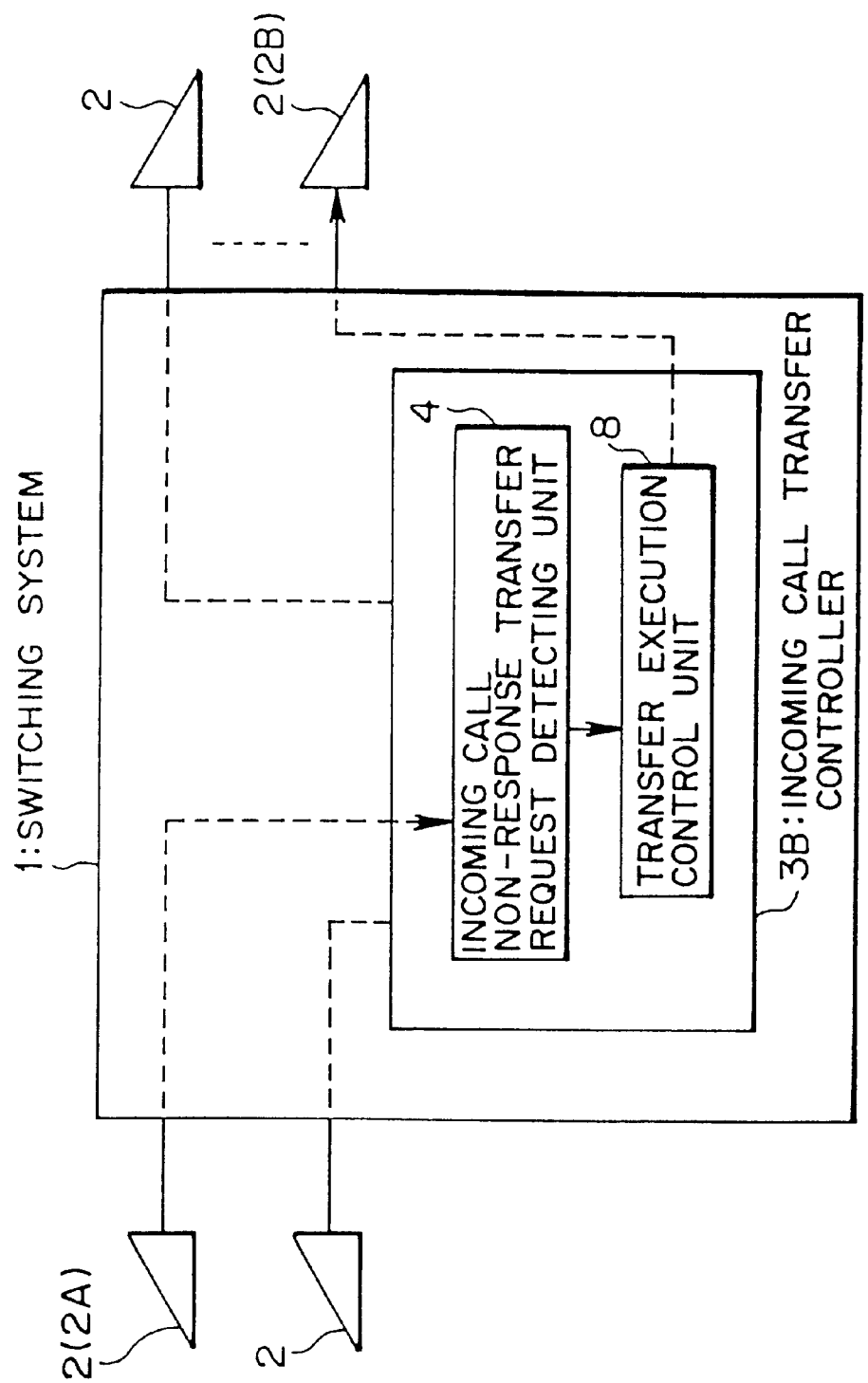

Referring now to FIG. 2, there is shown in block another aspect of the present invention. A switching system 1 shown in FIG. 2 is different from the system shown in FIG. 1 in that an incoming call transfer controller 3B is provided. This incoming call transfer controller 3B comprises a transfer execution control unit 8 in addition to an incoming call non-response transfer request detecting unit 4 similar to the unit 4 shown in FIG. 1

The transfer execution control unit 8 creates line number data at least regarding an incoming call to be transferred for each line number of the transfer control terminal 2A which performs a non-response transfer operation after an incoming call transfer request is detected by the incoming call non-transfer request detecting unit 4, decides a line number for the incoming call to be transferred based on this line number data and then transfers a call incoming to this line number to a desired telephone terminal 2 (e.g., a telephone terminal 2B).

With the incoming call transfer controller 3B of the present invention constructed in the above-noted manner, after an incoming call non-response transfer request from the transfer control terminal 2A is detected by the incoming call non-response transfer request detecting unit 4, the transfer execution control unit 8 creates at least line number data for each line number of the transfer control terminal 2A, decides a line number for an incoming call to be transferred based on this line number data and then performs transfer control. Accordingly, even when a call comes into any line number of the transfer control terminal 2A under any conditions, the incoming call can always be transferred to a desired transfer destination quickly without making any response by the transfer control terminal 2A.

The transfer execution control unit 8 may be constructed so as to create transfer control data for an incoming call for each line number of the transfer control terminal 2A which performs a non-response transfer operation after an incoming call non-response transfer request is detected by the incoming call non-response transfer request detecting unit and execute transfer control of the incoming call based on the transfer control data.

With the transfer execution control unit 8 thus constructed, even when a call comes into any line number of the transfer control terminal 2A under any conditions, the incoming call can always be transferred to a predetermined transfer destination quickly without making any response by the transfer control terminal 2A.

Therefore, the incoming call transfer controller 3B of the present invention has the following advantages.

(1) Even if calls simultaneously come into the plurality of line numbers of the transfer control terminal 2A, all the incoming calls can be quickly transferred without making any response by the transfer control terminal 2A. Accordingly, a delay in dealing with each of the incoming calls can be controlled to a minimum and service quality, for instance in telephone reception business, can be greatly improved.

(2) Even if a new call comes into another line number during the use (during communication) of a certain line number of the transfer control terminal 2A, without placing on hold the call incoming to the line number which has been dealt with or canceling the communication (the communication is continued), the new incoming call can be transferred to the other telephone terminal 2 without making any response by the transfer control terminal 2A. Accordingly, service quality, for instance in telephone reception business, can be greatly improved.

(b) Embodiments of the Invention

Now, the preferred embodiments of the present invention will be described with reference to the accompanying drawings.

(b-1) Constitution of the incoming call transfer controller

Figure 3:
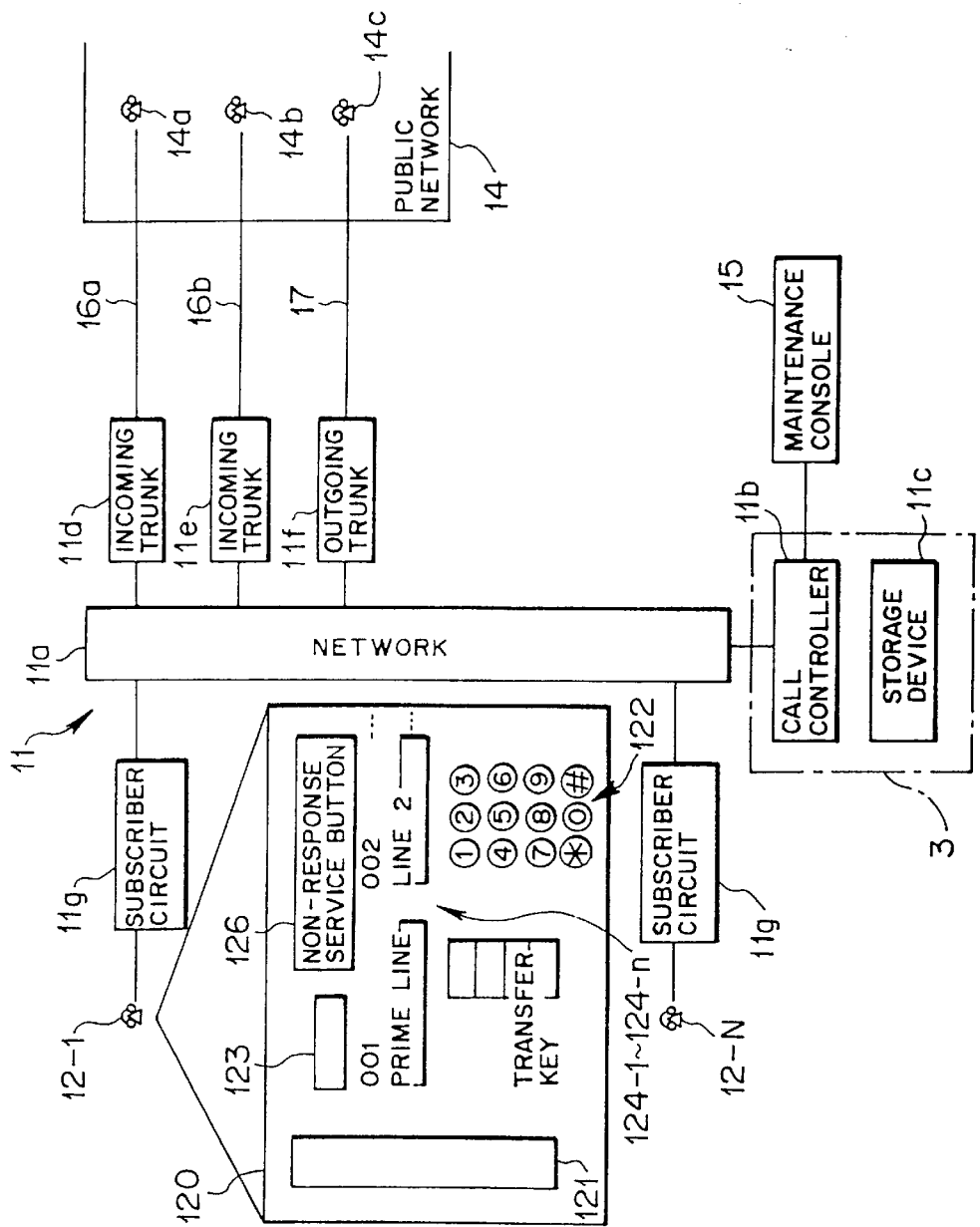
FIG. 3 is a block diagram showing a configuration of a telephone switching system in which an incoming call transfer controller of an embodiment of the present invention is used.

Referring to FIG. 3, there is shown in block a constitution of a telephone switching system in which the incoming call transfer controller of an embodiment of the present invention is used. The system shown in FIG. 3 comprises an electronic switching system 11 containing a plurality of telephone sets (telephone terminals) 12-1 to 12-N (N is a natural number) and 14a to 14c and a maintenance terminal (maintenance console) 15 for the electronic switching system 11.

Figure 32:
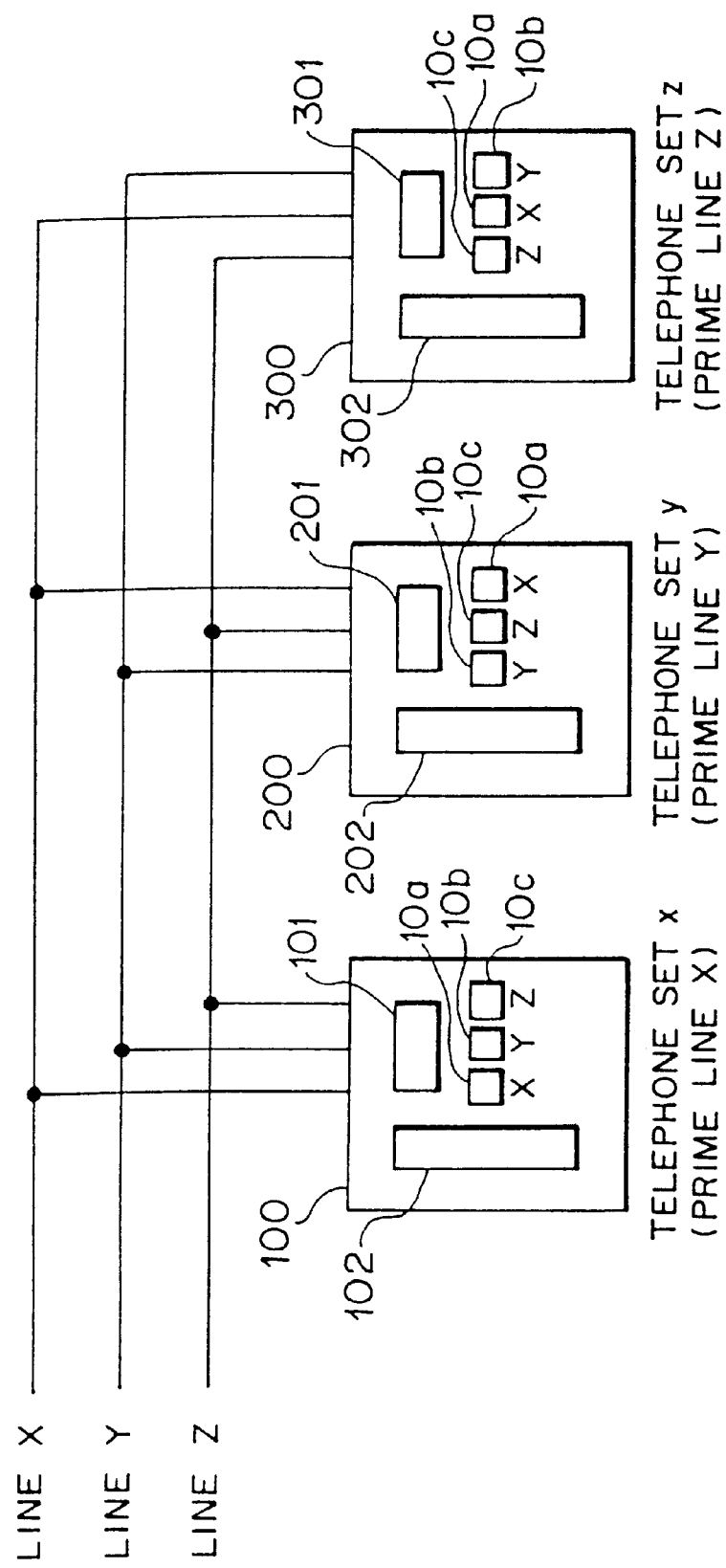
FIG. 32 is a block diagram illustrating a multi-line construction of a multi-line telephone set.
Figure 33:
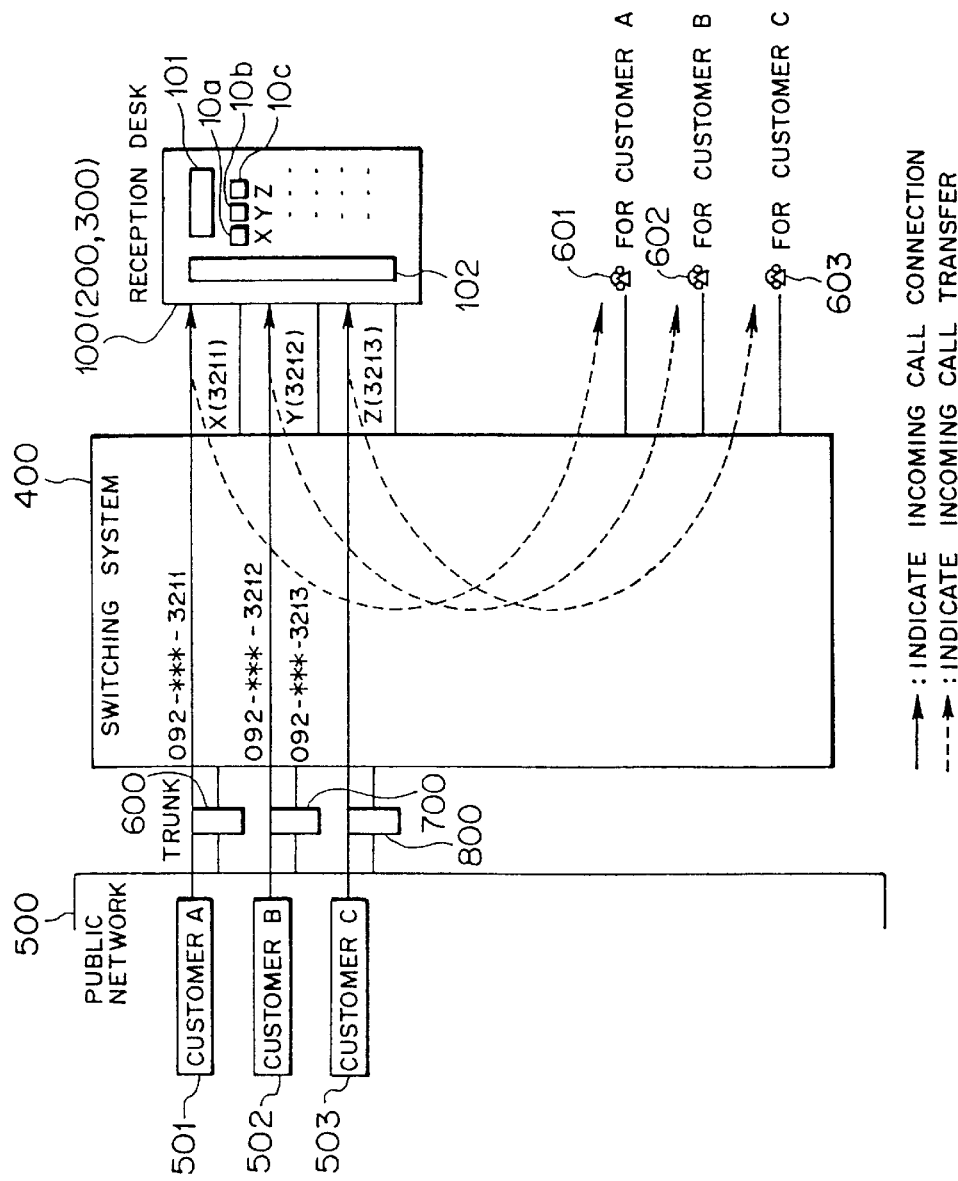
FIG. 33 is a block diagram showing an example of a multi-line operation system realized by using the multi-line telephone set.

At least each of the telephone sets 12-i (i=1 to N) is a multi-line telephone set. As in the case of the telephone set described above with reference to FIG. 32 (alternatively, FIG. 34), each of the telephone sets 12-i can use the main line numbers of the other telephone sets 12-i as sublime numbers (slave telephone numbers) in addition to its own prime line number (master telephone number). For example, the telephone set 12-1 can use the prime line numbers (2 to N) of the other telephone sets 12-2 to 12-N as sub-line numbers in addition to its own prime line number (1). The telephone set 12-N can use the prime line numbers (1 to N-1) of the other telephone sets 12-1 to 12-(N-1) as sub-line numbers in addition to its own prime line number (N).

The telephone set 12-i includes a receiver 121, a dial key 122 used for inputting telephone numbers, a displaying unit 123 such as a liquid crystal display and line number buttons 124-i arranged according to the number of line numbers the telephone set 12-i can handle (the line number button 124-1 is used for a prime line number and the other line number buttons 124-2 to 124-N are used for sub-line numbers here). These elements are all provided to a telephone set main body 120.

Each of these line number buttons 124-i includes a light emitting element such as a light emitting diode inside. This button is used for selecting a line number. The button also functions as a display lamp for notifying a user of the state of using a corresponding line number by turning ON, turning OFF or turning ON-and-Off the light emitting element or changing the color of an emitted light according to the state of using the line number (existence of an incoming call, an incoming call placed on hold or the state of ongoing communication).

With the telephone set 12-i thus constructed, a called side telephone number inputted by the dial key 122 can be displayed on the displaying unit 123 at the time of transmission, the button (display lamp) 124-i corresponding to a line number into which a call comes can be turned ON-and-OFF at the time of receiving a call and information regarding the originator of the incoming call (e.g., caller telephone number) can be displayed on the displaying unit 123.

Each of the telephone sets 12-i of the present invention further includes an incoming call non-response transfer service button 126 as shown in FIG. 3. By pressing this button 126, a signal for requesting rendering of the incoming call non-response transfer service [multi-line (non-response) incoming call transfer request] is transmitted to the electronic switching system 11. The electronic switching system 11 performs processing for transferring a call incoming to any one of the prime line and sub-line numbers of the telephone sets 12-i to the other telephone sets 12-i (alternatively, the telephone sets 14a to 14c) without making any response thereto by a user (multi-line incoming call transfer processing).

The telephone set 12-i also includes a normal transfer key 127. By this transfer key 127, the electronic switching system 11 can perform normal transfer processing. For example, when a call incoming to the telephone set 12-1 is to be transferred to the telephone set 12-N, as described above, the user presses the transfer key 127 after responding to the incoming call and then inputs the telephone number of the transfer destination telephone set 12-N by the dial key 122. In this way, the electronic switching system 11 changes the destination of the incoming call to the telephone set 12-N and rings a ring tone for the telephone set 12-N.

The electronic switching system (may be simply referred to as a switching system, hereinafter) 11 basically includes a switch unit (network circuit) 11a, a call controller 11b and a storage device 11c as shown in FIG. 3.

The switch unit 11a accommodates the telephone sets 12-i and 14a to 14c via specified lines and sets a speech path between the desired sets selected from the telephone sets 12-i and 14a to 14c. Each of the telephone sets 12-i is accommodated via a subscriber circuit 11g. The telephone sets 14a to 14c are accommodated in a public network 14 respectively via trunks 11d to 11f.

The trunks 11d and 11e accommodate incoming communication lines 16a and 16b from the public network 14. The trunk 11f accommodates an outgoing communication line 17 to the public network 14. It should be understood that although FIG. 3 shows only two incoming trunks 11d and 11e and one outgoing trunk 11f, a number of trunk circuits are provided in actuality.

The call controller 11b controls normal speech path setting and incoming call transfer processing performed by the switch unit 11a and the above-described incoming call non-response (multi-line) transfer processing. The storage device 11c stores various data including call control data necessary for call control performed by the call controller 11b. According to the embodiment, the call controller 11b and the storage device 11c constitute an incoming call transfer controller 3 together.

Figure 36:
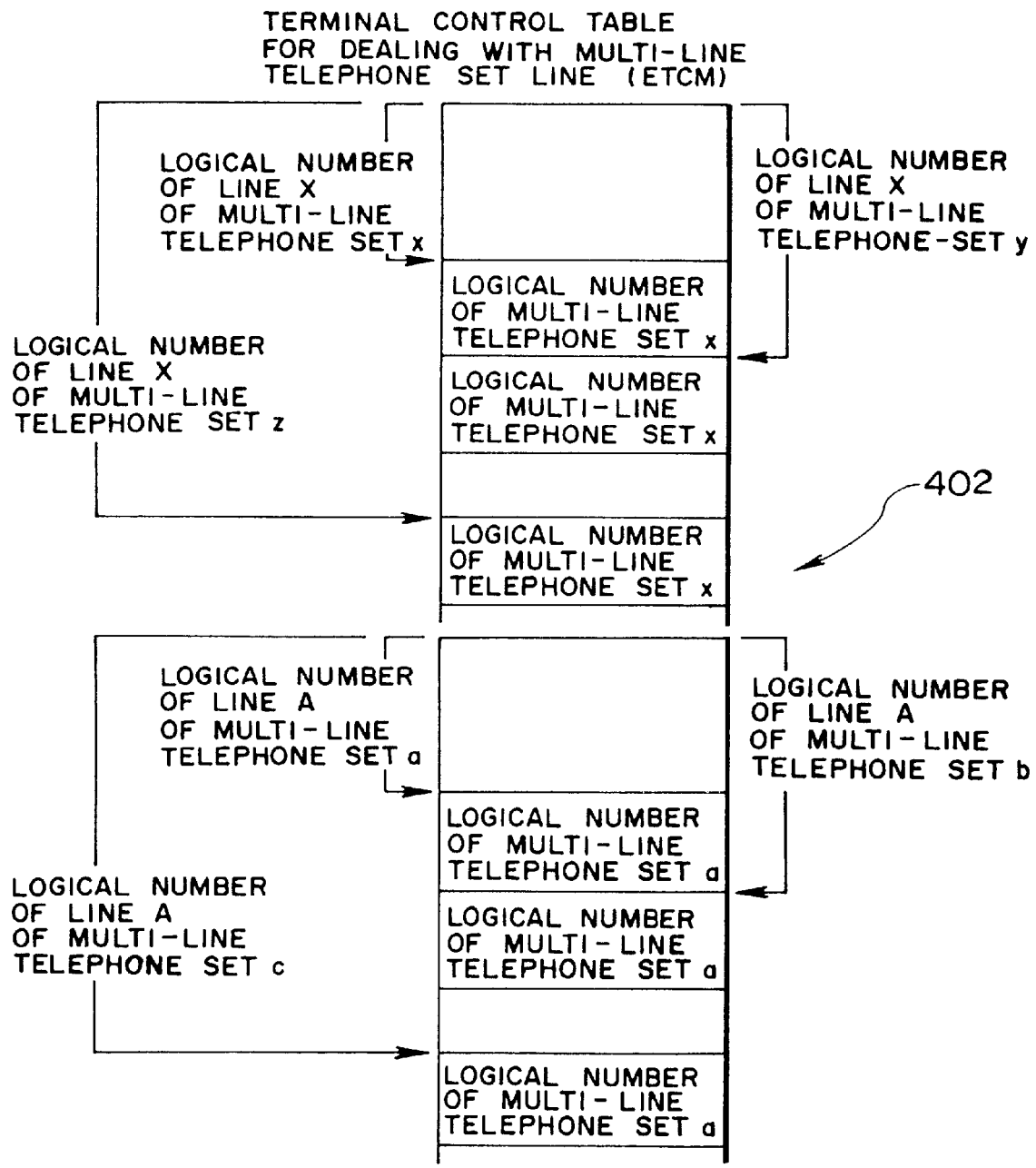
FIG. 36 is a view showing an example of a terminal control table for dealing with line numbers of telephone sets (ETCM) created by a call controller.
Figure 37:
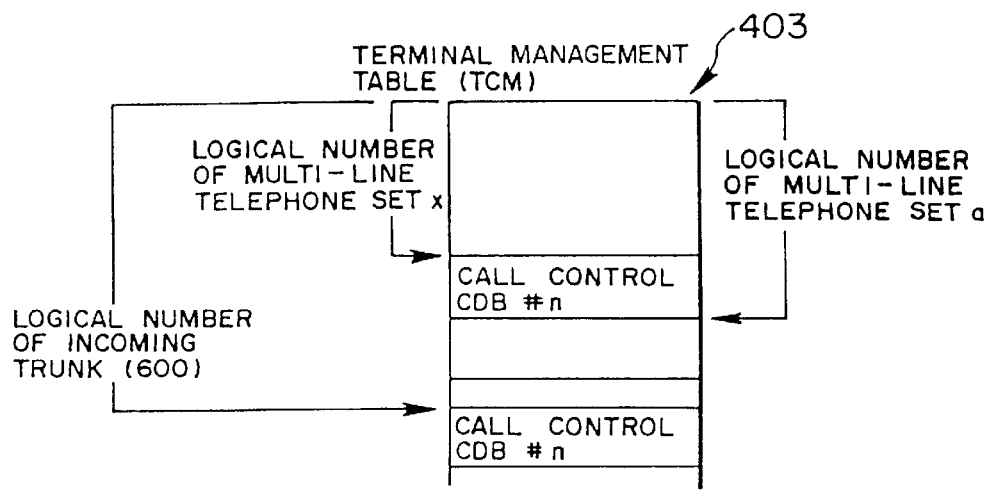
FIG. 37 is a view showing an example of a terminal control table (TCM) created by the call controller.

The call controller 11b creates a terminal control table for line numbers of telephone sets (ETCM) 402, a terminal control table (TCM) 403, call management information (CDB) 404, and so on, like those shown in FIGS. 36 and 37 for each call incoming to one of the telephone sets 12-i (alternatively, the telephone sets 14a to 14c) and stores these in the storage device 11c.

Figure 4:
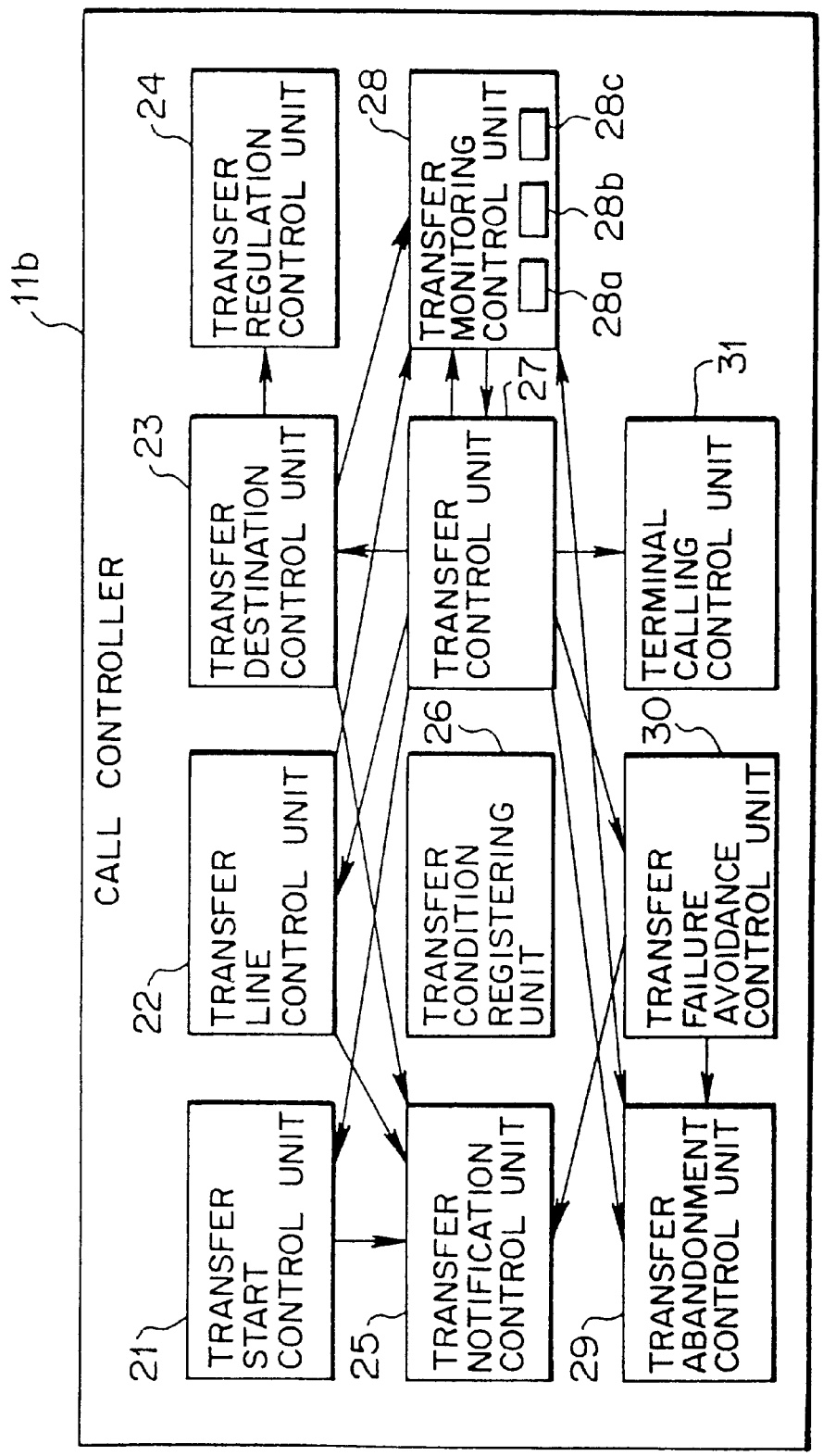
FIG. 4 is a block diagram showing main constituting elements of a call controller in the incoming call transfer controller of the embodiment.

The call controller 11b of the embodiment performs later-described multi-line incoming call transfer control by software. Paying attention to its main sections, for example, as shown in FIG. 4, this call controller 11b includes a transfer start control unit 21, a transfer line control unit 22, a transfer destination control unit 23, a transfer regulation control unit 24, a transfer notification control unit 25, a transfer condition registering unit 26, a transfer control unit 27, a transfer monitoring control unit 28, a transfer abandonment control unit 29, a transfer failure avoidance control unit 30 and a terminal calling control unit 31.

Figure 5:
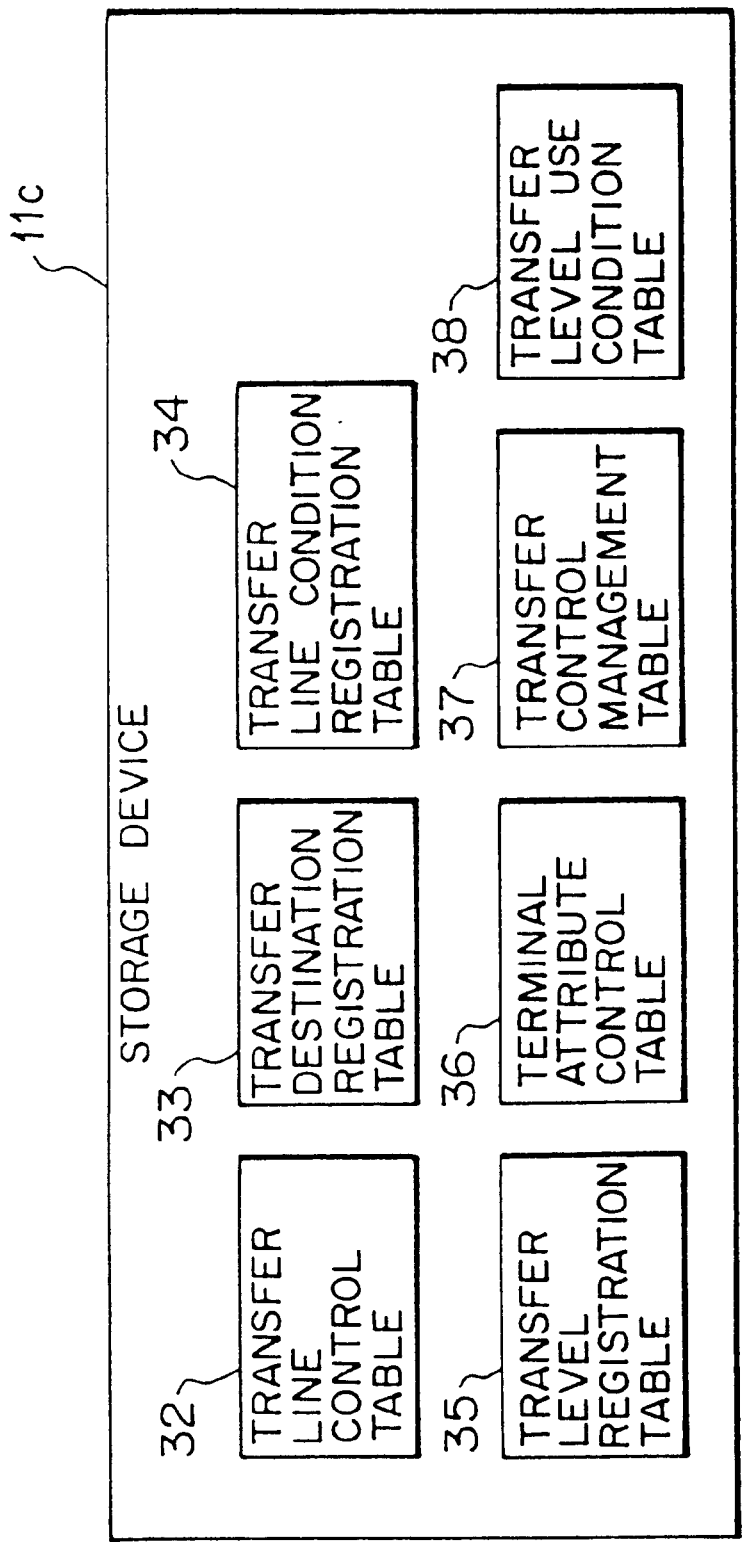
FIG. 5 is a block diagram showing main constituting elements of a storage device in the incoming call transfer controller of the embodiment.

Paying attention to main sections, as shown in FIG. 5, the storage device 11c includes a transfer line control table 32, a transfer destination registration table 33, a transfer line condition registration table 34, a transfer level registration table 35, a terminal attribute control table 36, a transfer control management table 37 and a transfer level use condition table 38.

Figure 6:
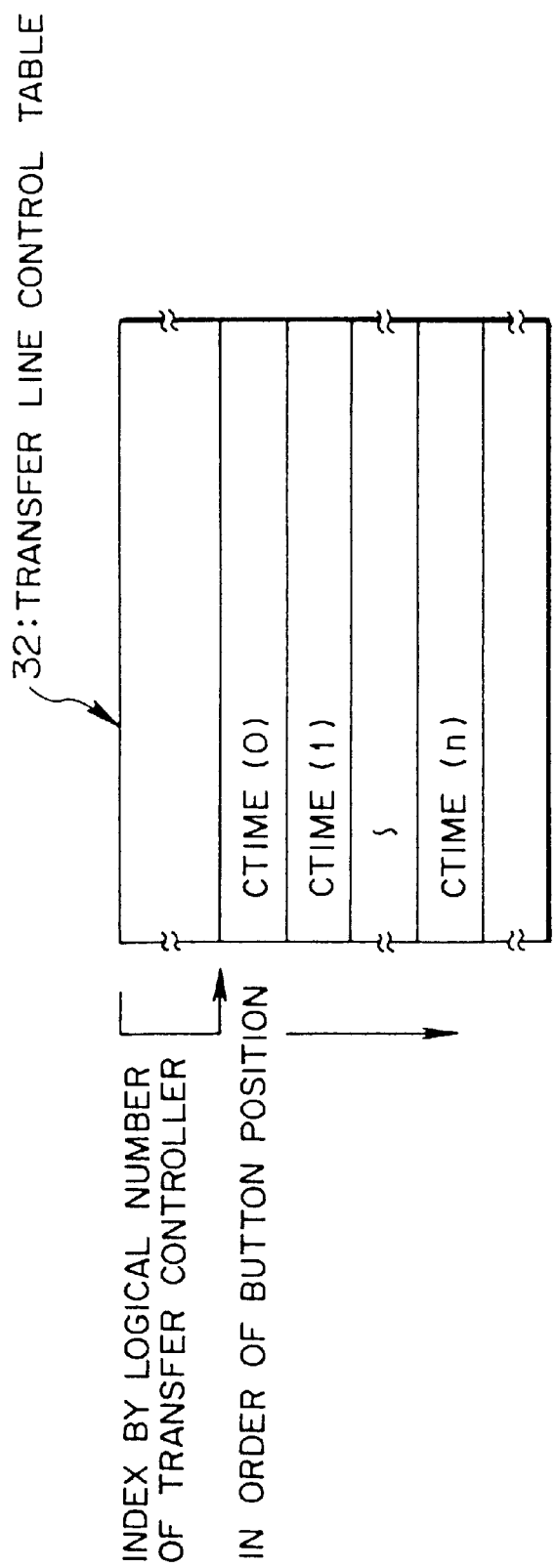
FIG. 6 is a view showing an example of a transfer line management table in the storage device of the embodiment.

In the storage device 11c, as shown in FIG. 6, the transfer line control table 32 controls the calling state of a line number by using an identification number (e.g., prime line number) specific to the telephone set 12-i capable of performing a transfer operation as a logical number and for each logical number (corresponding to each logical number). As described later, in order to identify an incoming call in a longest or shortest calling state, and so on, calling start time information CTIME (n)=[HH. MM. SS] can be registered according to the number of the line number buttons 124-i.

The CTIME (n) (n=0 to N-1) indicates the array of the line number buttons on the telephone set 12-i. Specifically, CTIME (0) is calling start time information regarding the prime line number. Each of CTIME (1) to (n) is calling start time information regarding the sub-line number.

Thus, if [HH. MM. SS] is registered as CTIME (0), the calling start time of the prime line number is HH: MM. SS. If [HH. MM. SS] is registered as CTIME (1), the calling start time of the first sub-line number in the line number array is HH: MM. SS. For CTIME (n) other than one being called, a value nonexistent as an actual time is set (e.g., [FF. FF. FF]).

Figure 7:
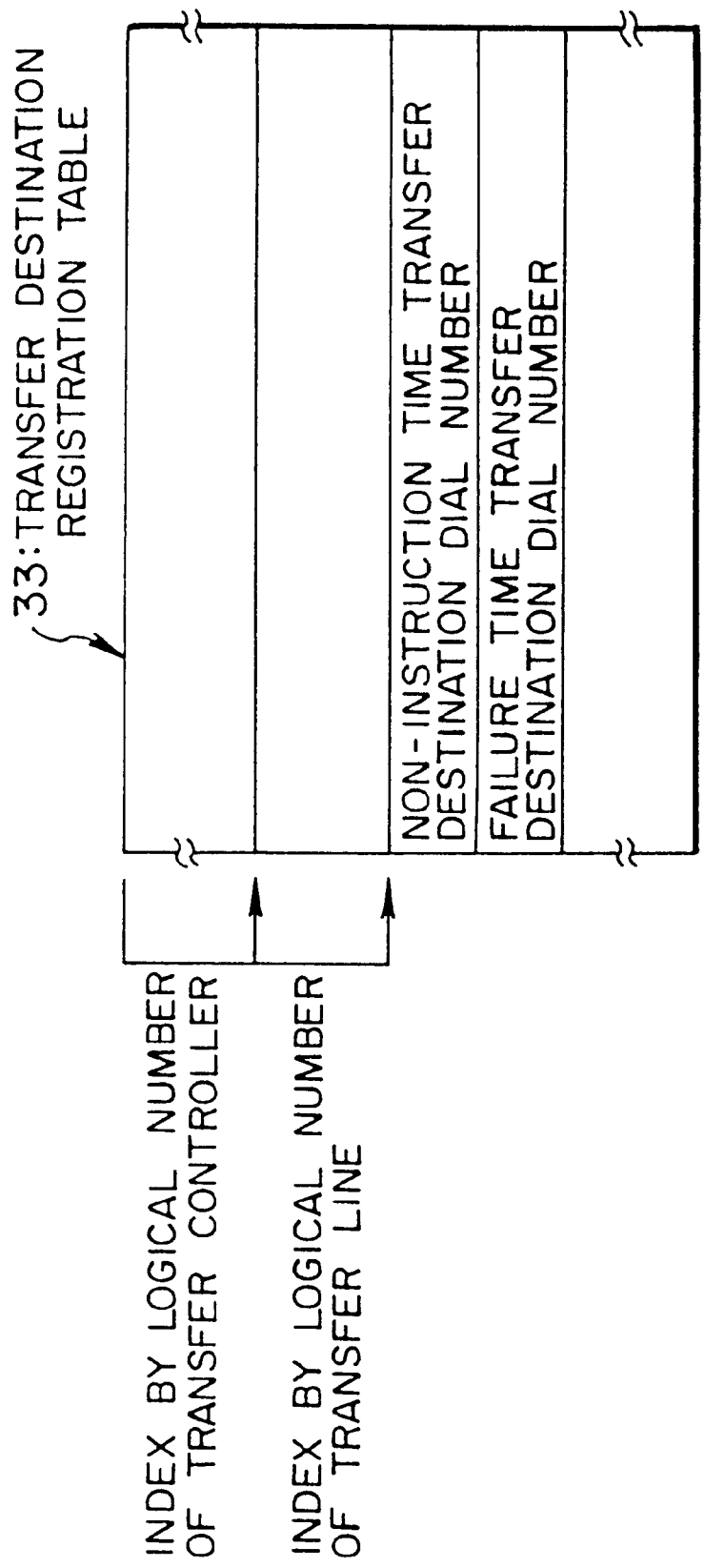
FIG. 7 is a view showing an example of a transfer destination registration table in the storage device of the embodiment.

As shown in FIG. 7, the transfer destination registration table 33 shown in FIG. 5 registers a transfer destination telephone number when no transfer destination telephone number (transfer destination dial number) is inputted (when no instruction is inputted) from the telephone set 12-i which has performed a transfer operation (may be referred to as a transfer control terminal or a transfer controller, hereinafter) and a transfer destination telephone number when the call controller 11b fails in transfer processing for each of the telephone sets 12-i and corresponding to a line number handled by the telephone set 12-i. According to the embodiment, necessary data is registered by the maintenance console 15 (see FIG. 3).

Figure 35:
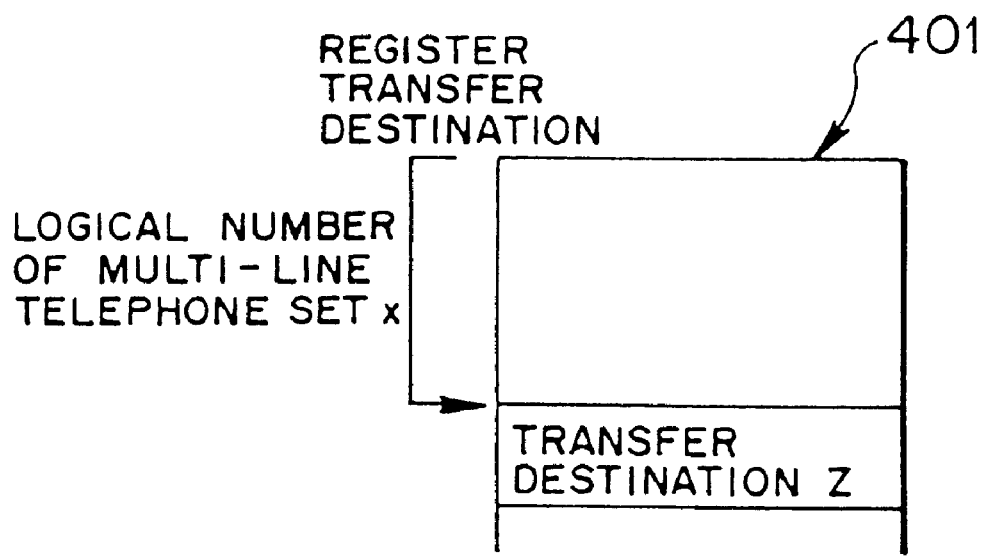
FIG. 35 is a view showing an example of a transfer destination registration table.

In other words, this transfer destination registration table 33 can register a transfer destination different for each line number which each of telephone sets 12-i can handle (up to i×i kinds of transfer destinations) beforehand. The transfer destination registration table 33 is different from the transfer destination registration table 401 described above with reference to FIG. 35.

Figure 8:
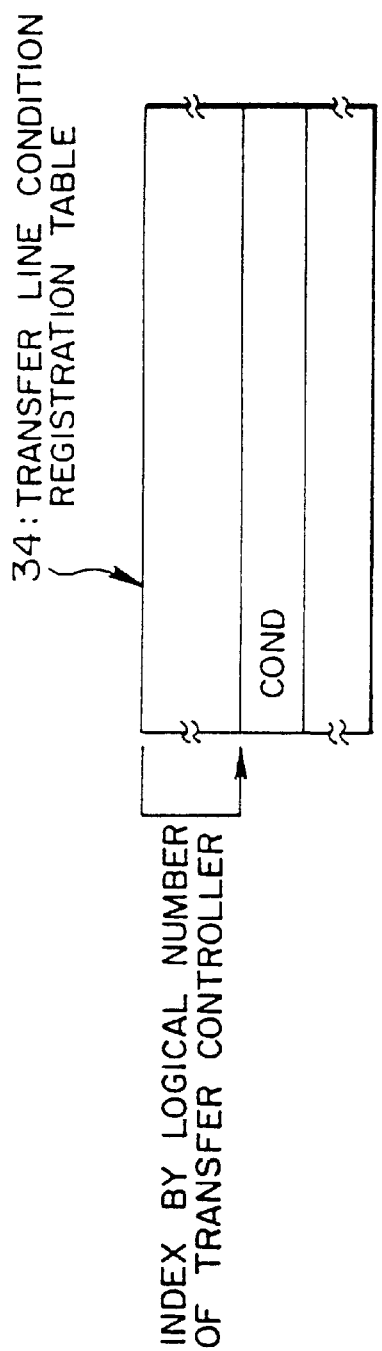
FIG. 8 is a view showing an example of a transfer line condition registration table in the storage device of the embodiment.

The transfer line condition registration table 34 is used when the line number of an incoming call to be transferred is not inputted from the transfer control terminal 12-i. For example, as shown in FIG. 8, this transfer line condition registration table 34 registers a selection condition (COND) for selecting the line number of an incoming call to be transferred corresponding to the logical number of the telephone set 12-i. By changing information registered as such COND, the selection condition for a transfer line number is changed as the occasion may demand.

For example, as shown in FIG. 8, COND=0 is registered for selecting a line number having a longest calling time from the lines to which calls are incoming as a transfer line number. COND=1 is registered for selecting a line number having a shortest calling time from the lines which calls are incoming. Depending on the setting of the selection condition (COND), transfer line numbers can be selected in sequence from the low-numbered one of the line numbers to which calls are incoming or the order of selection can be changed according to a time zone.

Figure 9:
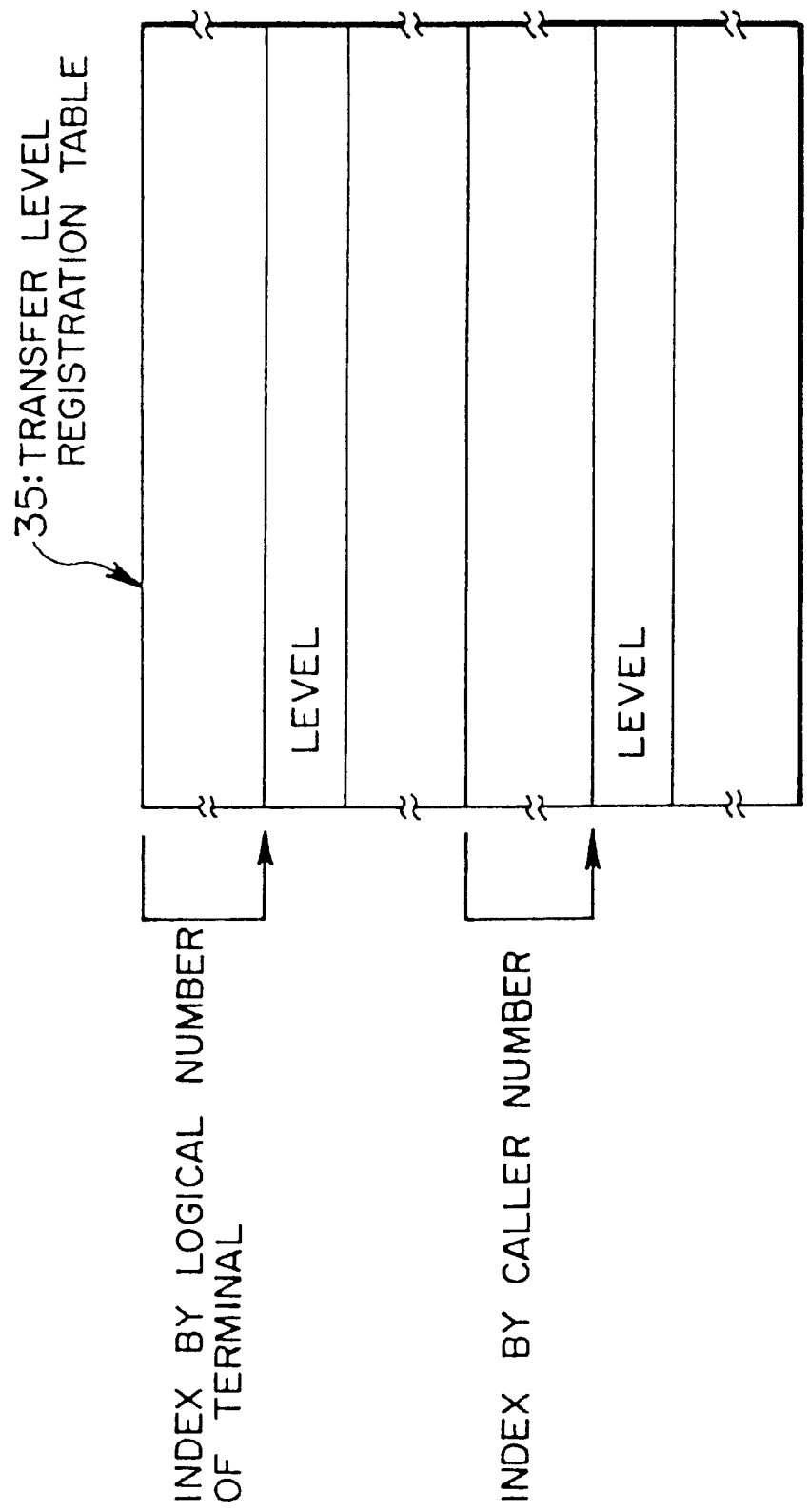
FIG. 9 is a view showing an example of a transfer level registration table in the storage device of the embodiment.

For example, as shown in FIG. 9, the transfer level registration table 35 basically registers a transfer operation level (transfer permissible level: LEVEL) corresponding to the telephone sets 12-i beforehand (in other words, a transfer operation level is allocated to each of the telephone sets 12-i). An integer of 0 or over is set as LEVEL. As described later, by referring to the information registered in the table 35, the transfer regulation control unit 24 of the call controller 11b regulates transfer control performed by the call controller 11b according to the registered LEVEL.

According to the embodiment, assuming that the telephone terminal of a person whose call is transferred (caller) is for dealing with ISDN and a caller number is notified from the caller side, a transfer operation level similar to the above-described level can also be registered in this table 35 for each information regarding the telephone number of the telephone set of a call originator (caller number information).

Figure 10:
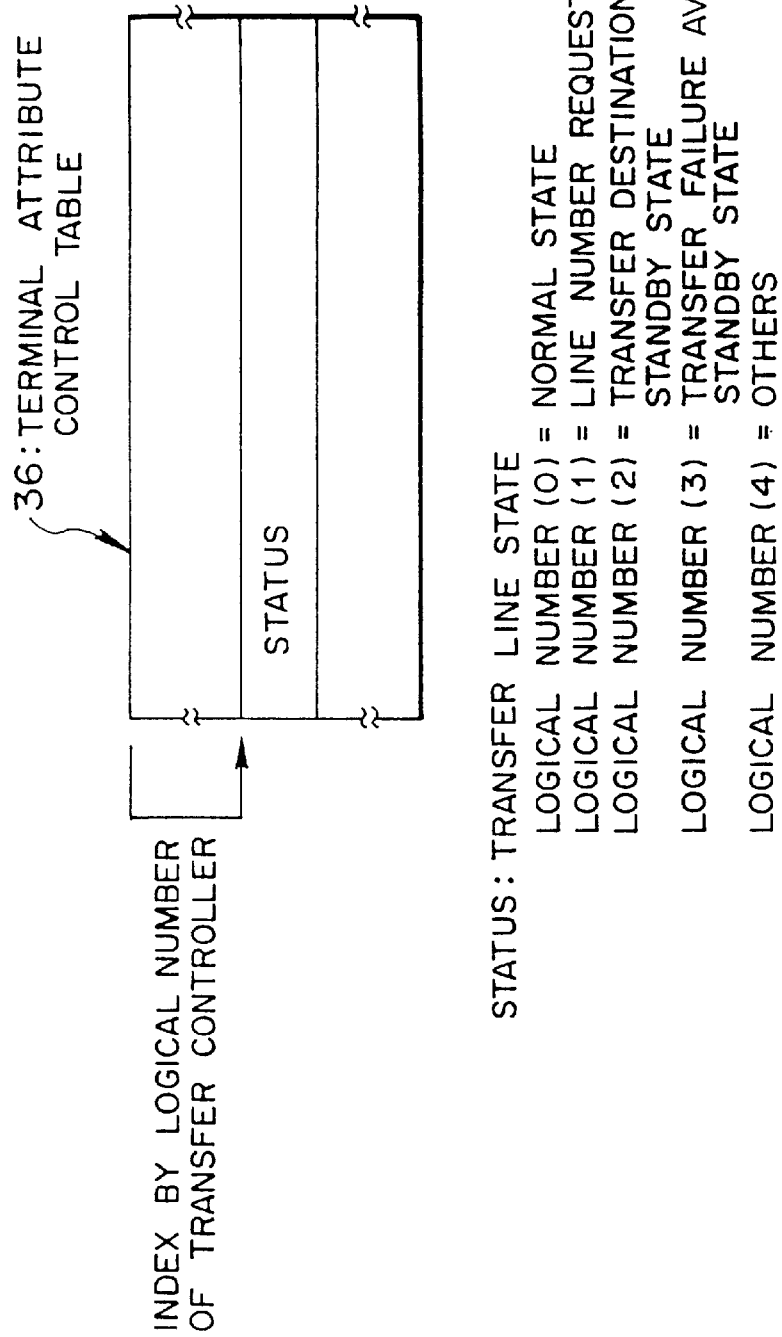
FIG. 10 is a view showing an example of a terminal attribute management table in the storage device of the embodiment.

For example, as shown in FIG. 10, the terminal attribute control table 36 registers the state of a transfer line number (state of transfer control) corresponding to the logical number of each of the telephone sets 12-i. According to the embodiment, the following states 1̂ to 5̂ are registered as logical values (STATUS: 0 to 4). By referring to this table 36, the call controller 11b can always recognize the state of transfer control.

1̂ Normal state→Logical value (0)
2̂ "Line number request standby state" indicating a state of waiting for the input of a transfer line number from the transfer control terminal 12-i→Logical value (1) 3̂ "Transfer destination number standby state" indicating a state of waiting for the input of a transfer destination telephone number from the transfer control terminal 12-i→Logical value (2)
4̂ "Transfer failure avoidance request standby state" indicating a state of waiting for the input of a transfer failure time re-transfer request from the transfer control terminal 12-i→Logical value (3)
5̂ Other states→Logical value (4)

The logical values (STATUS) written according to the states of transfer line numbers can be rewritten when necessary.

Figure 11:
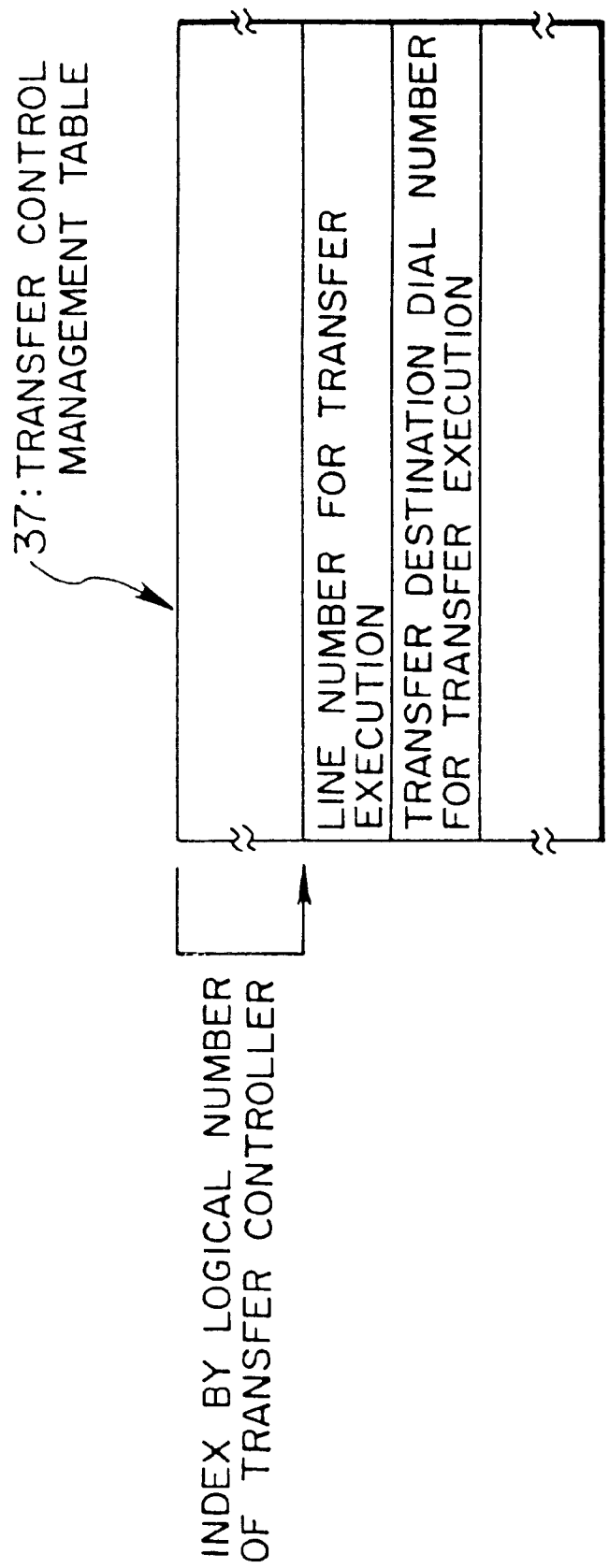
FIG. 11 is a view showing an example of a transfer control management table in the storage device of the embodiment.

As shown in FIG. 11, the transfer control management table 37 registers a line number for actual transfer (transfer execution line number) and a transfer destination telephone number for a call incoming to the line number (transfer execution transfer destination dial number) for each logical number of the telephone set 12-i. The call controller 11b executes transfer control based on the information registered in the table 37 in last step.

As described later, the "transfer execution line number" and the "transfer execution transfer destination dial number" to be registered in the table 37 may be set based on line number information and transfer destination dial number information inputted from the transfer control terminal 12-i. Alternatively, these numbers may be set automatically based on the information registered in each of the transfer destination registration table 33 and the transfer line condition registration table 34.

Figure 12:
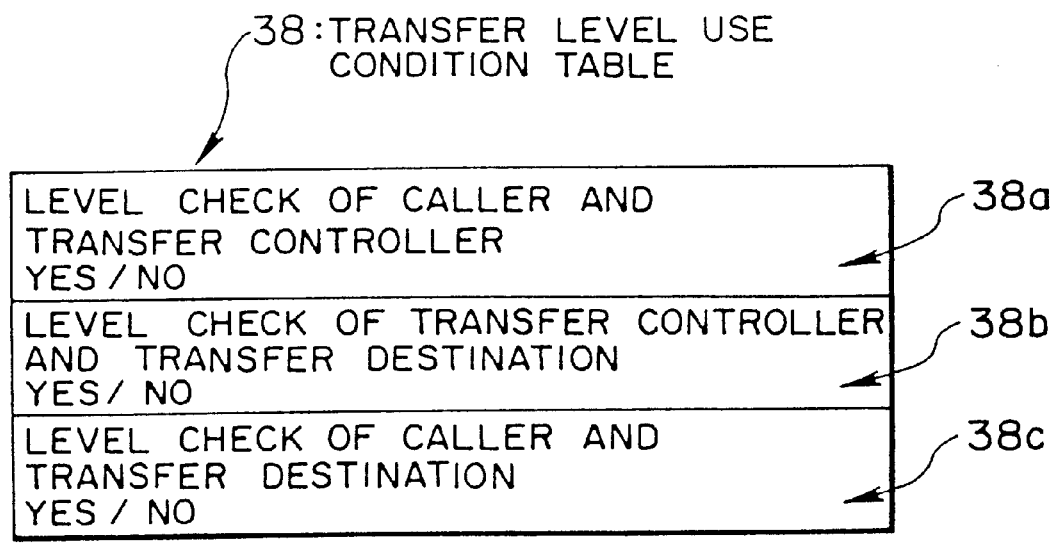
FIG. 12 is a view showing an example of a transfer level use condition table in the storage device of the embodiment.

The transfer level use condition table 38 registers information whether or not to check the transfer operation level registered in the transfer level registration table 35. For example, as shown in FIG. 12, the table 38 registers flags 38a to 38c respectively indicating whether or not to perform level checking (level comparison) between the person whose call is transferred (caller) and the transfer controller 12-i, between the transfer controller 12-i and the transfer destination (telephone set) and between the caller and the transfer destination. These flags 38a to 38c are also registered via the maintenance console 15.

In the call controller 11b, the transfer regulating unit 27 detects various requests and information including a multi-line incoming call transfer request (may be simply referred to as a "transfer request" or a "transfer start request", hereinafter) transmitted from the telephone set (transfer control terminal) 12-i when the transfer service button 126 is pressed in the telephone set 12-i and transfer line number information and transfer destination telephone number information inputted from the transfer control terminal 12-i. According to the embodiment, the other units 21 to 26 and 28 to 31 are started according to the result of this detection.

The transfer start control unit 21 is started when the transfer request is detected by the transfer control unit 27. As described later, after having been started, the transfer start unit 21 sets a "line number request standby state" in the relevant area of the transfer control terminal 12 by referring to the terminal attribute control table 36 of the storage device 11c.

The transfer start control unit 21 performs setting of the line number request standby timer 28a of the later-described transfer monitoring control unit 28 and starting of the transfer notification control unit 25 (in order to give a notice for promoting the input of line number information to the transfer control terminal 12-i).

The transfer line control unit 22 creates line number data (transfer control data). This data is used for deciding a line number for transfer by registering detected transfer line number information in the relevant area ("transfer execution line number") of the transfer control management table 37 (see FIG. 11) when the inputting of the transfer line number information from the transfer control terminal 12 is detected after the transfer request is detected by the transfer control unit 27.

As described later, according to the embodiment, the transfer line control unit 22 performs rewriting of the transfer line state (STATUS) of the terminal attribute control table 36, setting/canceling of the transfer destination number request standby timer 28b and the transfer failure avoidance request standby timer 28c of the transfer monitoring control unit 28 and starting of the transfer notification control unit 25 (in order to give a notice for promoting the input of line number information to the transfer control terminal 12-i).

The transfer destination control unit 23 is started when the input of transfer destination telephone number information from the transfer control terminal 12-i is detected by the transfer control unit 27. The transfer destination control unit 23 creates transfer destination data (transfer control data) by registering the transfer destination telephone number information received from the transfer control unit 27 in the relevant area ("transfer execution transfer destination dial number") of the transfer control management table 37. The transfer destination control unit 23 also determines whether the transfer control terminal 12-i is a terminal permitted transfer control or not.

According to the embodiment, the transfer destination control unit 23 performs transfer of an incoming call (ring tone is rung) to the transfer destination telephone set 12-i (alternatively, any one of the telephone sets 14a to 14c), setting/canceling of the transfer failure avoidance request standby timer 28c of the transfer monitoring control unit 28 and starting of the transfer notification control unit 25 (in order to notify the transfer control unit 12-i of transfer control success/failure) by referring the rewritten transfer line state (STATUS) of the terminal attribute control table 36 and the transfer control management table 37.

The transfer regulation control unit 24 compares the transfer operation levels (high or low) registered in the transfer level registration table 35 (see FIG. 9) with each other according the flags set in the transfer level use condition table 38 (see FIG. 12) and regulates transfer control according to the result of this comparison. For example, according to the embodiment, transfer control for an incoming call is permitted only if the comparison result is one of the following three cases 1̂ to 3̂. Transfer control is prohibited if the comparison result is other than these three cases 1̂ to 3̂.

1̂ A level allocated to the transfer control terminal 12 (control terminal side transfer permissible level) is higher than a level allocated to the caller (transmission terminal side transfer permissible level).

2̂ A level allocated to the transfer control terminal 12 is higher than a level allocated to the transfer destination telephone set 12-i (transfer destination terminal side transfer permissible level).

3̂ A level allocated to the caller is higher than a level allocated to the transfer destination telephone set 12-i.

Thus, the transfer regulation control unit 24 can prevent the mistaken transfer of an incoming call to the telephone set 12-i to which the call should not be transferred (e.g., the telephone set of a superior in conference) or an incoming call from an important customer by the settings of the transfer level registration table 35 and the transfer level use condition table 38.

The transfer notification control unit 25 gives a notice for promoting the input of line number information for an incoming call to be transferred or the input of transfer destination telephone number information to the transfer control terminal 12-i. This control unit 25 also displays/ notifies the result (success/failure) of transfer control on the displaying unit 123 of the transfer control terminal 12-i as character information. The transfer notification control unit 25 includes a function for notifying an incoming call by displaying marks such as characters on the displaying unit 123 of the telephone set 12-i in exact timing with the ringing of a ring tone for the transfer destination telephone set 12-i.

The transfer condition registering unit 26 sets (creates) the transfer destination registration table 33 (see FIG. 7), the transfer line condition registration table 34 (see FIG. 8) and the transfer level registration table (see FIG. 9) in the storage device 11c beforehand based on a maintenance command inputted by the maintenance person of the switching system 11 via the maintenance console 15.

The transfer monitoring control unit 28 monitors the state of transfer control performed by the transfer control unit 27. In the embodiment, according to the result of monitoring, transfer control is performed by automatically creating line number data based on the condition registered in the transfer line condition registration table 34 or transfer destination data based on the transfer destination telephone number data registered in the transfer destination registration table 33.

Thus, as shown in FIG. 4, the transfer monitoring control unit 28 includes a line number request standby timer 28a, a transfer destination number request standby timer 28b and a transfer failure avoidance request standby timer 28c.

The line number request standby timer 28a counts the passage of a specified time after the transfer notification control unit 25 gives a notice for promoting the input of line number information to the transfer control terminal 12-i. If the input of the line number information from the transfer control terminal 12-i is not detected even when time out occurs in the timer 28a, the transfer monitoring control unit 28 resets the counted time, line number data is automatically created based on the information (condition) registered in the transfer line control table 32 and the transfer line condition registration table 34 and then this data is given to the transfer control unit 27.

In actuality, the timer 28a is set (started) by the transfer start control unit 21 after the "line number request standby state" is registered in the terminal attribute control table 36 and a preparation is made for outputting the line number information input request notice from the transfer notification control unit 25 to the transfer control terminal 12-i as described above.

The transfer destination number request standby timer 28b counts the passage of a specified time after the transfer notification control unit 25 gives a notice for promoting the input of transfer destination telephone number information to the transfer control terminal 12-i. If the input of the transfer destination telephone number information from the transfer control terminal 12-i is not detected by the transfer control unit 27 even when time out occurs in the timer 28b, the transfer monitoring control unit 28 resets the counted time and the "non-instruction time transfer destination dial number" (see FIG. 7) registered beforehand in the transfer destination registration table 33 is given to the transfer control unit 27.

In actuality, the timer 28b is set (started) by the transfer line control unit 22 after the "transfer destination number request standby state" is registered in the terminal attribute control table 36 and a preparation is made for outputting the input request notice of transfer destination telephone number information from the transfer notification control unit 25 to the transfer control terminal 12-i as described above.

The transfer failure avoidance request standby timer 28c counts the passage of a specified time after the transfer notification control unit 25 notifies the transfer control terminal 12-i of a "transfer failure". The counted time is reset by the transfer monitoring control unit 28 if the input of a transfer failure avoidance request (re-transfer request) from the transfer control terminal 12-i is not detected by the transfer control unit 27 even when time out occurs in the timer 28c. The transfer abandonment control unit 29 is started and the transfer control is abandoned in its failed state.

The timer 28c is set (started) in the following manner when the cases 1̂ to 3̂ apply.

1̂ If the transfer regulation control unit 24 determines that the telephone set 12-i which has transmitted a transfer request cannot be a transfer control terminal 12-i, → the timer 28c is set by the transfer start control unit 21.

2̂ If the transfer line control unit 22 determines that the "line number request standby state" is not registered in the terminal attribute control table 36 at the time of inputting line number information or that the line number corresponding to the inputted line number information is not in a calling state, → the timer 28c is set by the transfer line control unit 22. 3̂ If the transfer destination control unit 23 determines that the "transfer destination number request standby state" is not registered in the terminal attribute control table 36 at the time of inputting transfer destination information, that the input of line number information is not correct or that connection cannot be made to a transfer destination (when engaged in communication, and so on), → the timer 28c is set by the transfer destination control unit 23.

As shown in FIG. 4, the transfer abandonment control unit 29 terminates and abandons transfer control when the following cases 1̂ to 4̂ apply. In this case, information registered for the transfer control terminal 12-i in the transfer control management table 37 is cleared, STATUS registered for the transfer control terminal 12-i in the terminal attribute control table 36 is changed to a "normal state" and then all the timers 28a to 28c of the transfer monitoring control unit 28 are canceled (reset).

1̂ The transfer control unit 27 detects a transfer control stop request from the transfer control terminal 12-i.

[In the embodiment, a transfer request detected during transfer control is recognized as a request for stopping this transfer control (the transfer controller can stop after the request of an incoming call non-transfer service by pressing the transfer service button 126 and then terminate this service by pressing the transfer service button 126 again).]

2̂ The transfer control unit 27 detects no transfer failure avoidance requests from the transfer control terminal 12-i before time out occurs in the transfer failure avoidance request standby timer 28c of the transfer monitoring control unit 28.

3̂ The "transfer failure avoidance request standby state" is not registered for the transfer control terminal 12-i in the terminal attribute control table 36 even after the transfer failure avoidance control unit 30 is actuated.

4̂ No line number data or transfer destination data necessary for re-transfer control can be created in the transfer failure avoidance control unit 30.

The transfer failure avoidance control unit 30 performs re-transfer control if a transfer avoidance request is inputted from the transfer control terminal 12-i within a specified time after the transfer notification control unit 25 notifies the transfer control terminal 12-i of a "transfer failure" (if a transfer failure avoidance request is detected by the transfer control unit 27 before time out occurs in the transfer failure avoidance request standby timer 28c).

Line number data is automatically re-created based on the information registered in the transfer line control table 32 and the condition registered in the transfer line condition registration table 34. Transfer destination data is also re-created automatically based on the information registered in the transfer destination registration table 33 ("transfer destination dial number at the time of failure": see FIG. 7). The re-transfer control is performed based on each of these data.

The terminal calling control unit 31 sets calling start time information CTIME (n) in the relevant area of the transfer line control table 32 when a certain line number of the telephone set 12-i is placed in a calling state. If the line number is changed from the calling state to another state, the information set in the relevant area of the transfer line control table 32 is cleared.

Figure 13:
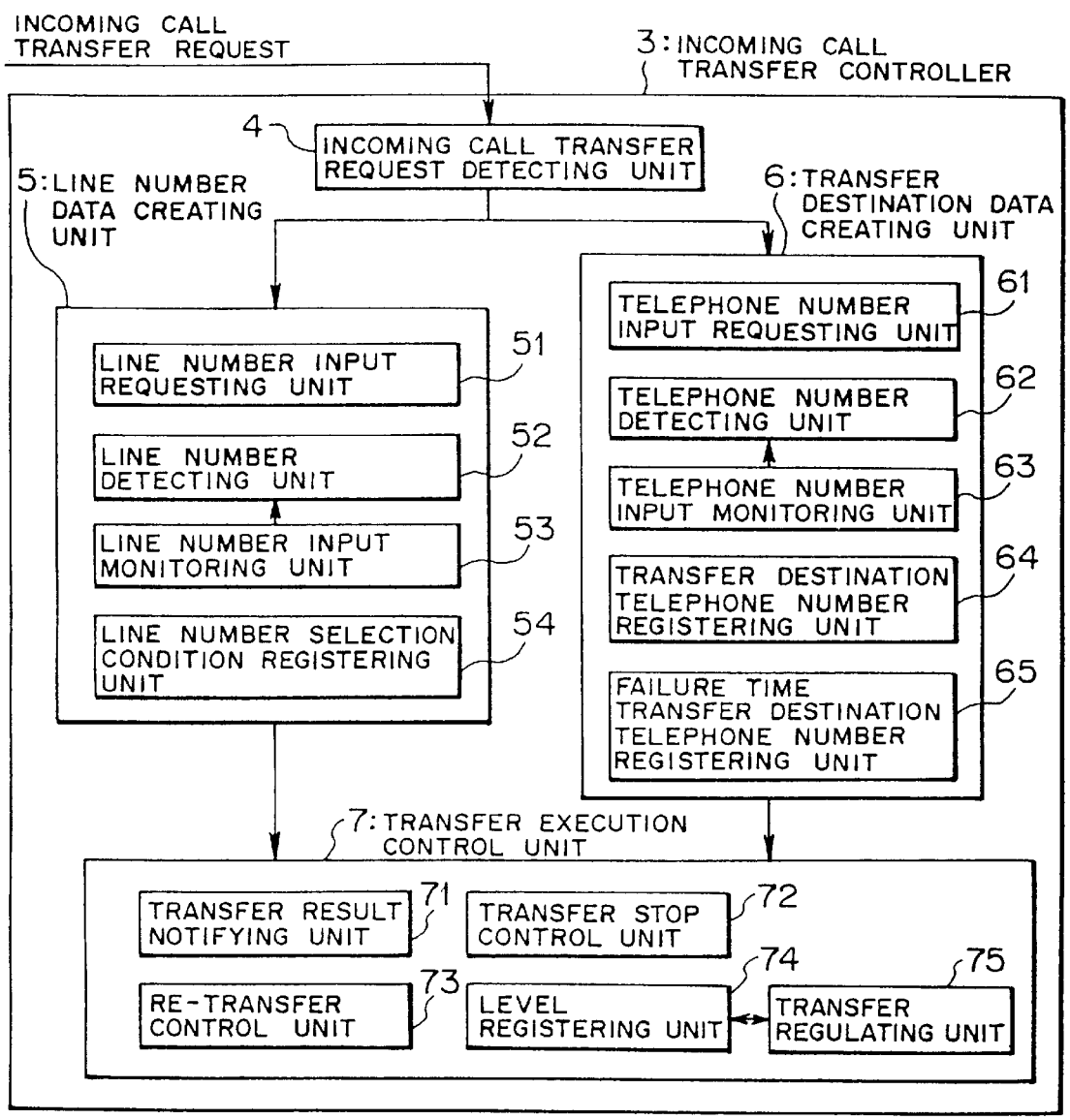
FIG. 13 is a block diagram showing an entire functionally arranged constitution of the incoming call transfer controller of the embodiment.

Referring to FIG. 13, there is shown a functionally arranged constitution of the incoming call transfer controller 3 of the embodiment. The incoming call transfer controller 3 shown comprises an incoming call non-response transfer request detecting unit 4, a line number data creating unit 5, a transfer destination data creating unit 6 and a transfer execution control unit 7.

The incoming call non-response transfer request detecting unit 4 detects an incoming call non-response transfer request transmitted into by a specified non-response transfer operation performed by the transfer control terminal 12-i. This function is realized by the transfer control unit 27. The line number data creating unit 5 creates line number data for deciding a line number for an incoming call to be transferred corresponding to the line number of the transfer control terminal 12-i when the transfer request is detected by the incoming call non-response transfer request detecting unit 4. This function is realized by the transfer line control unit 22 and the transfer control management table 37.

The transfer destination data creating unit 6 creates transfer destination data for deciding a transfer destination for an incoming call to be transferred for each of the transfer control terminals 12-i when the transfer request is detected by the incoming call non-response transfer request detecting unit 4. This function is realized by the transfer destination control unit 23 and the transfer control management table 37.

The transfer execution control unit 7 decides a line number for an incoming call to be transferred and a transfer destination for a call incoming to the line number based on transfer control data regarding the line number data created by the line number data creating unit 5 and the transfer destination data created by the transfer destination data creating unit 6 and performs transfer control for transferring the incoming call to the telephone set 12-i (alternatively, any one of the telephone sets 13a to 13b). This function is realized by the transfer control unit 27, the transfer line control unit 22 and the transfer destination control unit 23.

The line number data creating unit 5 includes a line number input requesting unit 51, a line number detecting unit 52, a line number input monitoring unit 53 and a transfer line selection condition registering unit 54. The transfer destination data creating unit 6 includes a telephone number input requesting unit 61, a telephone number detecting unit 62, a telephone number input monitoring unit 63, a transfer destination telephone number registering unit 64 and a failure time transfer destination telephone number registering unit 65. The transfer execution control unit 7 includes a transfer result notification unit 71, a transfer termination control unit 72, a re-transfer control unit 73, a level registering unit 74 and a transfer regulating unit 75.

In the line number data creating unit 5, the line number input requesting unit 51 requests the transfer control terminal 12-i to input line number information. This function is realized by the transfer notification control unit 25 shown in FIG. 4. The line number detecting unit 52 detects line number information inputted in response to the line number input request made by the line number input requesting unit 51. This function is realized by the transfer control unit 27 shown in FIG. 4.

The line number input monitoring unit 53 monitors whether or not the line number information is detected by the transfer line number detecting unit 52 within a specified time after the line number input requesting unit 51 makes a line number input request. This function is realized by the transfer monitoring control unit 28 and the line number request standby timer 28a shown in FIG. 4. The transfer line selection condition registering unit 54 registers a selection condition for a line number for transfer corresponding to the telephone set 12-i (logical number) beforehand. This function is realized by the transfer condition registering unit 26 shown in FIG. 4 or the transfer line condition registering table 34 shown in FIG. 5.

Thus, the line number data creating unit 5 basically creates line number data based on the transfer line number information from the transfer control terminal 12-i detected by the line number detecting unit 52 after the line number input requesting unit 51 makes an input request. If no line number information is inputted from the transfer control terminal 12-i within a specified time (before time out occurs in the timer 28a of the transfer monitoring control unit 28), the line number data creating unit 5 creates line number data based on the selection condition registered in the transfer line selection condition registering unit 54 (transfer line condition registration unit 34).

As described later, the line number data creating unit 5 can re-create line number data based on transfer line number information re-inputted from the transfer control terminal 12-i during transfer failure avoidance control.

In the transfer destination data creating unit 6, the telephone number input requesting unit 61 requests the transfer control terminal 12-i to input telephone number information. This function is realized performed by the transfer notification control unit 25 shown in FIG. 4. The telephone number detecting unit 62 detects telephone number information inputted in response to the telephone number information input request made by the telephone number input requesting unit 61. This function is realized by the transfer control unit 27 shown in FIG. 4.

The telephone number input monitoring unit 63 monitors whether or not the line number information is detected by the telephone number detecting unit 62 within a specified time after the telephone number input request is made by the telephone number input requesting unit 61. This function is realized by the transfer monitoring control unit 28 or the transfer destination number request standby timer 28b shown in FIG. 4. The transfer destination telephone number registering unit 64 registers transfer destination telephone number information corresponding to the line number of the telephone set 12-i beforehand. This function is realized by the transfer condition registering unit 26 shown in FIG. 4 or the transfer destination registration table 33 shown in FIGS. 5 and 7.

The failure time transfer destination telephone number registering unit 65 registers transfer destination telephone number information used when transfer fails corresponding to the line number of the telephone set 12-i beforehand. As in the case of the transfer destination telephone number registering unit 64, this function is realized by the transfer condition registering unit 26 shown in FIG. 4 or the transfer destination registering table 33 shown in FIGS. 5 and 7.

Thus, the transfer destination data creating unit 6 basically creates transfer destination data based on the telephone number information inputted from the transfer control terminal 12-i. If no line number information is inputted from the transfer control terminal 12-i within a specified time (before time out occurs in the timer 28b of the transfer monitoring control unit 28), the transfer destination data creating unit 6 creates transfer destination data based on the transfer destination number information registered in the transfer destination telephone number registering unit 64. During transfer failure avoidance control, the unit 6 re-creates transfer destination data based on the transfer failure time transfer destination telephone number information registered in the failure time transfer destination telephone number registering unit 65.

As described later, the transfer destination data creating unit 6 can also re-create transfer destination data based on the transfer destination telephone number information re-inputted from the transfer control terminal 12-i during the transfer failure avoidance control.

In the transfer execution control unit 7, the transfer result notifying unit 71 notifies the transfer control terminal 12-i of the result (transfer success/failure) of transferring an incoming call to a transfer destination. This function is realized by the transfer notification control unit 25 shown in FIG. 4. The transfer termination control unit 72 terminates transfer control upon receiving a transfer termination request from the transfer control terminal 12-i during the transfer control for transferring an incoming call to a transfer destination. This function is realized by the transfer abandonment control unit 29 shown in FIG. 4.

The re-transfer control unit 73 performs re-transfer control for an incoming call based on the line number data/transfer destination data created by the line number data creating unit 5/transfer destination data creating unit 6 after receiving a re-transfer control request (transfer failure avoidance request) from the transfer control terminal 12-i if transfer control for an incoming call fails. This function is realized by the transfer failure control unit 30 shown in FIG. 4.

The level registering unit 74 registers a transfer permissible level corresponding to the telephone set 12-i. This function is realized by the transfer condition registering unit 26 shown in FIG. 4 or the transfer level registration table 35 shown in FIGS. 5 and 9. The transfer regulating unit 75 regulates transfer control performed for an incoming call transferred to its destination. This function is realized by the transfer regulation control unit 24 shown in FIG. 4.

(b-2) Operation of the incoming call transfer controller 3

The operation of the incoming call transfer controller 3 constructed in the above-described manner will now be described in detail. (b-2-1) Transfer line number information and transfer destination telephone number information are inputted from the transfer control terminal 12-i.

First, the operation of a normal time when transfer line number information and transfer destination telephone number information are both inputted from the transfer control terminal 12-i will be described by referring to the sequential view of FIG. 14 and the flowcharts of FIGS. 18 to 25 and 28 to 31.

The maintenance engineer of the switching system 11 sets (creates) the transfer destination registration table 33, the transfer line condition registration table 34 and the transfer level registration table 35 in the storage device 11c via the maintenance console 15 before system running. Specifically, the maintenance engineer inputs a maintenance command containing necessary setting data according to data to be set to the switching system 11 (call controller 11b) via the maintenance console.

Figure 18:
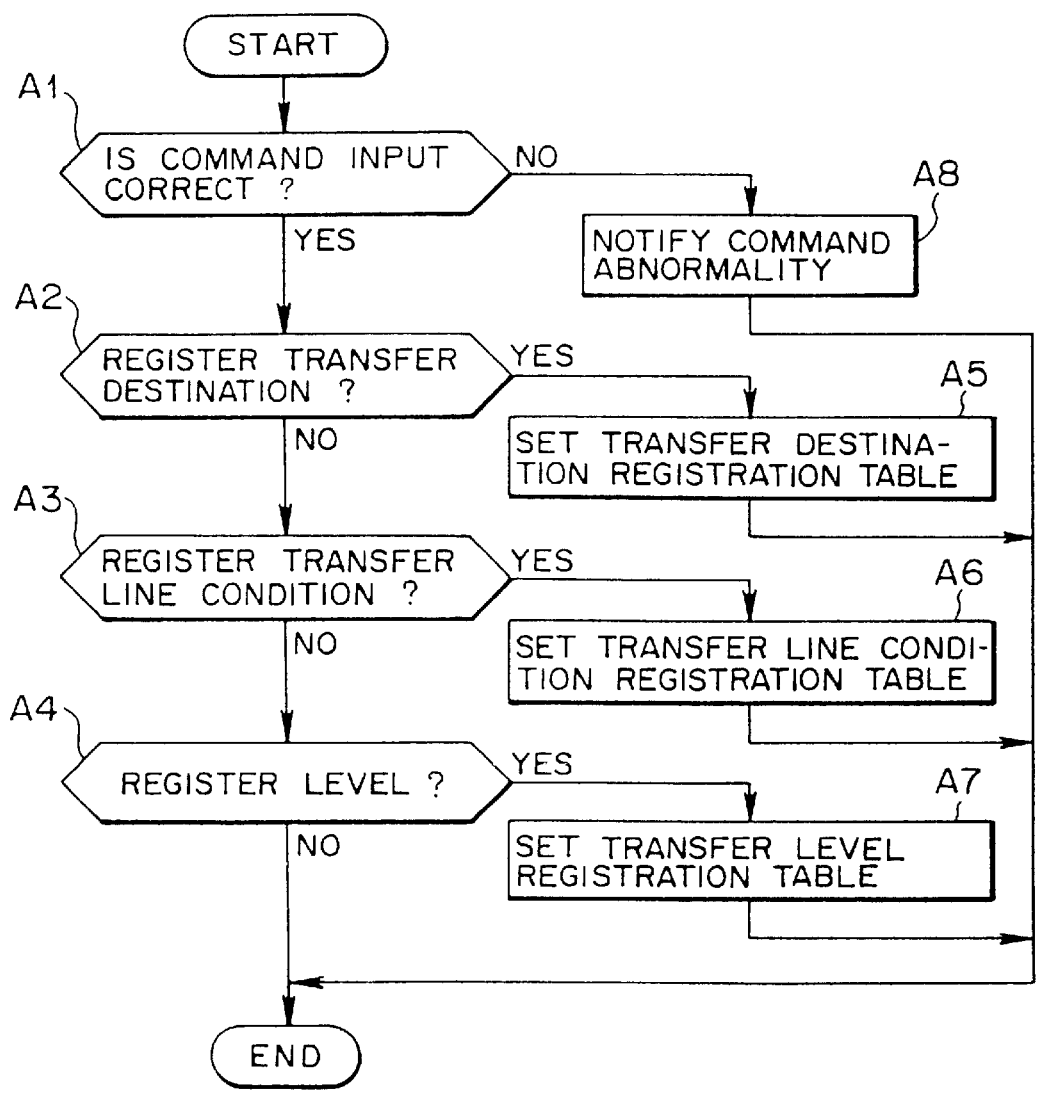
FIG. 18 is a flowchart illustrating an operation of a transfer condition registering unit of the embodiment.

This maintenance command is then received by the transfer condition registering unit 26 of the call controller 11b. As shown in FIG. 18, the transfer condition registering unit 26 checks whether the received maintenance command has been inputted in a correct format (no parts remaining to be set) or not (step A1). If the command has been inputted in a correct format, the transfer condition registering unit 26 then checks which of the classes, "registration of a transfer destination", "registration of a transfer line condition" and "registration of a transfer operation level", the maintenance command belongs to (from YES route of step A1 to steps A2 to A4).

If the result of this checking shows that the maintenance command belongs to the "registration of a transfer destination" class, the transfer condition registering unit 26 then sets a transfer destination registration table 33 like that shown in FIG. 7 in the storage device 11c based on the setting data contained in the maintenance command (YES route of step A2 to step A5). If the command belongs to the "registration of a transfer line condition" class, the transfer condition registering unit 26 sets a transfer line condition registration table 34 like that shown in FIG. 8 in the storage device 11c (YES route of step A3 to step A6). If the command belongs to the "registration of a transfer operation level" class, the transfer condition registering unit 26 sets a transfer level registration table 35 like that shown in FIG. 9 (YES route of step A4 to step A7).

If the maintenance command belongs to none of the classes, "registration of a transfer destination", "registration of a transfer line condition" and "registration of a transfer operation level" (NO determination is made in all of steps A2 to A4), such setting processing is not performed. If the format of the received maintenance command is not correct, command abnormality is notified to the maintenance console 15 (NO route of step A1 to step A8).

Figure 14:
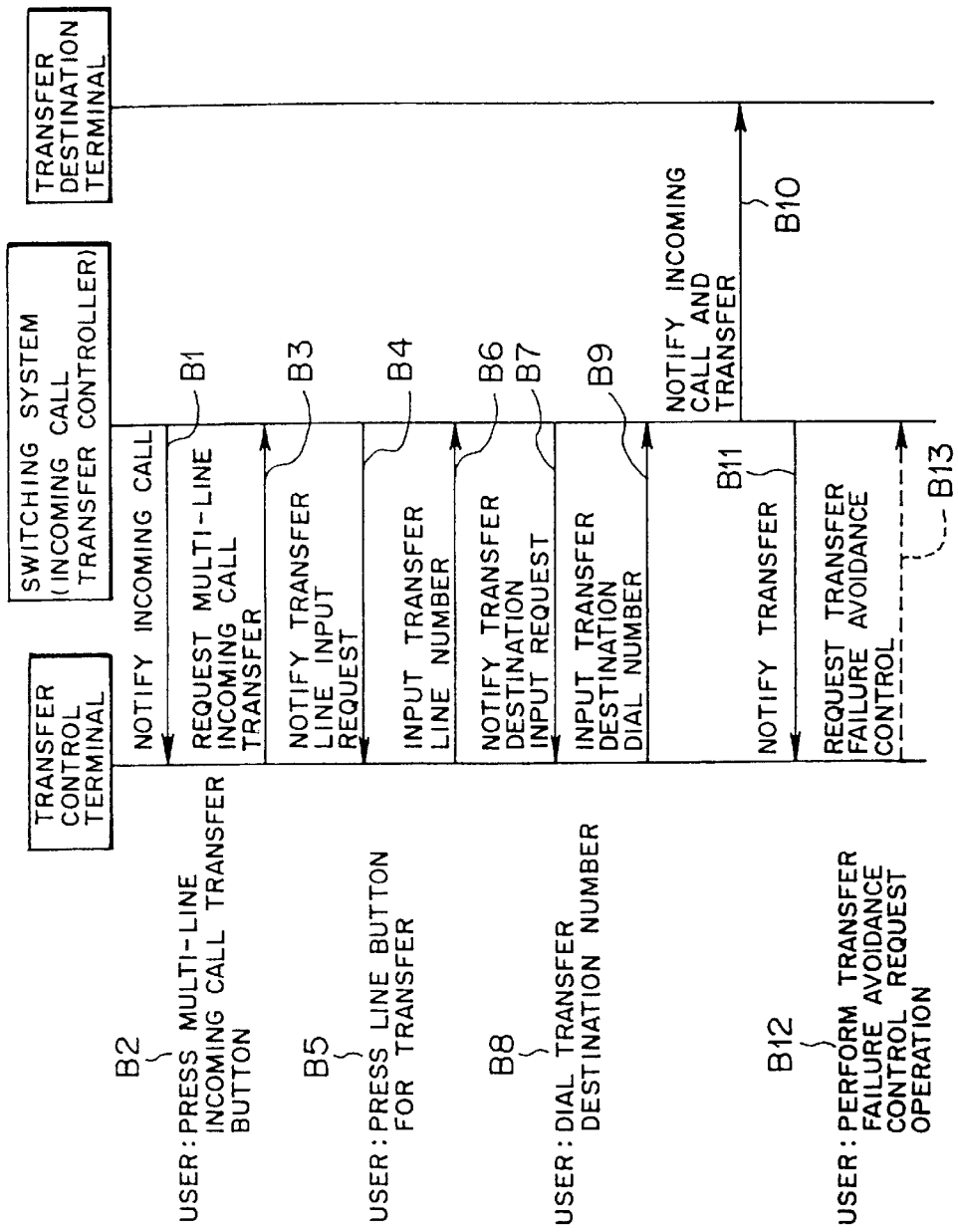
FIGS. 14 to 17 are sequence views each illustrating an operation of the incoming call transfer controller of the embodiment.

It is now assumed that a call comes into a certain line number of one of the telephone sets 12-i from the switching system 11 (call controller 11b) during system running after such table setting processing is finished as shown in FIG. 14 (step B1). Then, in the telephone set 12-i, a ring tone is rung, a display lamp 124-i corresponding to the line number of the incoming call is turned ON-and-OFF, information (caller telephone number, and so on) regarding the originator of the incoming call is displayed on the displaying unit 123 and thereby the incoming call is notified to the user.

Figure 31:
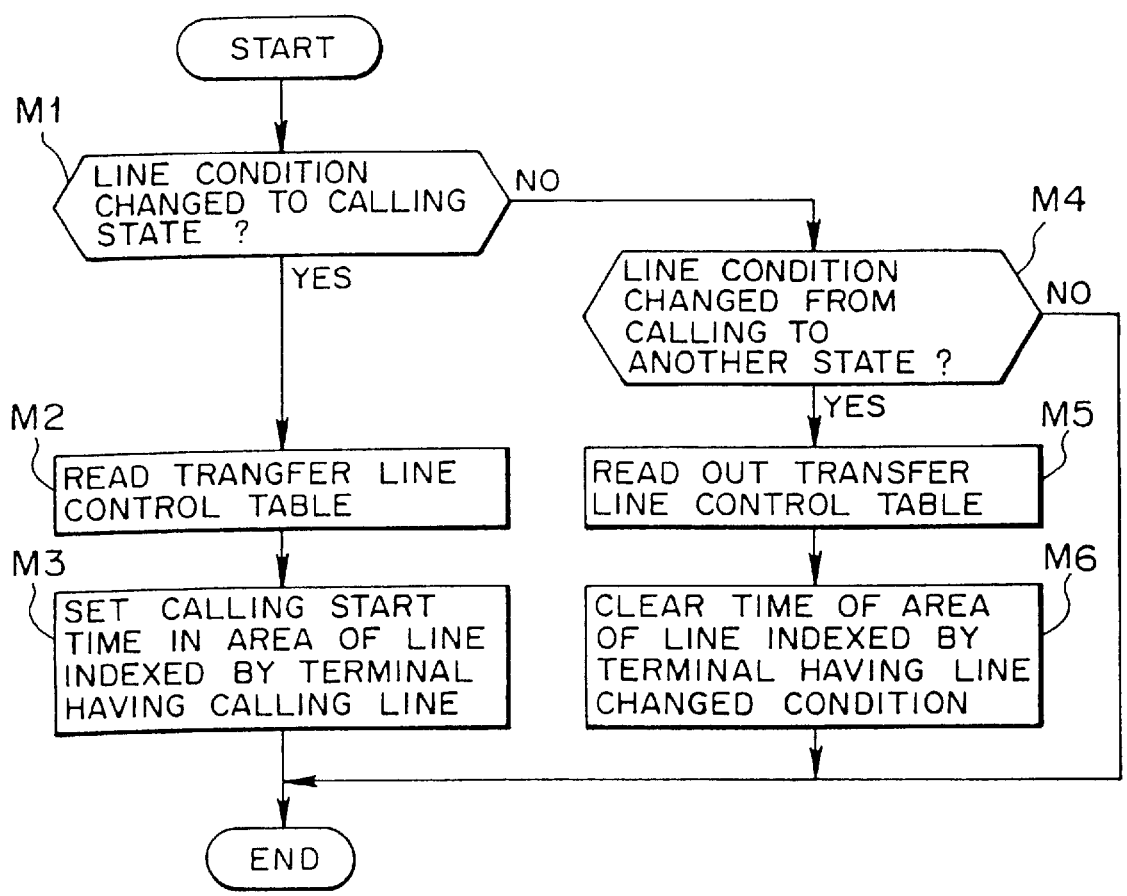
FIG. 31 is a flowchart illustrating an operation of a terminal calling control unit of the embodiment.

In the meantime, as shown in FIG. 31, the terminal calling control unit 31 of the call controller 11b determines whether a line state has been changed for any of the line numbers of the telephone terminals 12-i during calling or not, and alternatively whether any line number has been changed from a calling state to another state (caused by transfer success, user response or the like) or not (NO route of step M1 to NO route of step M4). If a certain line number is placed in a calling state (YES determination in step M1), reference is made to the index of the transfer line control table 32 by using the logical number of the telephone terminal 12-i capable of handling the line number (step M2) and thereby calling start time information CTIME (n) is set in a relevant area (step M3).

In the above-noted condition, if the user performs a non-response transfer operation by pressing the transfer service button 126 (step B2), a transfer start request (multi-line incoming call transfer request) is transmitted from the telephone set (transfer control terminal) 12-i to the switching system 11 (call controller 11b) (step B3).

Figure 19:
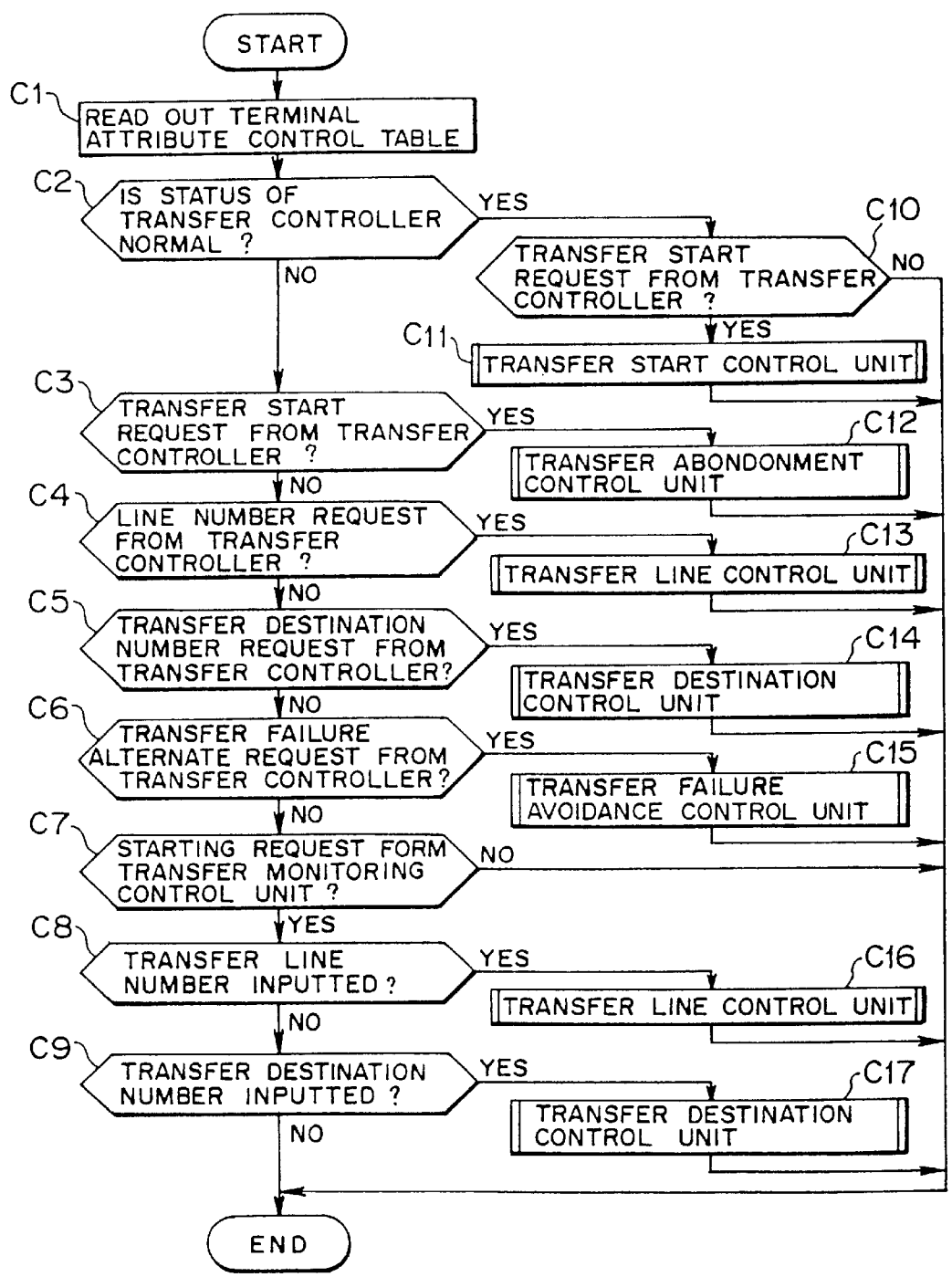
FIG. 19 is a flowchart illustrating an operation of a transfer control unit of the embodiment.

The transfer start request is then received by the transfer control unit 27 and at this time the logical number of the transfer control terminal 12-i which has transmitted the transfer start request is identified. As shown in FIG. 19, in the transfer control unit 27, the terminal attribute control table 36 of the storage device 11c is indexed by using the logical number as a key. By referring to (reading) information (transfer line state: STATUS) registered in a relevant area (step C1), checking is made on whether a "normal state (logical value 0)" has been registered or not (step C2).

In this stage, the transfer line state is an initial state, in other words the "normal state (logical number 0)". Accordingly, the transfer control unit 27 checks whether the transfer start request has been received from the transfer control terminal 12-i or not (YES route of step C2 to step C10). Since the transfer start request has been received as described above, the transfer control unit 27 starts the transfer start control unit 21 (YES route of step C10 to step C11).

Figure 20:
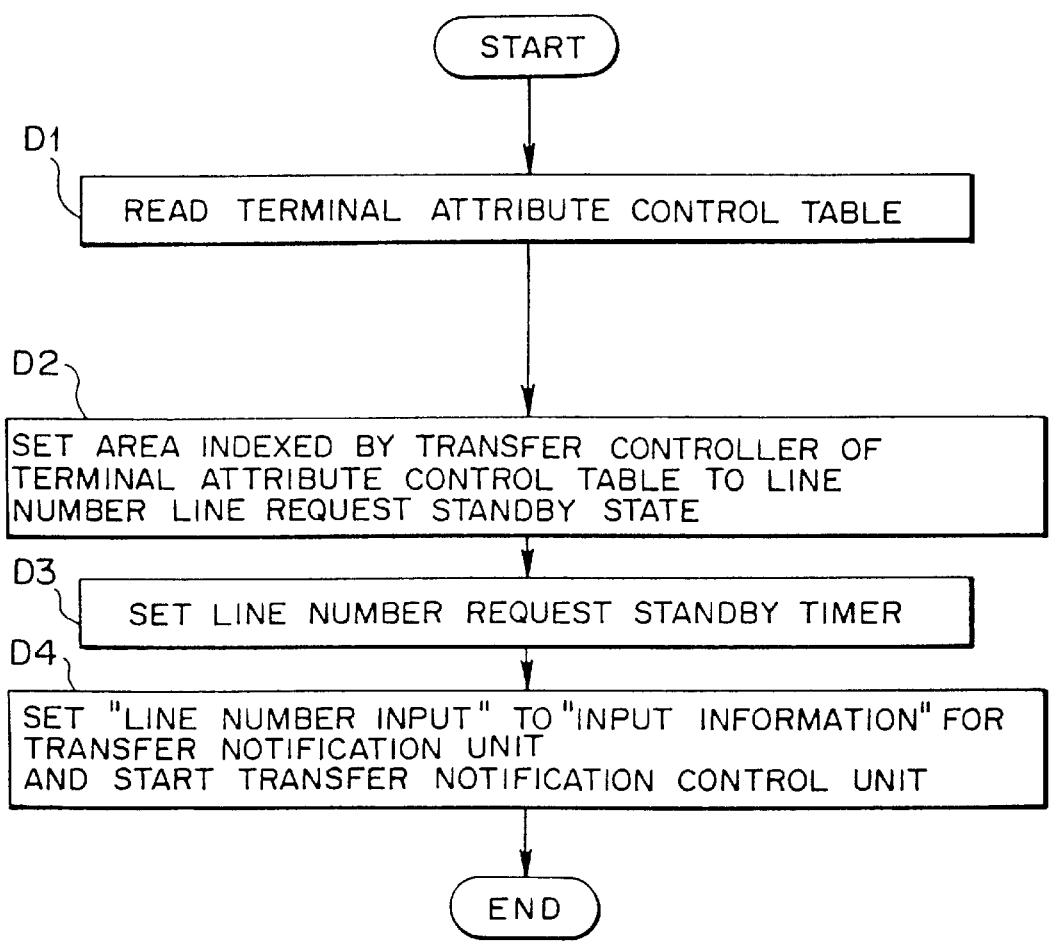
FIG. 20 is a flowchart illustrating an operation of a transfer start control unit of the embodiment.

Then, as shown in FIG. 20, the transfer start control unit 21 refers to (reads) the terminal attribute control table 36 of the storage device 11c by using the logical number of the transfer control terminal 12-i (step D1) and thereby changes the transfer line state (STATUS) of the area corresponding to the transfer control terminal 12-i from the "normal state (logical value 0)" to a "line number request standby state (logical value 1)" (step D2).

The transfer start control unit 21 then sets (starts) the line number request standby timer 28a of the transfer monitoring control unit 28 (step D3). The control unit 21 also sets a "line number input" as information to be inputted to the transfer notification control unit 25 and then starts the transfer notification control unit 25 (step D4).

Figure 24:
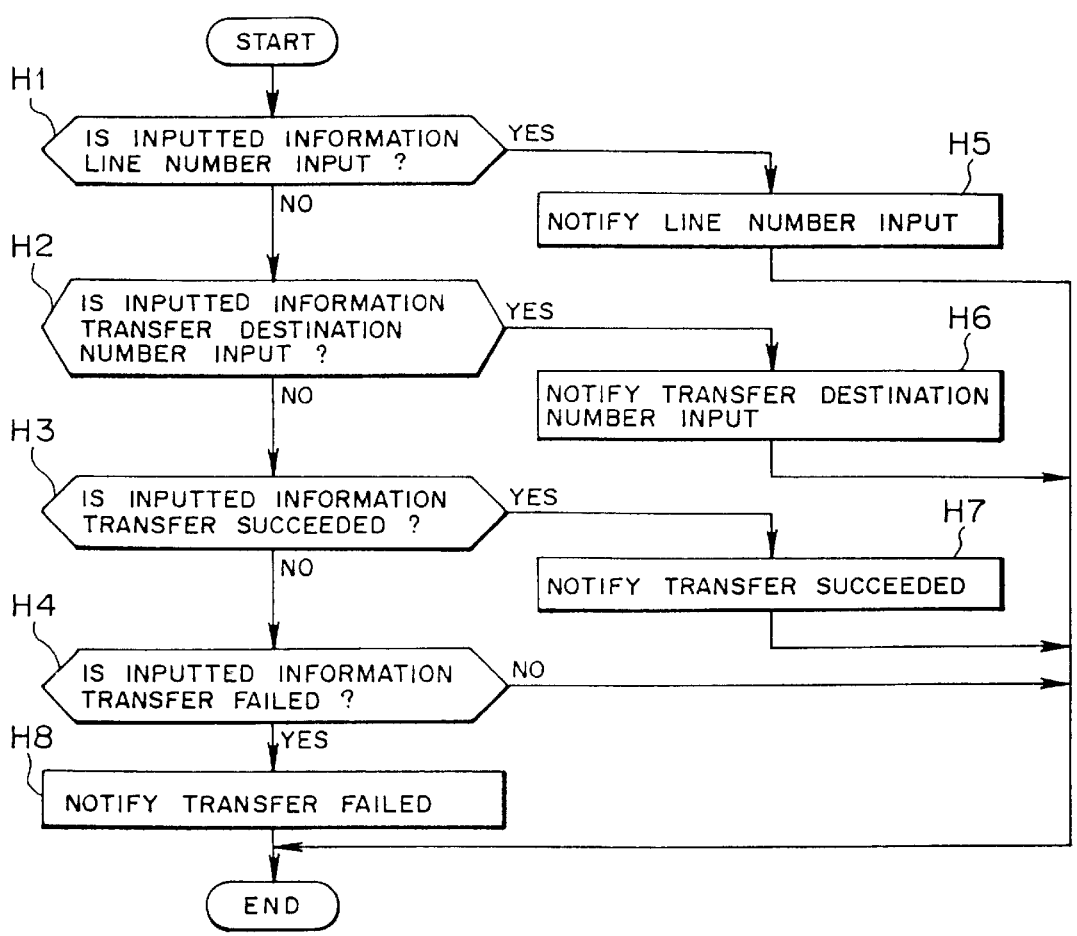
FIG. 24 is a flowchart illustrating an operation of a transfer notification control unit of the embodiment.

Then, as shown in FIG. 24, the transfer notification control unit 25 determines which of the classes, a "line number input", a "transfer destination number input", a "transfer success" and a "transfer failure", the inputted information belongs to (steps H1 to H4). Since the inputted information belongs to the "line number input" class as described above (YES determination in step Hi), the transfer notification control unit 25 outputs a line number input request notice for promoting the input of a line number to the transfer control terminal 12-i [step H5 (step B4 shown in FIG. 14)].

Figure 25:
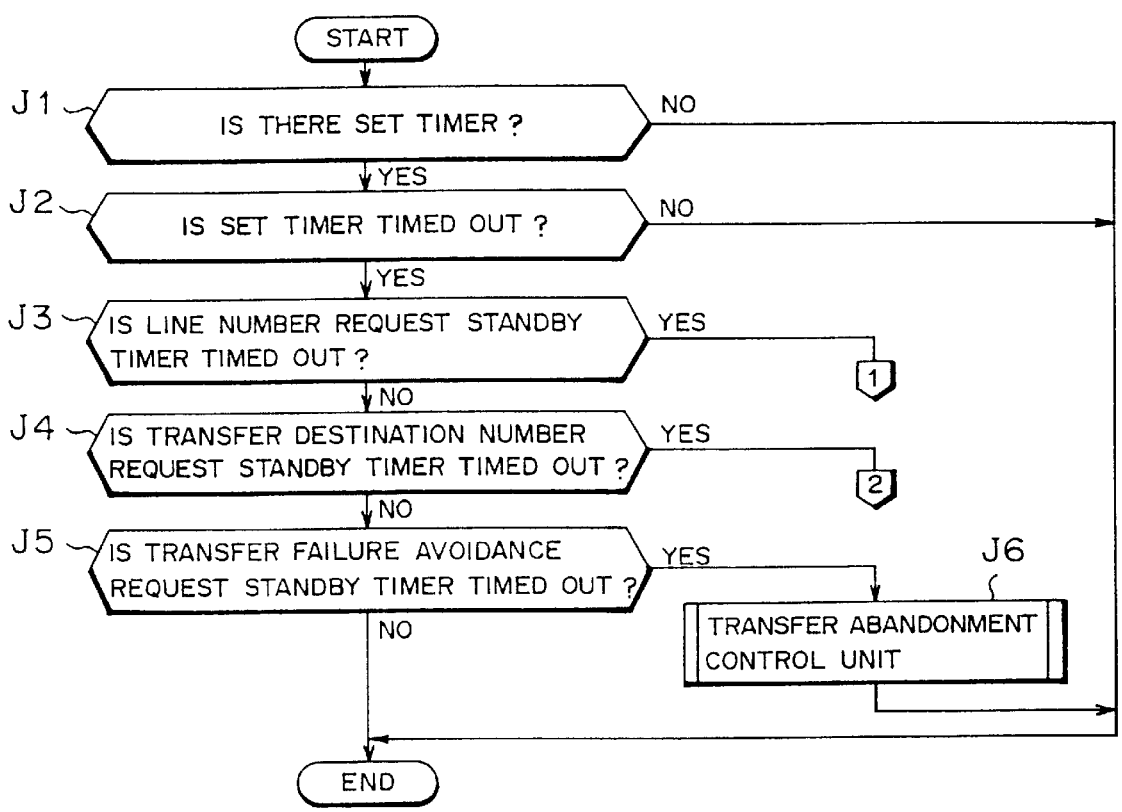
FIGS. 25 to 27 are flowcharts each illustrating an operation of a transfer monitoring control unit of the embodiment.

In the meantime, as shown in FIG. 25, the transfer monitoring control unit 28 determines which of the timers 28a to 28c has been started (step J1). Since the timer 28a has been started by the transfer start control unit 21 as described above (YES determination in step J1), monitoring is continued to see if time out (expiration) occurs in the timer 28a (step J2). If none of the timers 28a to 28c have been started, then the transfer monitoring control unit 28 performs no particular processing (NO route in step J1).

In the transfer control terminal 12-i which has received the line number input request notice, a message such as "select (input) line number" or the like is displayed on the displaying unit 123. Then, as shown in FIG. 14, if the transfer controller selects a line number by pressing any one of the line number buttons 124-i upon receiving the message (step B5), the line number is inputted as transfer line number information to the switching system 11 (call controller 11b) (step B6).

Then, the transfer line number information is received by the transfer control unit 27. As shown in FIG. 19, by referring to the index of the terminal attribute control table 36 based on the logical number of the transfer control terminal 12-i as a key (step C1), the transfer control unit 27 determines whether STATUS of the relevant area is a "normal state (logical value 0)" or not (step C2).

In this stage, since STATUS has been changed to the "line number request standby state (logical value 1)" as described above, the transfer control unit 27 determines which of the classes, a transfer start request, transfer line number information, transfer destination telephone number information, a transfer failure avoidance request and a starting request from the transfer monitoring control unit 28, the received information belongs to (NO route of step C2 to steps C3 to C7).

Figure 21:
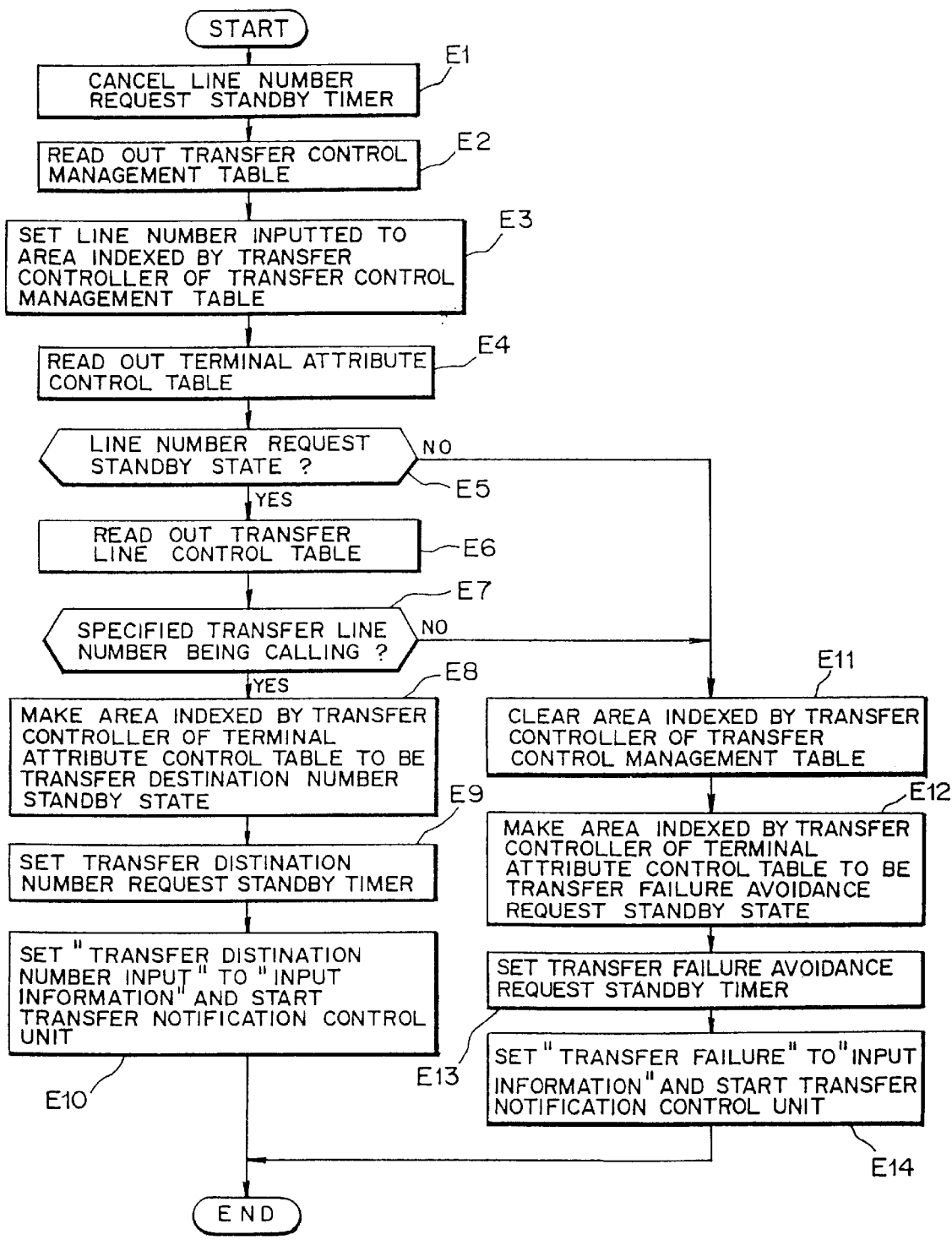
FIG. 21 is a flowchart illustrating an operation of a transfer line control unit of the embodiment.

Since the received information belongs to the class of the line number information (YES determination in step C4), the transfer control unit 27 starts the transfer line control unit 22 (transfers the transfer line number information to the transfer line control unit 22: step C13). Then, as shown in FIG. 21, the transfer line control unit 22 resets (cancels) the timer 28a (step E1), refers to the index of the transfer control management table 37 (see FIG. 11) by using the logical number of the transfer control terminal 12-i as a key (step E2), sets the transfer line number information received from the transfer control unit 27 in a relevant area (spot) and then creates line number data (step E3).

Thus, the transfer line control unit 27 dynamically creates data for deciding a transfer line number for each line number of the transfer control terminal 12-i. In this case, the transfer controller leads the creation of the line number data based on the line number information inputted from the transfer control terminal 12-i in the transfer line control unit 27.

In this case, since the timer 28a has been reset before time out occurs as described above, the transfer monitoring control unit 28 performs no particular processing (NO route of step J2 shown in FIG. 25).

Then, the transfer line control unit 22 refers to the index of the terminal attribute control table 36 by using the logical number of the transfer control terminal 12-i as a key (step E4) and checks whether the STATUS of the relevant area is a "line number request standby state" or not (step E5). Since the STATUS of the area has been set to the "line number request standby state" as described above (see step D2 of FIG. 20), the transfer line control unit 22 refers to the index of the transfer line control table 32 by using the logical number as a key (step E6) and checks whether calling start time information CTIME (n) (see FIG. 6) corresponding to the transfer line number is other than a logical value (FF. FF. FF) or not (in other words, placed in a calling state or not) (step E7).

If the result of the checking shows that the line number of the transfer control terminal 12-i corresponding to the transfer line number information inputted from the transfer control terminal 12-i is being called (YES determination in step E7), then the transfer line control unit 22 changes the STATUS of the relevant area on the terminal attribute control table 36 from the "line number request standby state" to a "transfer destination number request standby state (logical value 2)" (step E8) and starts the transfer destination number request standby timer 28b of the transfer monitoring control unit 28 (step E9).

Then, the transfer line control unit 22 sets a "transfer destination number input" as information inputted to the transfer notification control unit 25 and starts the transfer notification control unit 25 (step E10). As shown in FIG. 24, since the inputted information is a "transfer destination number input" (YES determination in step H2), the transfer notification control unit 25 outputs a transfer destination input request notice for promoting the input of a transfer destination telephone number to the transfer control terminal 12-i [step H6 (step B7 shown in FIG. 14)].

Then, as shown in FIG. 25, since the timer 28b has been started by the transfer start control unit 21 as described above (YES determination in step J1), the transfer monitoring control unit 28 continues its monitoring to see if time out (expiration) occurs in the timer 28b (step J2).

In the transfer control terminal 12-i which has received the transfer destination input request notice, a message such as "input the telephone number of a transfer destination" is displayed on the displaying unit 123. Then, as shown in FIG. 14, after having received the message, the transfer controller dials the telephone number of the transfer destination by using a dial key 122 (see FIG. 3) (step B8). The dial number is then inputted as transfer destination telephone number information to the switching system 11 (call controller 11b) (step B7).

This transfer destination telephone number information is received by the transfer controller 27. In this case, as shown in FIG. 19, the transfer control unit 27 refers to the index of the terminal attribute control table 36 by using the logical number of the transfer control terminal 12-i as a key (step C1) and determines whether the STATUS of the relevant area is a "normal state (logical value)" or not (step C2).

In this stage, since the STATUS has been changed to the "transfer destination number request standby state (logical value 2)" as described above, the transfer control unit 27 determined which of the classes, a transfer start request, transfer line number information, transfer destination telephone number information, a transfer failure avoidance request and a starting request from the transfer monitoring control unit, the received information belongs to (NO determination of step C2 to steps C3 to C7).

Figure 22:
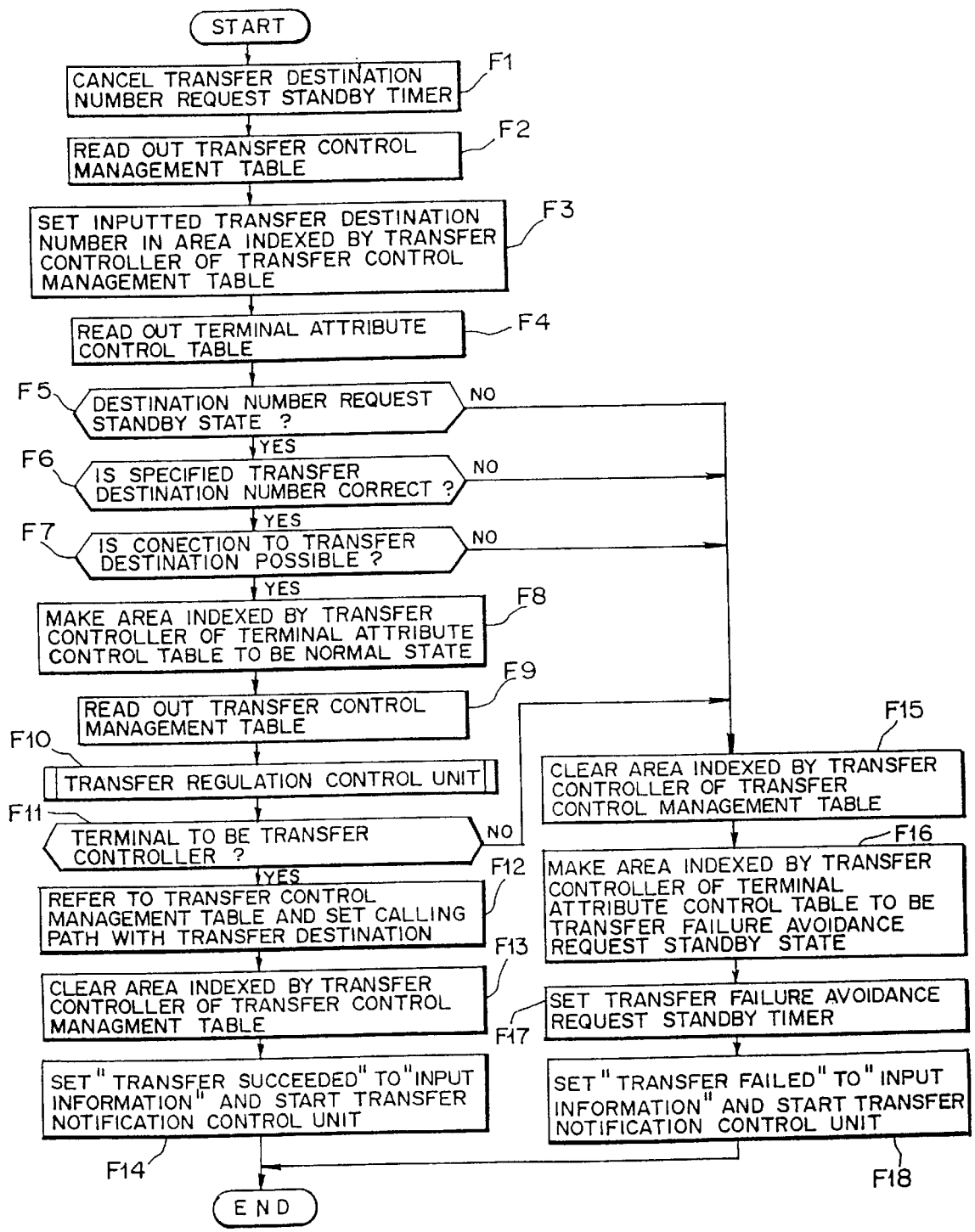
FIG. 22 is a flowchart illustrating an operation of a transfer destination control unit of the embodiment.

Since the received information belongs to the class of the transfer destination telephone number information (YES determination in step C5), the transfer control unit 27 starts the transfer destination control unit 23 (transfers the transfer destination telephone number information to the transfer destination control unit 23: step C14). Then, as shown in FIG. 22, the transfer destination control unit 23 resets (cancels) the timer 28b (step F1), refers to the index of the transfer control management table 37 (see FIG. 11) by using the logical number of the transfer control terminal 12-i (step F2), sets the transfer destination telephone number information received from the transfer control unit 27 in a relevant area (spot) and then creates transfer destination data (step F3).

Thus, the transfer destination control unit 23 dynamically creates data for deciding a transfer destination for an incoming call for each line number of the transfer control terminal 12-i. In this case, the transfer controller leads the creation of the transfer destination data based on the transfer destination telephone number information inputted from the transfer control terminal 12-i in the transfer destination control unit 23.

In this case, since the timer 28b has been reset before time out occurs as described above, the transfer monitoring control unit 28 performs no particular processing (NO route in step J2 shown in FIG. 25).

Then, the transfer destination control unit 23 refers to the index of the terminal attribute control table 36 by using the logical number as a key (step F4) and checks whether the STATUS of a relevant area has been placed in a "transfer destination number request standby state (logical value 2)" or not (step F5). Since the STATUS of the area has been placed in the "transfer destination number request standby state" as described above (YES determination in step F5), the transfer destination control unit 23 then checks whether the inputted transfer destination telephone number information is correct or not (e.g., whether or not the number of digits is correct or whether or not the telephone number exists) (step F6).

If the result of this checking shows that the inputted transfer destination telephone number information is correct (YES determination in step F6), the transfer destination control unit 23 then checks the possibility of connection to the telephone set 12-i of the transfer destination telephone number (whether the telephone set is engaged in communication or not) (step F7). If the connection is possible (YES determination in step F7), the control unit 23 then changes the STATUS of the area on the terminal attribute control table 36 from the "transfer destination number request standby state (logical value 2)" to a "normal state (logical value 0)" (step F8).

Then, the transfer destination control unit 23 refers to the index of the transfer control management table 37 by using the logical number of the transfer control terminal 12-i as a key, reads information (transfer execution line number or transfer execution transfer destination dial number) registered in an area for the transfer control terminal 12-i (steps F9 and F10) and then starts the transfer regulation control unit 24 by outputting the read information thereto (step F10).

Figure 23:
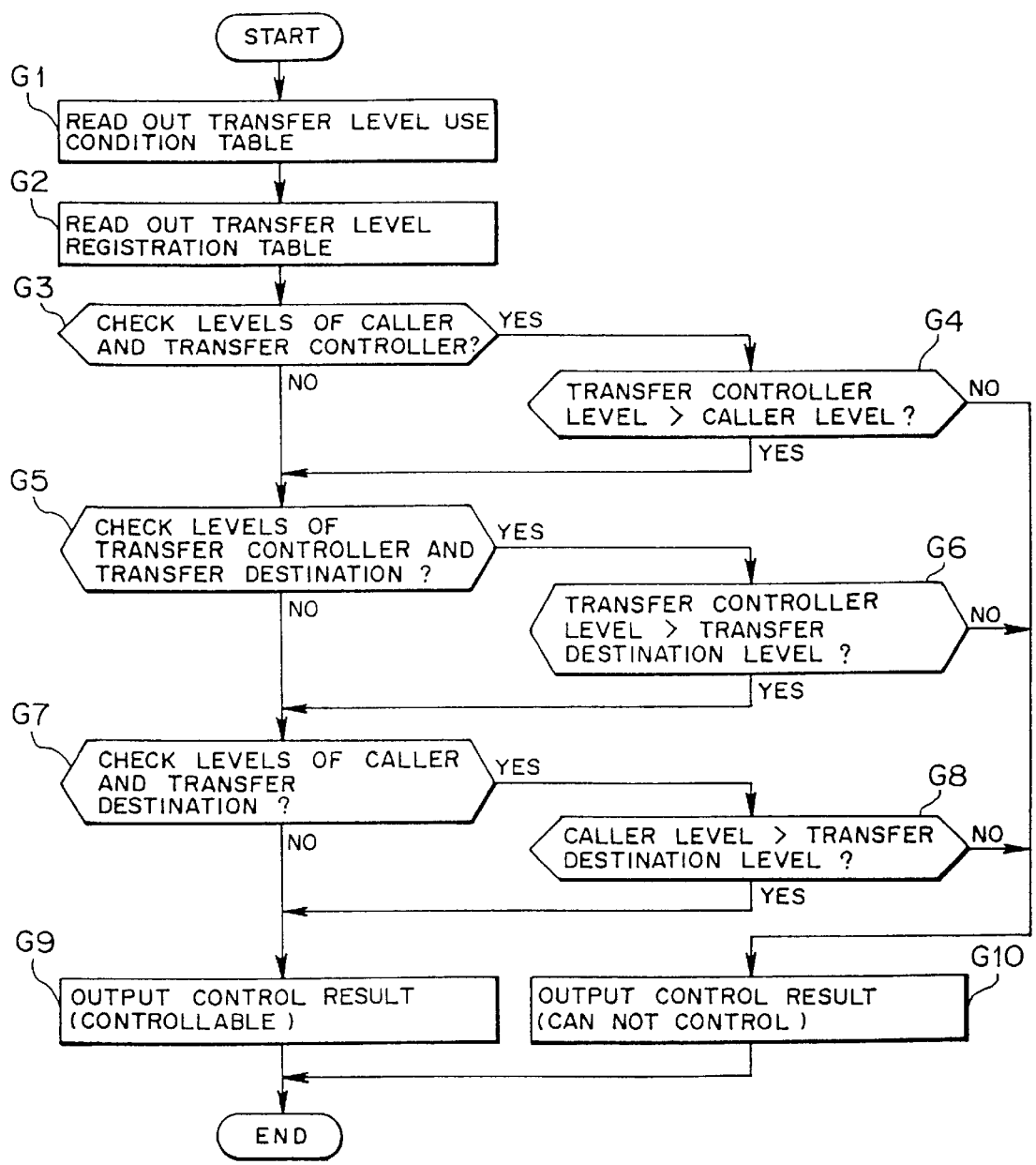
FIG. 23 is a flowchart illustrating an operation of a transfer regulation control unit of the embodiment.

Then, as shown in FIG. 23, the transfer regulation control unit 24 determines the ON/OFF state of the flag 38a by referring to the registered information (flags 38a to 38c: see FIG. 12) of the transfer level use condition table 38 in the storage device 11c and thereby determines whether or not to perform level difference checking between the caller and the transfer controller 12-i (step G3).

If the flag 38a is in an ON state (YES determination in step G3), the transfer regulation control unit 24 then refers to the index of the transfer level registration table 35 by using the logical numbers of the telephone terminal (origination terminal) which the caller is using and the transfer control terminal 12-i as keys. The control unit 24 thereby extracts the levels of the caller and the transfer control terminal 12-i and makes comparison so as to determine whether the level of the transfer controller 12-i is higher than that of the caller or not (step G4).

If the origination terminal is for dealing with ISDN and a caller number is notified from this origination terminal, the transfer regulation control unit 24 refers to the index of the transfer level registration table 35 by using the caller number as a key and extracts the level of the caller.

If the level of the caller is higher than that of the transfer controller 12-i (NO determination in step G4), the transfer regulation control unit 24 outputs "control not permitted" as a control result to the transfer start control unit 21 (step G10).

On the other hand, if the level of the transfer controller 12-i is higher than that of the caller (YES determination in step G4), or if the flag 38a of the table 38 is in an OFF state (NO determination in step G3), the transfer regulation control unit 24 determines the ON/OFF state of the flag 38b of the table 38 and then determines whether or not to perform level difference checking between the transfer controller 12-i and a transfer destination (step G5).

If the flag 38b is in an ON state (Yes determination in step G5), the transfer regulation control unit 24 then refers to the index of the transfer level registration table 35 by using the logical numbers of the transfer control terminal 12-i and the transfer destination (the logical number of the latter is uniquely decided based on a transfer execution transfer destination dial number given from the transfer destination control unit 23). The transfer regulation control unit 24 thereby extracts the levels of the transfer controller 12-i and the transfer destination and makes comparison so as to determine whether the level of the transfer controller 12-i is higher than that of the transfer destination or not (step G6).

If the level of the transfer destination is higher than that of the transfer controller 12-i (No determination in step G6), the transfer regulation control unit 24 then outputs "control not permitted" as a control result to the transfer start control unit 21 (step G10).

On the other hand, if the level of the transfer controller 12-i is higher than that of the transfer destination (YES determination in step G6) or if the flag 38b of the table 38 is in an OFF state (NO determination in step G5), the transfer regulation control unit 24 determines the ON/OFF state of the flag 38c of the table 38 and then determined whether or not to perform level difference checking between the caller and the transfer destination (step G7).

If the flag 38c is in an ON state (YES determination in step G7), the transfer regulation control unit 24 refers to the index of the transfer level registration table 35 by using the logical numbers of the caller (caller terminal) and the transfer destination as keys and thereby extracts the levels of the caller and the transfer destination. The control unit 24 then makes comparison so as to determine whether the level of the caller is higher than that of the transfer destination or not (step G8).

If the level of the transfer destination is higher than that of the caller (NO determination in step G8), the transfer regulation control unit 24 outputs "transfer control not permitted" as a control result to the transfer start control unit 21 (step G10).

On the other hand, if the level of the caller is higher than that of the transfer destination (YES determination in step G8) or if the flag 38c of the table 38 is in an OFF state (NO determination in step G7), the transfer regulation control unit 24 outputs "transfer control possible (permitted)" as a control result to the transfer start control unit 21 (step G9).

In other words, the transfer regulation control unit 24 executes transfer control only when the specified comparison condition (high or low condition) of a transfer operation level is satisfied. This comparison condition can be changed on demand by setting the ON/OFF states of the flags 38a to 38c of the table 38.

Accordingly, the transfer regulation control unit 24 can regulate the execution/non-execution of transfer control according to the relation between the transfer controller 12-i and the caller, between the transfer controller 12-i and the transfer destination and between the caller and the transfer destination.

Therefore, depending on the setting of each of the flags 38a to 38c, various effects can be obtained. For example, it is assumed that the flag 38a corresponding to the telephone set (transfer control terminal) 12-i placed on the reception desk is set to an ON state. In this case, if a call comes into this transfer control terminal 12-i from an important customer to which a level higher than that of the transfer controller terminal 12-*i* is allocated, the transfer control terminal 12-*i* cannot transfer the incoming call to another telephone set 12-*i*. Accordingly, the incoming call will never be transferred by mistake and the receptionist will be able to surely deal with the customer.

By setting the flag 38*b* to an ON state, it is possible to prevent the mistaken transfer of an incoming call from the transfer control terminal 12-*i* to a telephone set 12-*i* to which the call should not be transferred, for instance the telephone set 12-*i* of a superior in conference. Also, by setting the flag 38*c* to an ON state, it is possible to prevent the transfer of a call incoming from an unwished party to the telephone set 12-*i* of his own.

Then, as shown in FIG. 22, the transfer destination control unit 23 determines whether transfer control is permitted or not for the transfer control terminal 12-*i* based on the determination result ("transfer control permitted" or "transfer control not permitted" of the transfer regulation control unit 24 (step F11). If transfer control is permitted (YES determination in step F11), the control unit 23 changes the called side telephone number of the transfer execution line number registered in the transfer control management table 37 to a transfer execution transfer destination dial number and then sets a calling path for the transfer destination (step F12).

Figure 38:
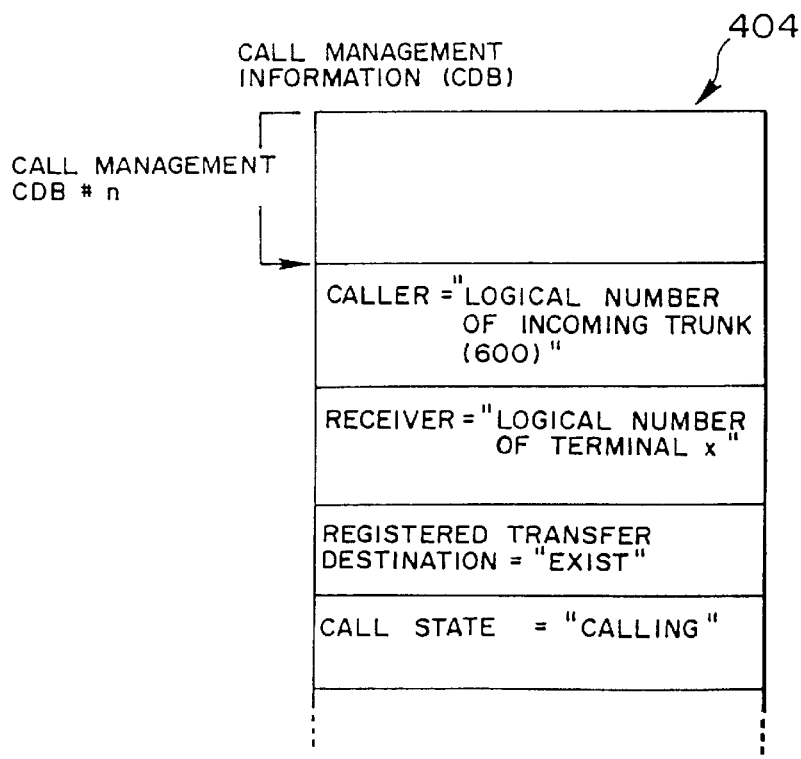
FIG. 38 is a view showing an example of call control information (CDB: before non-response transfer) created by the call controller.
Figure 39:
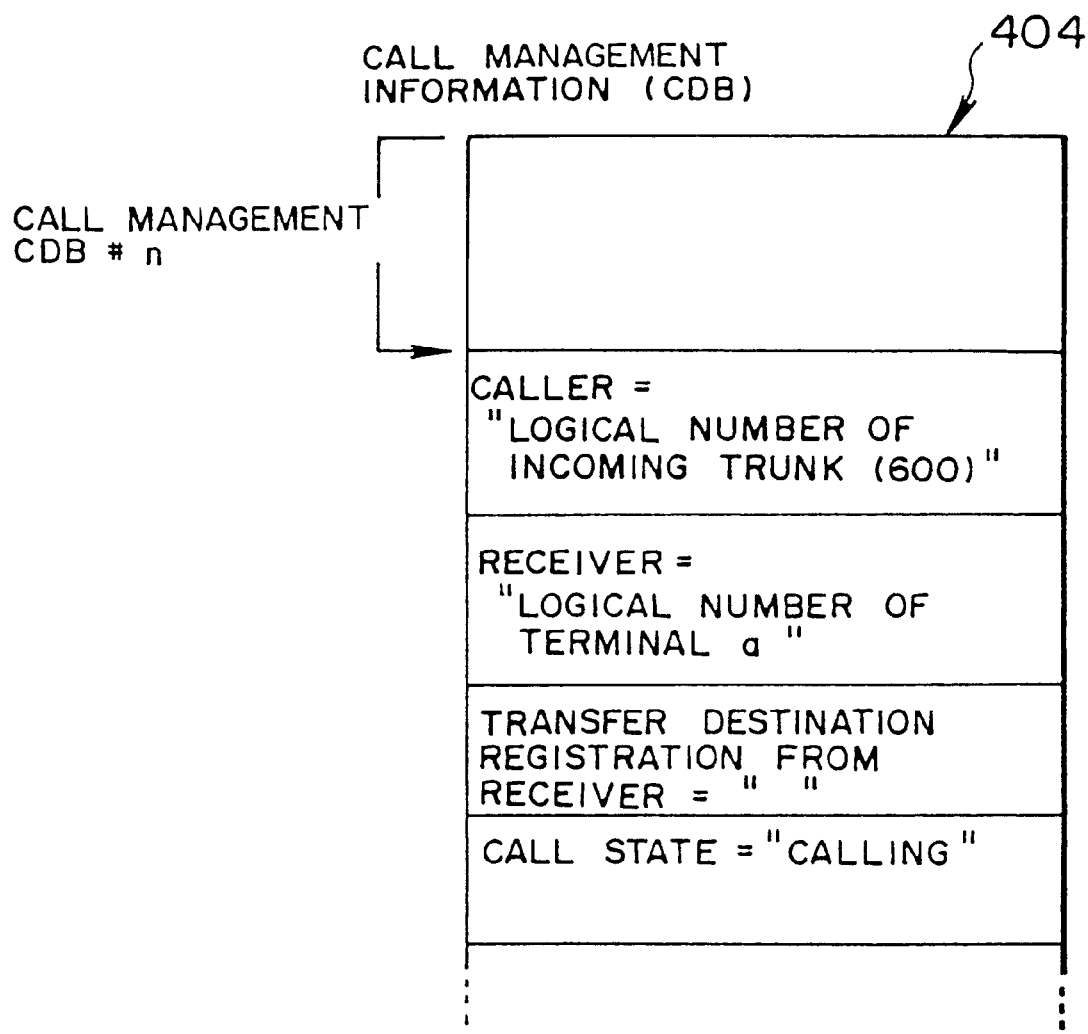
FIG. 39 is a view showing an example of call control information (CDB: after non-response transfer) created by the call controller.

Specifically, the transfer destination control unit 23 refers to the indexes of the table (ETCM) 402 (see FIG. 36) and the table (TCM) 403 (see FIG. 37) by using a transfer execution line number contained in the information of the table 36. The control unit 23 thereby recognizes call control information 404 (see FIG. 38) for controlling a call to be transferred and obtains information (caller identity, and so on) regarding the call to be transferred. Based on such information, the control unit 23 then performs transfer control so as to stop the ring tone of the transfer control terminal 12-*i*, ring the telephone set 12-*i* of the transfer destination and display a message for the transfer of the incoming call on the displaying unit 123 of the telephone terminal 12-*i* (step B10 shown in FIG. 14).

Then, the transfer destination control unit 23 refers to the index of the transfer control management table 37 by using the logical number of the transfer control terminal 12-*i* as a key and clears the information registered in the area thereof (step F14). The control unit 23 then sets "transfer succeeded" as information inputted to the transfer notification control unit 25 and starts the transfer notification control unit 25 (step F14).

Then, as shown in FIG. 24, since the inputted information is "transfer succeeded" (Yes determination in step H3), the message of "transfer succeeded" is notified to the transfer control terminal 12-*i* [step H7 (step B11 shown in FIG. 14)].

After the transfer of the incoming call has succeeded as described above, calling of the line number of the transfer control terminal 12-*i* is terminated and the line number is changed from the calling state to another state (NO determination in step M1 shown in FIG. 31 and YES determination in step M4). Accordingly, the terminal calling control unit 31 refers to the index of the transfer line management table 32 by using the logical number of the transfer control terminal 12-*i* as a key (step M5) and clears (to FF. FF. FF) the calling start time information CTIME (n) registered in the relevant area (step M6).

The processing performed by the terminal calling control unit 31 for clearing the calling start time information CTIME (n) is also executed when the user responds to a call incoming to a line number during calling of this number.

In the case of "transfer failed", a message to this effect is given from the transfer notification control unit 25 to the transfer control terminal 12-*i* in step H7 (step B11). Such a case "transfer failed" occurs if (a) a transfer line number cannot be normally decided (line number data cannot be created), (b) a transfer destination cannot be normally decided (transfer destination data cannot be created) or (c) transfer regulation is applied.

These situations will be described in detail below.

(a) Transfer line number cannot be normally decided.

This situation occurs in the transfer line control unit 22. Specifically, as shown in FIG. 21, the situation occurs because the STATUS of the relevant area of the transfer control terminal 12-*i* is not a "line number request standby state" when line number information is inputted (i.e., inputted line number information is not from the same transfer control terminal 12-*i* which has performed a transfer operation: NO determination in step E5) or because a line number corresponding to inputted line number information is not calling state (NO determination in step E7).

In any of the above-noted cases, the transfer line control unit 22 refers to the index of the transfer control management table 37 by using the logical number of the transfer control terminal 12-*i* as a key and clears all information registered in the relevant area (step E11). Then, the control unit 22 refers to the index of the terminal control table 32 by using the logical number as a key and changes the STATUS of the area to a "transfer failure avoidance request standby state (logical value 3)" (step E12).

Then, the transfer line control unit 22 starts the transfer failure avoidance request standby timer 28*c* of the transfer monitoring control unit 28 (step E13), sets "transfer failed" as information inputted to the transfer notification control unit 25 and starts the transfer notification control unit 25 (step E14).

Thus, as shown in FIG. 24, since the inputted information is "transfer failed" (YES determination in step H4), the transfer notification control unit 25 notifies the "transfer failed" to the transfer control terminal 12-*i* [step H8 (step B11 shown in FIG. 14)].

(b) Transfer destination cannot be normally decided

This situation occurs in the transfer destination control unit 23. Specifically, as shown in FIG. 22, the situation occurs because the STATUS of the relevant area of the transfer control terminal 12-*i* is not a "transfer destination number request standby state" when transfer destination telephone number information is inputted (i.e., inputted transfer destination telephone number information is not from the same transfer control terminal 12-*i* which has performed a transfer operation: NO determination in step F5), because an inputted telephone number is not correct (NO determination in step F6) or because connection cannot be made as the transfer destination is engaged (NO determination in step F7).

In any of the above-noted cases, as in the case of the transfer line control unit 22, the transfer destination control unit 23 refers to the index of the transfer control management table 37 by using the logical number of the transfer control terminal 12-*i* as a key and clears all information registered in the relevant area (step F15). Then, the control unit 23 refers to the index of the terminal attribute control table 32 by using the logical number as a key and changes the STATUS of the relevant area to a "transfer failure avoidance request standby state (logical value 3)" (step F16).

Then, as in the case of the transfer line control unit 22, the transfer destination control unit 23 starts the transfer failure avoidance request standby timer 28*c* of the transfer monitoring control unit 28 (step F17), sets "transfer failed" as information inputted to the transfer notification control unit 25 and starts the transfer notification control unit 25 (step F18). Then, the transfer notification control unit 25 sends the message of "transfer failed" to the transfer control terminal 12-i.

(c) Transfer regulation is applied

This situation occurs because of the starting of the transfer regulation control unit 24 by the transfer destination control unit 23. Specifically, the situation occurs because as a result of starting the transfer regulation control unit 24, the transfer control terminal 12-i is determined to be a terminal of "transfer control not permitted" (NO determination in step Fil shown in FIG. 22). In this case, as shown in FIG. 22, the transfer destination control unit 23 performs processing similar to the above-described processing of (b) (steps F15 to F18) and sends the message of "transfer failed" from the transfer notification control unit 25 to the transfer control terminal 12-i.

In the incoming call transfer controller 3 of the embodiment, as described above in the items (a) to (c), if a transfer failure avoidance control request for requesting re-transfer control (transfer failure avoidance control) is received from the transfer control terminal 12-i within a specified time after the message of "transfer failed" is notified to the transfer control terminal 12-i (specifically, before time out occurs in the timer 28c of the transfer monitoring control unit 28), re-transfer control can be performed for the incoming call of "transfer failed".

For example, as shown in FIG. 14, if the transfer controller dials a specified number by the dial key 122 of the transfer control terminal 12-i after having received the message of "transfer failed" or performs a specified operation such as pressing a function key exclusively used for transfer failure avoidance control execution (step B12), then a transfer failure avoidance control request is transmitted to the switching system 11 (call controller 11b) (step B13).

This transfer failure avoidance control request is received by the transfer control unit 27 of the call controller 11b. In this case, as shown in FIG. 19, the transfer control unit 27 refers to the index of the terminal attribute control table 36 by using the logical number of the transfer control terminal 12-i as a key (step C1) and determines whether the STATUS of the relevant area is a "normal state (logical 0)" or not (step C2).

In this stage, since the STATUS is a "transfer failure avoidance request standby state (logical value 3)" as described above, the transfer control unit 27 determines which of the classes, a transfer start request, transfer line number information, transfer destination telephone number information, a transfer failure avoidance request and a starting request from the transfer monitoring control unit, the received information belongs to (No route of step C2 to steps C3 to C7).

Figure 29:
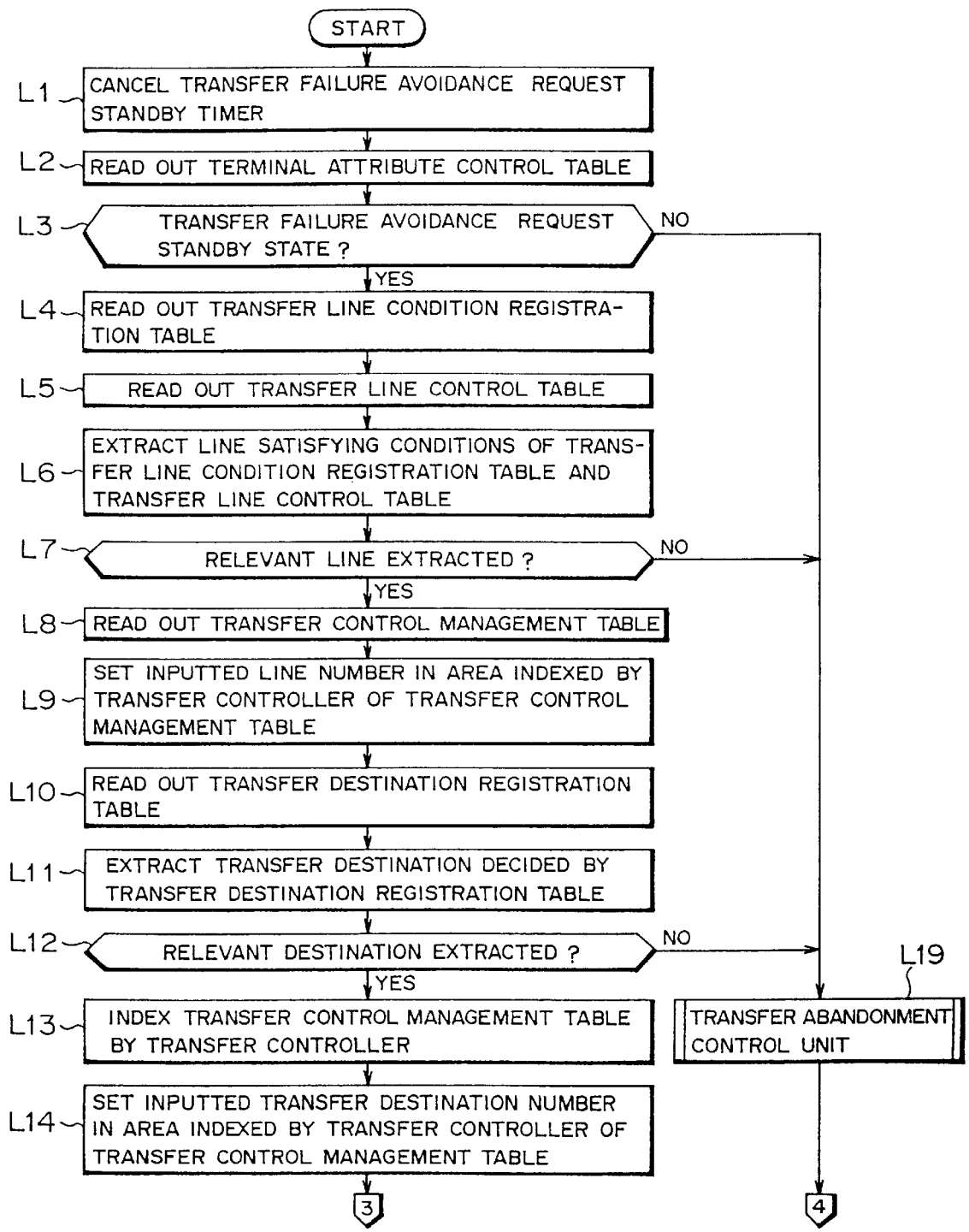
FIGS. 29 and 30 are flowcharts each illustrating an operation of a transfer failure avoidance control unit of the embodiment.

Since the received information belongs to the class of the "transfer failure avoidance control request (YES determination in step C6), the transfer control unit 27 then starts the transfer failure avoidance control unit 30 (step C15). Then, as shown in FIG. 29, the transfer failure avoidance control unit 30 resets the timer 28c of the transfer monitoring control unit 28 started at the time of receiving the notice of "transfer failed" (step L1), refers to the index of the terminal attribute control table 36 by using the logical number of the transfer control terminal 12-i as a key (step L2) and determines whether the STATUS of the relevant area is a "transfer failure avoidance request standby state (logical value 3)" or not (step L3).

Since the STATUS is the "transfer failure avoidance request standby state (logical value 3)" as described above (YES determination in step L3), the transfer failure avoidance control unit 30 refers to the indexes of the transfer line condition registration table 34 and the transfer line control table 32 by using the logical number as a key and reads information [line selection condition COND and calling start time information CTIME (n)] registered in the relevant areas (steps L4 and L5). Then, based on the read information, the control unit 30 automatically extracts line number information for transfer (e.g., a line number having a longest calling time) (step L6).

Then, the transfer failure avoidance control unit 30 checks whether the transfer line number information has been correctly extracted or not (step L7). If the information has been correctly extracted (YES determination in step L7), the control unit 30 refers to the index of the transfer control management table 37 by using the logical number as a key (step L8) and sets the extracted transfer line number information as a transfer execution line number in the relevant area (create line number data: step L9).

In other words, if transfer control for incoming call fails, the transfer failure avoidance control unit 30 re-creates line number data and performs re-transfer control for the incoming call upon receiving a transfer failure avoidance control request from the transfer control terminal 12-i. In this case, the re-creation of line number data is performed based on the selection condition of a line number for transfer registered beforehand in the transfer line condition registration table 34 for each of the telephone terminals 12-i.

Then, the transfer failure avoidance control unit 30 refers to the index of the transfer destination registration table 33 by using the logical numbers of the transfer control terminal 12-i and the transfer line number as keys and reads the registered information of the relevant area (transfer destination dial number at the time of failure) (step L10). The control unit 30 extracts (decides) a transfer destination based on the registered information (step L11).

The transfer failure avoidance control unit 30 then checks whether the transfer destination has been correctly extracted or not (step L12). If the transfer destination has been correctly extracted (YES determination in step L12), the control unit 30 then refers to the index of the transfer control management table 37 by using the logical number of the transfer control terminal 12-i as a key (step L13) and sets the transfer destination telephone number information in the relevant area (creates transfer destination data: step L14).

In other words, if transfer control for an incoming call fails, the transfer failure avoidance control unit 30 re-creates transfer destination data upon receiving a re-transfer control request from the transfer control terminal 12-i and performs re-transfer control for the incoming call based on the transfer destination data. In this case, the re-creation of transfer destination data is performed based on transfer failure time transfer destination telephone number information registered beforehand in the transfer destination registration table 33 for each line number of each of the telephone terminals 12-i.

Figure 30:
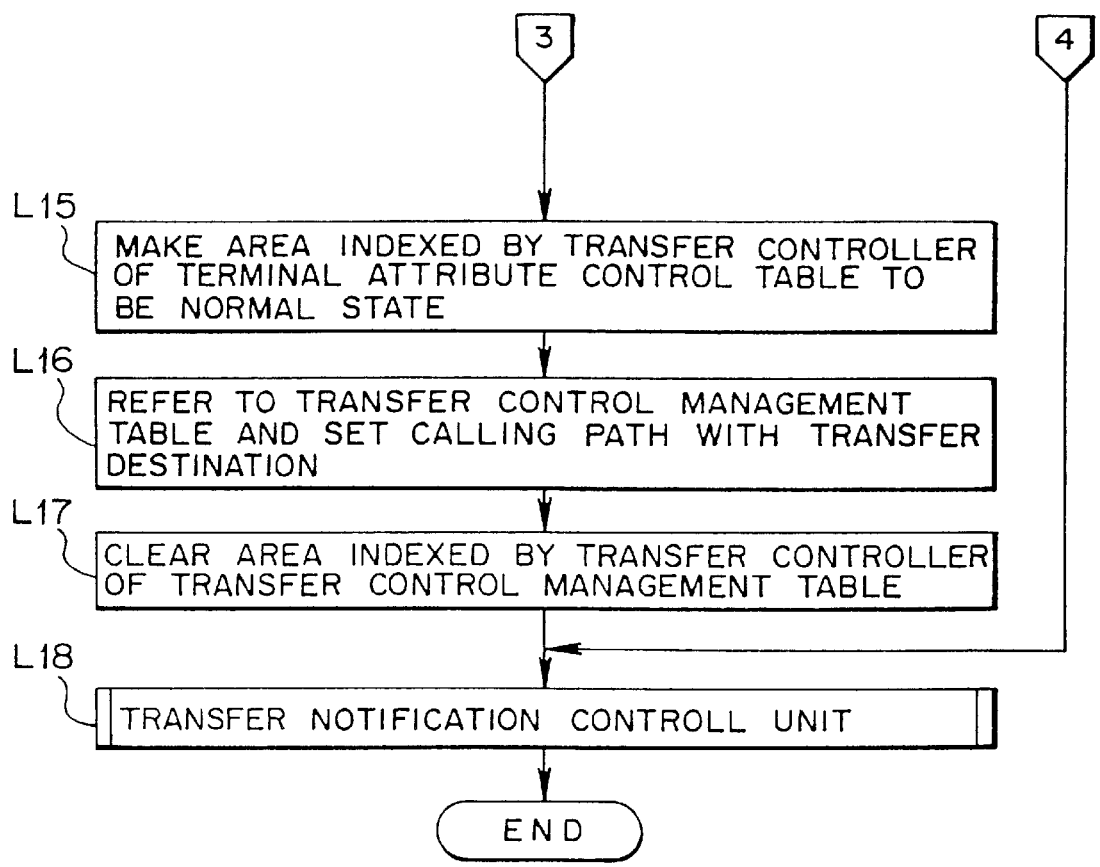

Then, as shown in FIG. 30, the transfer failure avoidance control unit 30 refers to the index of the terminal attribute management table 37 by using the logical number of the transfer control terminal 12-i as a key and changes the STATUS of the area to a "normal state (logical value 0)" (step L15). Then, the control unit 30 changes the called side telephone number of the transfer execution line number registered in the transfer control management table 37 to a transfer execution transfer destination dial number and sets a calling path for the transfer destination (step L16).

Thereafter, the transfer failure avoidance control unit 30 clears all the registered information of the relevant area of the transfer control management table 37 (step L17). The control unit 30 then sets "transfer succeeded" as information inputted to the transfer notification control unit 25, starts the transfer notification control unit 25 and thereby sends the message of "transfer succeeded" to the transfer control terminal 12-i as described above with reference to FIG. 24 (YES route of step H3 to step H7) (step L18)

According to the embodiment, in the case of "transfer failed", after a transfer failure avoidance control request has been inputted from the transfer controller, the transfer failure avoidance control unit 30 automatically creates line number data and transfer destination data based on the transfer line condition registration table 34 and the transfer destination registration table 36. These line number and transfer destination data can be re-created by being re-inputted the transfer line number information and the transfer destination telephone number information from the transfer controller.

For example, in step E11 of FIG. 21 and in step F15 of FIG. 22, the transfer execution line number and the transfer execution transfer destination dial number of the transfer control management table 37 are cleared. Then, in step E12 of FIG. 21 and in step F16 of FIG. 22, a "line number request standby state (logical value 1)" is set in the terminal attribute control table 36 instead of the "transfer failure avoidance request standby state (logical value 3)". In this way, since the transfer line number input request and the transfer destination number input request are outputted to the transfer controller again, the transfer controller can re-input both of the transfer line and the transfer destination.

To take another example, in step E11 of FIG. 21 and in step F15 of FIG. 22, only the transfer execution transfer destination dial number of the transfer management control table 37 is cleared. Then, in step E12 of FIG. 21 and in step F16 of FIG. 22, a "transfer destination request standby state (logical value 2)" is set in the terminal attribute control table 36 instead of the "transfer failure avoidance request standby state (logical value 3)". In this way, since the transfer destination number input request is outputted to the transfer controller again, the transfer controller can re-input the transfer destination telephone number information for an already specified transfer line number.

If the STATUS of the relevant area of the terminal attribute management table 37 is not a "transfer failure avoidance request standby state (logical value 3)" in the step L3, if the transfer line number information has not been correctly extracted in step L7 or if the transfer destination cannot be correctly extracted in step L12, the transfer failure avoidance control unit 30 starts the transfer abandonment control unit 29 (NO route of steps L3, L7 and L12 to step L19).

Figure 28:
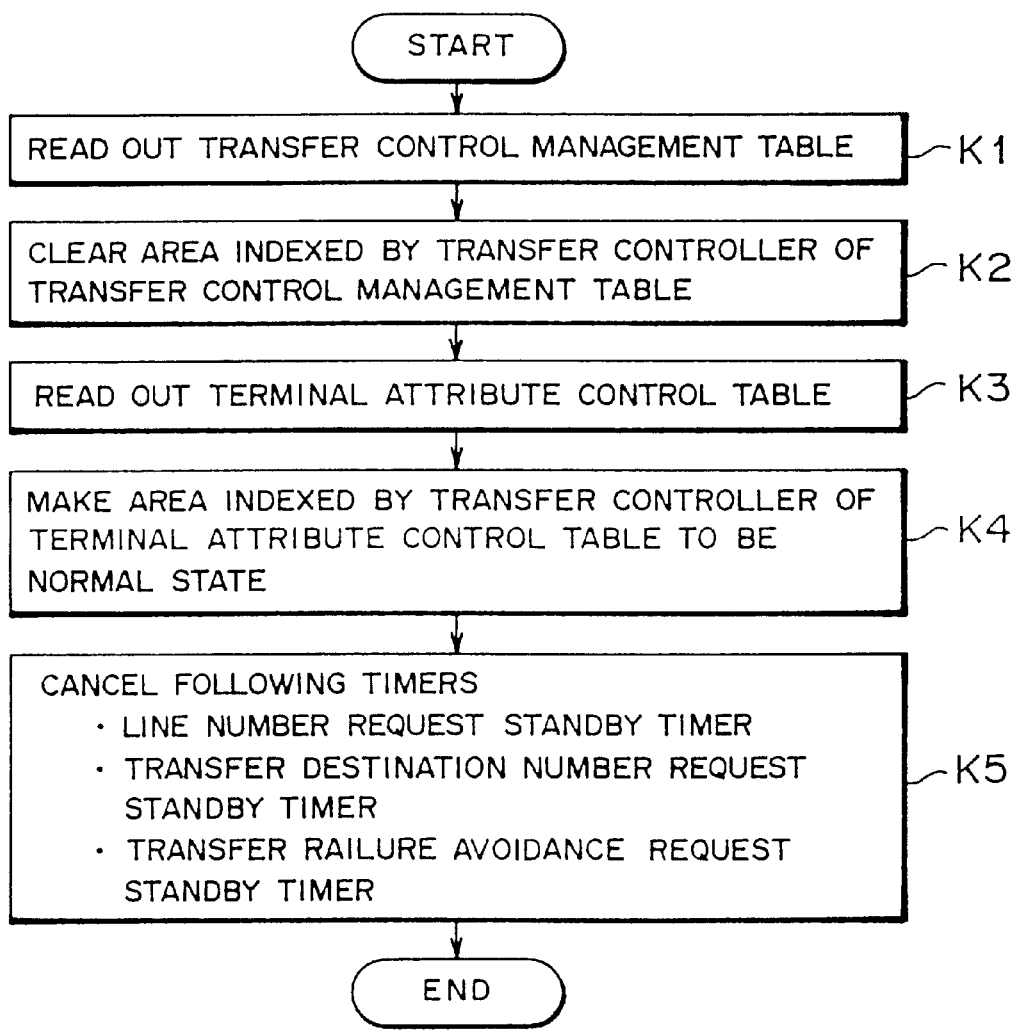
FIG. 28 is a flowchart illustrating an operation of a transfer abandonment control unit of the embodiment.

Then, as shown in FIG. 28, the transfer abandonment control unit 29 refers to the index of the transfer control management table 37 by using the logical number of the transfer control terminal 12-i as a key (step K1) and clears all the registered information of the relevant area (step K2). Also, the control unit 29 refers to the index of the terminal attribute control table 36 by using the logical number of the transfer control terminal 12-i as a key (step K3), changes the STATUS of the area to a "normal state (logical value 0)" (step K4) and then initializes transfer control by canceling each of the timers 28a to 28c of the transfer monitoring control unit 28 (step K5).

As shown in FIG. 25, after the message of "transfer failed" has been notified to the transfer control terminal 12-i, the transfer monitoring control unit 28 passes through the YES route of step J1 and the NO route of step J2 and determines whether time out has occurred in the set transfer failure avoidance request standby timer 28c or not. However, since YES determination is made in step J5 if time out occurs in the timer 28c without having detected the transfer failure avoidance control request by the transfer control unit 27 before, the transfer abandonment control unit 29 is started by the transfer monitoring control unit 28 (step J6) and the above-described transfer abandonment processing is performed (see steps K1 to K5 shown in FIG. 28).

In other words, the transfer failure avoidance control unit 30 does not perform the re-transfer control if no transfer failure avoidance control request is received from the transfer control terminal 12-i within a specified time.

The transfer abandonment control unit 29 is also started when the multi-line incoming call transfer request as a transfer stopping request from the transfer control terminal 12-i is detected again during performing of a transfer control sequence like that described above. For example, after having transmitted a transfer request from the transfer control terminal 12-i by pressing the transfer service button 126 (see steps B2 and B3 of FIG. 14), if the user presses the transfer service button 126 again, this transfer request is received by the transfer control unit 27.

Then, in the transfer control unit 27, the transfer request is detected while the STATUS of the relevant area of the terminal attribute control table 36 is other than the "normal state (logical value 0)". Accordingly, as shown in FIG. 19, understanding that a transfer stopping request has been detected, the control unit 27 passes from the NO route of step C2 through NO route of step C3 and starts the transfer abandonment control unit 29 (step C12).

Then, the transfer abandonment control unit 29 clears each registered information of the terminal attribute control table 36 and the transfer control management table 37, reset the timers 28a to 28c of the transfer monitoring control unit 28 and initializes transfer control. In other words, after having received a transfer stopping request from the transfer control terminal 12-i during performing of control for transferring an incoming call to a transfer destination, the transfer abandonment control unit 29 stops its transfer control.

As apparent from the foregoing, with the incoming call transfer controller of the embodiment, after the detection of a transfer request from the transfer control terminal 12-i, line number data and transfer destination data are dynamically created by setting a transfer line number and a transfer destination telephone number in the transfer control management table 37 for each line number of the transfer control terminal 12-i and a line number and a transfer destination for an incoming call to be transferred are decided based on these data so as to perform transfer processing. Accordingly, even when a call comes into any of the line numbers of the transfer control terminal 12-i under any conditions, the incoming call to be transferred can always be transferred to the decided destination quickly without making any response by the transfer control terminal 12-i.

According to the embodiment, after a line number and a transfer destination for transfer are specified by pressing the non-response transfer service button 126 in the telephone terminal 12-i into which a call is coming, bits of information regarding the line number and the transfer destination are accumulated in the transfer control management table 37 so as to create transfer control data and the call control information 404 (see FIG. 38) for controlling the call to be transferred can be recognized by referring to the indexes of the table (ETCM) 402 (see FIG. 36) and the table (TCM) 403 (see FIG. 37) based on a transfer execution line number contained in the information of the table 37 when transfer is to be executed. Accordingly, information regarding the call to be transferred (e.g., the identity of a caller) can be obtained and transfer can also be performed for calls incoming to the line numbers other than the main line number.

Even when calls simultaneously come into the plurality of line numbers of the transfer control terminal 12-i, the call controller can quickly transfer each incoming call to another telephone set 12-i without making any response thereto. Accordingly, a delay in dealing with each incoming call can be controlled to a minimum and service quality, for instance in telephone reception business, can be greatly improved.

Even if a new call comes into another line number during the engagement (during communication) of a certain line number of the transfer control terminal 12-i, the transfer controller can transfer the new incoming call to another telephone set 12-i without placing the incoming call of the line number which has been dealt with on hold or canceling the communication (the communication is continued). Accordingly, service quality, for instance in telephone reception business, can be greatly improved.

According to the embodiment, since the line number data/transfer destination data (transfer control management table 37) is created based on line number information/transfer destination (telephone number) information inputted from the transfer control terminal 12-i, the transfer controller leads the creation of data for deciding a transfer line number/transfer destination.

Accordingly, processing for creating line number data/transfer destination data can always be performed based on the request of the transfer controller. Any line number/transfer destination not requested for transfer by the transfer controller will never be decided as such and thus the reliability of the controller 3 can be greatly improved. For a transfer destination, since the transfer controller can optionally change the destination to another for each line number of the transfer control terminal 12-i, transfer operational convenience can be greatly improved.

According to the embodiment, since the transfer controller is requested to input a transfer line number/transfer destination telephone number and the transfer line number/transfer destination telephone number inputted in response to the request is detected, line number information/telephone number information necessary for creating line number data/transfer destination data can be surely obtained. Accordingly, the reliability of the creation of line number data/transfer destination data can be improved.

According to the embodiment, since a transfer processing situation, for instance the normal completion of transfer processing (transfer succeeded) or the occurrence of abnormality (transfer failed) after the actual transfer of an incoming call is notified to the transfer controller, the transfer controller can always understand a transfer processing situation and deal with the situation (e.g., avoidance control at the time of transfer control failure).

According to the embodiment, since after a transfer termination request is received from the transfer controller, the transfer control is terminated even during performing of the control, the transfer controller can easily terminate the transfer processing any time. Accordingly, the occurrence of unnecessary transfer processing against the intention of the transfer controller can be reduced extremely effectively.

According to the embodiment, even if transfer processing fails, since a transfer failure avoidance control request (re-transfer control request) is received from the transfer controller within a specified time, line number data/transfer destination data is re-created and re-transfer control for an incoming call is performed based on each of these data, the long-time non-transfer situation of the incoming call to be transferred against the intention of the transfer controller can be reduced extremely effectively.

In this case, since the line number data/transfer destination data is re-created mainly by the controller 3 based on a selection condition/failure time transfer destination telephone number information registered beforehand in the transfer line condition registration table 34/the transfer destination registration table 33 respectively, the decision of the transfer line number can be changed according to the incoming call situation of the telephone terminal 12-i as the occasion may demand. For example, the automatic selection of a line number having a longest continuous calling time as a transfer line number or other settings can be performed. Accordingly, the degree of flexibility of incoming call non-response transfer service and service quality can be greatly improved in the telephone switching system.

In addition, depending on the decision of a transfer destination, for instance, the number of the telephone terminal 12-i of a user such as a chief at the reception desk who is always ready to deal with incoming calls is set as the failure time transfer destination telephone number, even an incoming call which has failed to be transferred can be surely dealt with by the predetermined telephone terminal 12-i. Accordingly, incoming call non-response transfer service quality can be further improved in the telephone switching system.

According to the embodiment, since no re-transfer control is performed if the transfer failure avoidance request (re-transfer control request) is not received from the transfer control terminal 12-i within a specified time, re-transfer control can be prevented from being performed by mistake. Accordingly, an erroneous operation, such as performing of re-transfer control against the intention of the transfer controller, can be reduced extremely effectively.

According to the embodiment, since the transfer regulation control unit 24 regulates control for transferring an incoming call to a transfer destination according to the transfer operation level registered beforehand in the transfer level registration table 35 for each telephone terminal 12-i, unconditional transfer of the incoming call to the transfer destination can be prevented. Accordingly, by preventing the transfer of the incoming call to a telephone terminal improper as a transfer destination or the transfer of an incoming call not to be transferred, transfer service quality can be greatly improved.

In this case, transfer control is performed only when the level of the transfer controller is higher than that of the caller, when the level of the transfer controller is higher than that of the transfer destination or when the level of the caller is higher than that of the transfer destination. Accordingly, the transfer of an incoming call from an important caller not to be transferred or the transfer of an incoming call to a telephone terminal improper as a transfer destination, for instance the telephone terminal of a superior in conference, can be prevented and an incoming call to be transferred from an important caller can be surely transferred to its transfer destination.

(b-2-2) No transfer line number information is inputted

Next, an operation performed when after a notice for promoting the input of transfer line number information is given to the transfer control terminal 12-i as described above with reference to step B4 of FIG. 14, the transfer line number information is not inputted from the transfer control terminal 12-i within a specified time will be described in detail.

Figure 15:
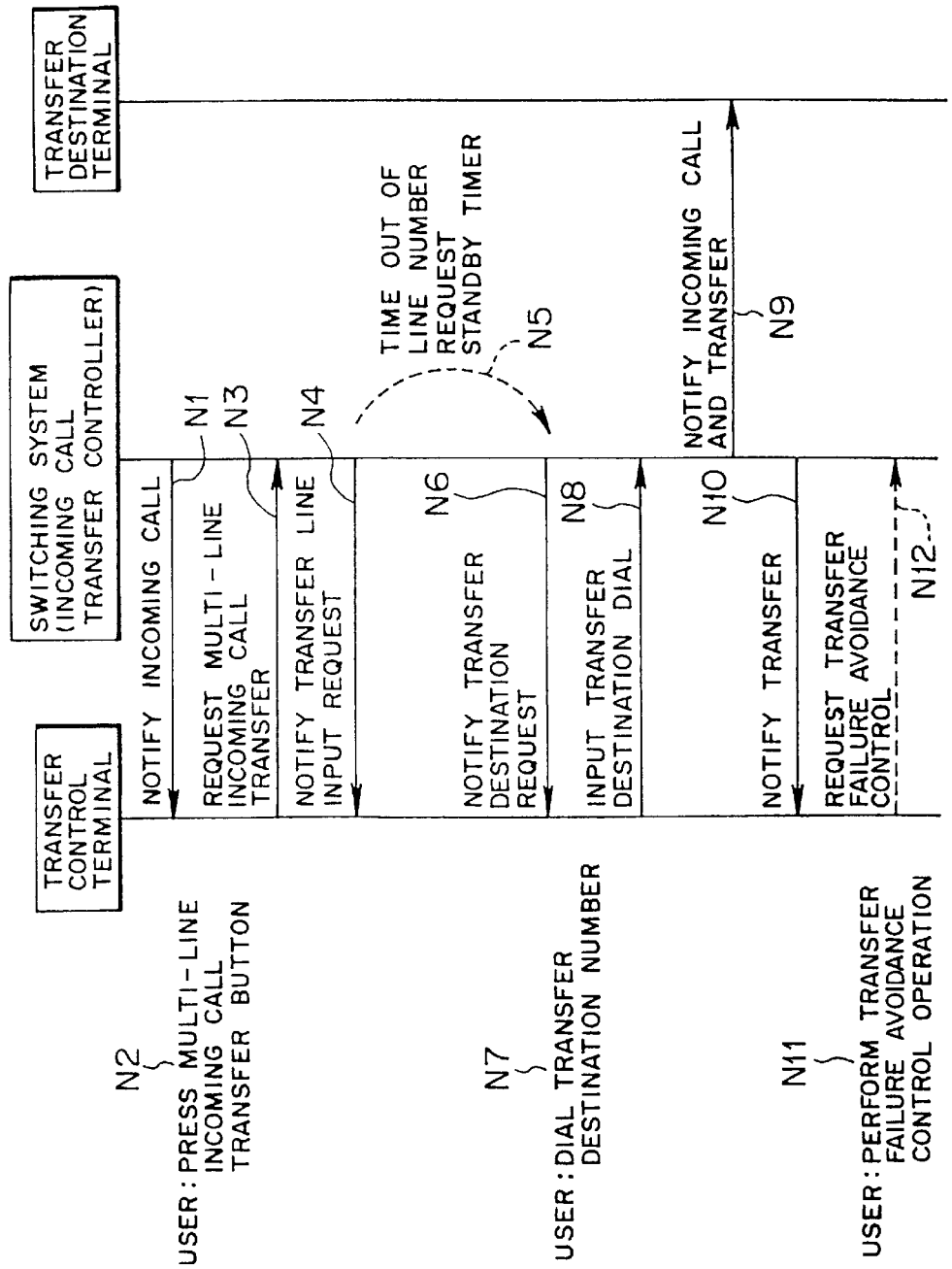

First, as shown in FIG. 15, a call comes into a certain line number of a given telephone set 12-i from the switching system 11 (call controller 11b) (step N1). Then, in the telephone set 12-i, a ring tone is sounded, the display lamp 124-i corresponding to the line number which the call has come into is turned ON-and-OFF, information regarding the originator of the call (caller telephone number) is displayed on the displaying unit 123 and thereby the incoming call is notified to the user.

In this condition, if the user performs a non-response transfer operation by pressing the transfer service button 126 (step N2), a transfer start request (multi-line incoming call transfer request) is transmitted from the telephone set (transfer control terminal) 12-i to the switching system 11 (call controller 11b) (step N3).

This transfer start request is then received by the transfer control unit 27 and as described above with reference to FIG. 19, the transfer control unit 27 starts the transfer start control unit 21 (from YES route of step C2 to step C10 and from YES route of step C10 to step C11). Then, as described above with reference to FIG. 20, the transfer start control unit 21 changes the transfer line state (STATUS) of a relevant area to a "line number request standby state (logical value 1)" by referring to the index of the terminal attribute control table 36. The control unit 21 then sets (starts) the line number request standby timer 28a of the transfer monitoring control unit 28 and sets a "line number input" as information inputted to the transfer notification control unit 25. Then, the control unit 21 starts the transfer notification control unit 25 (step D1 to step D4).

Then, as described above with reference to FIG. 24, the transfer notification control unit 25 outputs a line number input request notice for promoting the input of a line number to the transfer control terminal 12-i [YES route of step H1 to step H5 (step N4 of FIG. 15)]. Then, in the transfer control terminal 12-i, a message such as "select (input) line number" is displayed on the displaying unit.

Figure 26:
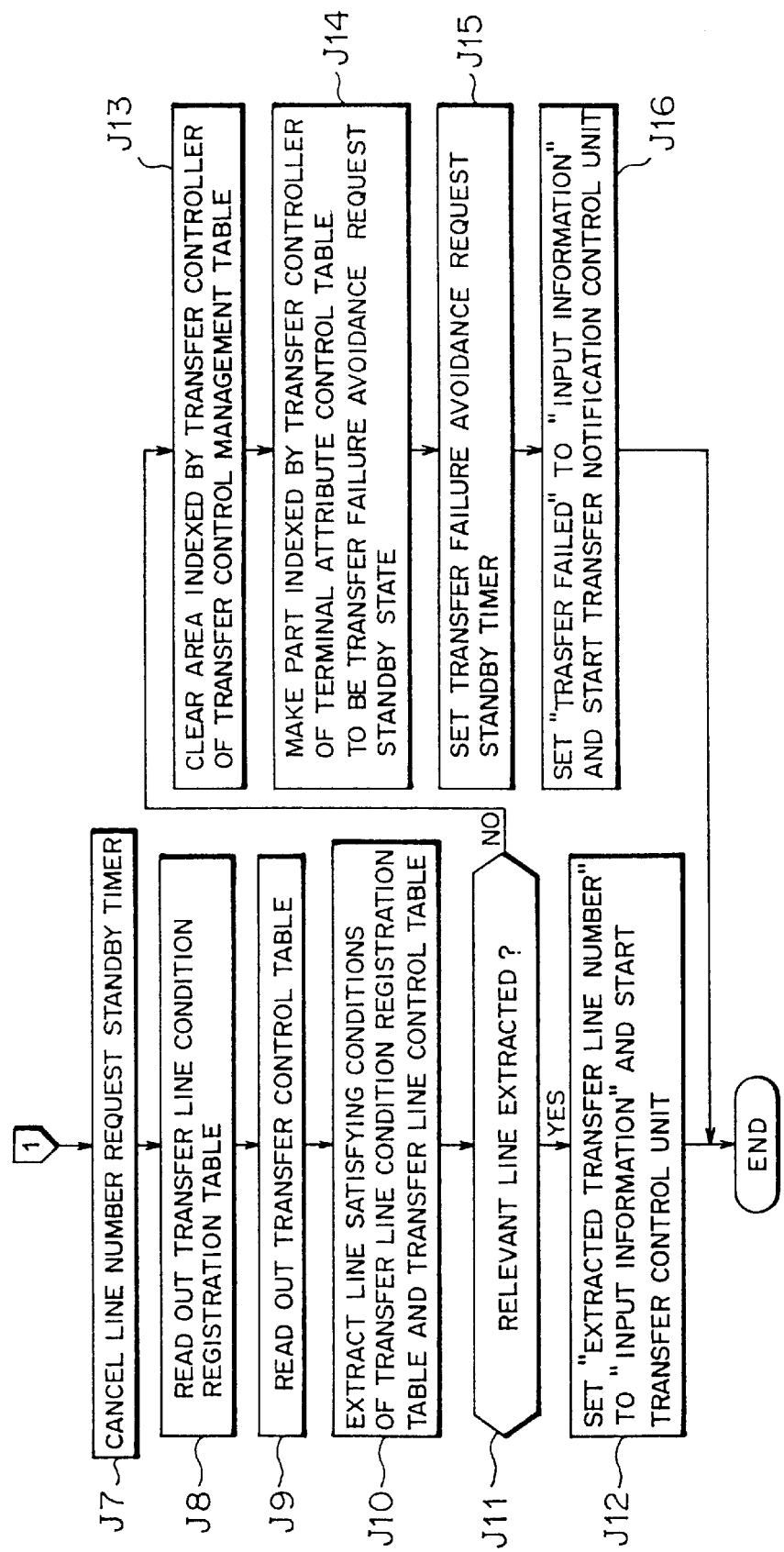

In this condition, if the user does not press the line number button 124-i within a specified time for one reason or another, in the call controller 11b, time out occurs in the line number request standby timer 28a of the transfer monitoring control unit 28 (step N5 of FIG. 15). Then, as shown in FIG. 25, the transfer monitoring control unit 28 confirms that the timed-out timer is a line number request standby timer 28a (YES route of step J3). Then, as shown in FIG. 26, the control unit 28 resets the timer 28a (step J7).

Then, the transfer monitoring control unit 28 refers to the indexes of the transfer line condition registration table 34 and the transfer line control table 32 by using the logical number of the transfer control terminal 12-i as a key and reads information registered therein [line number selection condition COND (see FIG. 8) and calling start time information CTIME (n) (see FIG. 6)] (steps J8 and J9). The control unit 28 then automatically extracts (decides) transfer line number information based on the read information (condition) (step J10).

If the transfer line number is normally extracted, the transfer monitoring control unit 28 sets the transfer line number information as information inputted to the transfer control unit 27 and then starts the transfer control unit 27 (outputs a starting request to the transfer control unit 27: YES route of step J11 to step J12).

Then, as shown in FIG. 19, since the inputted information is the starting request from the transfer monitoring control unit 28 (YES determination in step C7), the transfer control unit 27 checks which has been received as the inputted information, transfer line number information or the transfer destination telephone number information (steps C8 and C9). Since the transfer line number information was set by the transfer monitoring control unit 28 as described above, the transfer control unit 27 transfers the transfer line number information automatically extracted by the transfer monitoring control unit 28 to the transfer line control unit 22 and then starts the transfer line control unit 22 (YES route of step C8 to step C16).

Then, the transfer line control unit 22 sets the transfer line number information received from the transfer control unit 27 in the relevant area of the transfer control management table 37 (see FIG. 11) and creates line number data. The control unit 22 then starts the transfer destination number request standby timer 28b of the transfer monitoring control unit 28 and the transfer notification control unit 25 (see steps E1 to E10 of FIG. 21). Then, as shown in FIG. 15, a transfer destination input request notice for promoting the input of a transfer destination telephone number is outputted to the transfer control terminal 12-i (step N6).

In other words, the transfer line control unit 22 creates line number data based on the selection condition registered in the transfer line condition registration table 34 if no line number information is inputted from the transfer control terminal 12-i (if no line number information is detected even when time out occurs in the timer 28a of the transfer monitoring control unit 28).

Thereafter, after the user (transfer control terminal 12-i) normally inputs a transfer destination telephone number within a specified time (before time out occurs in the timer 28b) (steps N7 and N8) as in the case of the processing described above in the section (b-2-1), the transfer destination control unit 23 sets calling path, and so on, and sends a message of incoming call transfer to the transfer destination telephone terminal 12-i (step N9) and a message of "transfer succeeded" to the transfer control terminal 12-i (step N10).

In this case, if a message of "transfer failed" is sent to the transfer control terminal 12-i, the user (transfer controller) performs a transfer failure avoidance control operation within a specified time (before time out occurs in the transfer failure avoidance request standby timer 28c) (step N11). The user then transmits a transfer failure avoidance control request to the switching system 11 (step N12) and thereby transfer failure avoidance control (see steps L1 to L19 of FIGS. 29 and 30) can be performed by the call controller 11b.

Thus, with the incoming call transfer controller 3 of the embodiment, since data for deciding a transfer line number is automatically created mainly by the controller 3 according to a selection condition registered beforehand in the transfer line condition registration table 34 for each telephone set even if no line number information is inputted from the user, the impossibility of performing transfer for an incoming call because of the non-creation of line number data caused by the non-input of line number information by the user can be prevented and normal processing for creating line number data can always be continued.

Accordingly, the user can leave the decision of a transfer incoming call (line number) to the controller 3 depending on situations, for instance if which line number should be transferred cannot be determined quickly or if specifying of an incoming call is troublesome. Thus, the degree of flexibility during a transfer operation can be greatly increased.

Furthermore, since line number data is created based on the selection condition if no line number information is detected within the specified time after the transfer control terminal 12-i is requested to input line number information, a delay in the line number creating operation for over a specified time after the line number input request is made can be surely prevented. Accordingly, processing for creating line number data (transfer line deciding operation) can always be performed quickly.

If the transfer monitoring control unit 28 cannot correctly extract the transfer line number in step J11 of FIG. 26 (No determination in step J11), the transfer monitoring control unit 28 then clears all information in the relevant area of the transfer control management table 37 (step J13) and changes the relevant area of the terminal attribute management table 32 to a "transfer failure avoidance request standby state (logical value 3)" (step J14). Then, the control unit 28 starts the transfer failure avoidance request standby timer 28c of the transfer monitoring control unit 28 (step J15), sets "transfer failed" as information inputted to the transfer notification control unit 25 and starts the transfer notification control unit 25 (step J16). A message of "transfer failed" is then sent from the transfer notification control unit 25 to the transfer control unit 12-i.

(b-2-3) No transfer destination telephone number information is inputted

Next, an operation performed when after a notice for promoting the input of transfer destination telephone number information is given to the transfer control terminal 12-i as described above with reference to step B7 of FIG. 14, the transfer destination telephone number information is not inputted from the transfer control terminal 12-i within a specified time will be described in detail.

Figure 16:
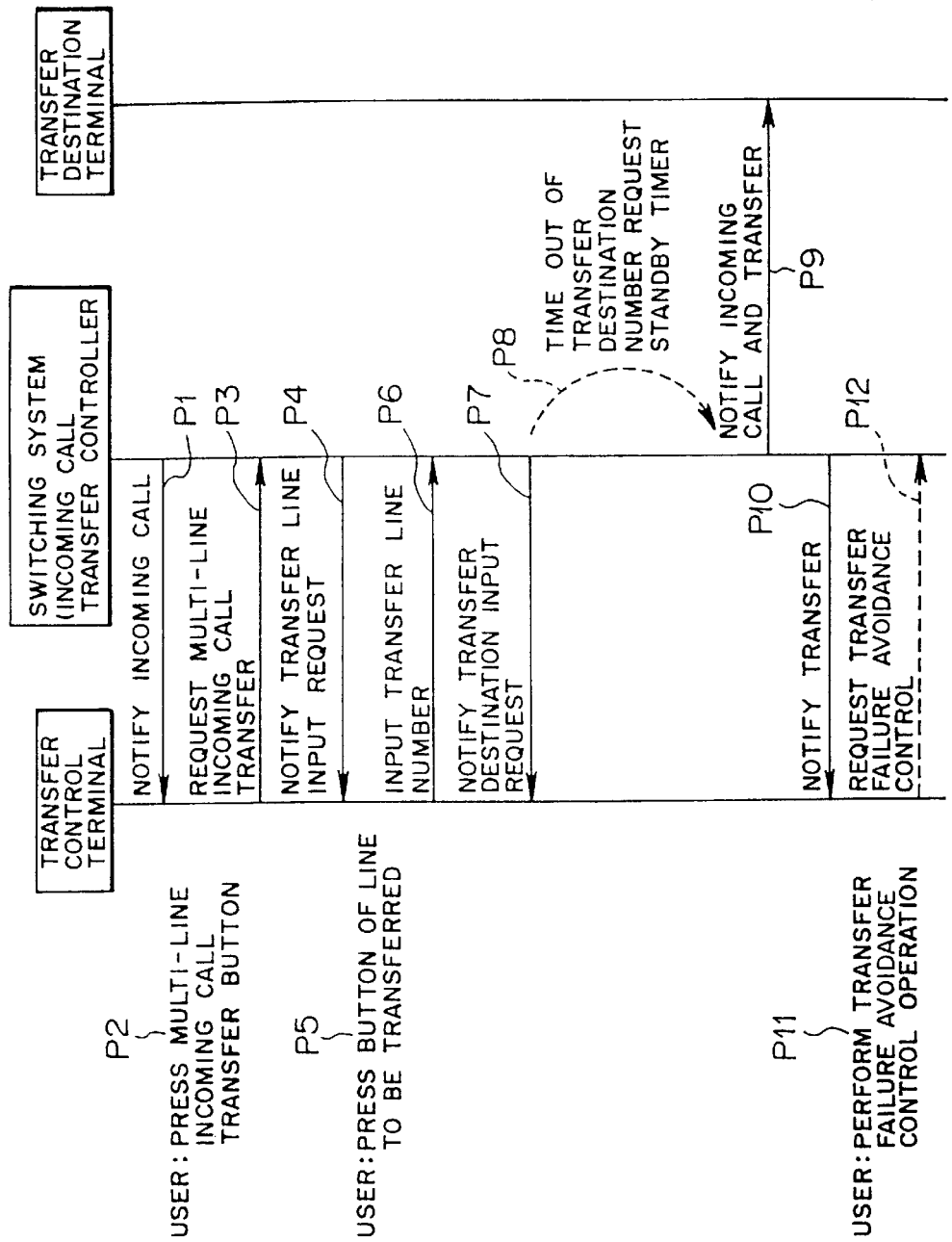

First, as shown in FIG. 16, it is assumed that a call comes into a certain line number of a given telephone set 12-i from the switching system 11 (call controller 11b) (step P1). Then, in the telephone set 12-i, a ring tone is sounded, the display lamp 124-i corresponding to the line number of the incoming call is turned ON-and-OFF, information regarding the originator of the call (caller telephone number) is displayed on the displaying unit 123 and thereby the incoming call is notified to the user.

In this condition, if the user performs a non-response transfer operation by pressing the transfer service button 126 (step P2), a transfer start request (multi-line incoming call transfer request) is transmitted from the telephone set (transfer controller) 12-i to the switching system 11 (call controller 11b) (step P3).

This transfer start request is received by the transfer control unit 27. The transfer control unit 27 then starts the transfer start control unit 21 (YES route of step C2 to step C10 and YES route of step C10 to step C11 of FIG. 19). The transfer start control unit 21 refers to the index of the terminal attribute control table 36 and changes the transfer line state (STATUS) of the relevant area to a "line number request standby state (logical value 1)". Then, the control unit 21 sets (starts) the line number request standby timer 28a of the transfer monitoring control unit 28 and sets transfer line number information as information inputted to the transfer notification control unit 25. The transfer notification control unit 25 is then started (steps D1 to D4 of FIG. 20).

Then, as described above with reference to FIG. 24, the transfer notification control unit 25 outputs a line number input request notice for promoting the input of a line number to the transfer control terminal 12-i (YES route of step H1 to step H5 of FIG. 24 and step P4 of FIG. 16). Accordingly, in the transfer control terminal 12-i, a message of "select (input) line number" or the like is displayed on the displaying unit 123.

Then, as shown in FIG. 16, the transfer controller selects a line number by pressing any one of line number buttons 124-i after having received the message (step P5) and the line number is inputted as transfer line number information to the switching system 11 (call controller 11b) (step P6).

This transfer line number information is then received by the transfer control unit 27. Also in this case, by performing operations such as starting of the transfer line control unit 22, resetting of the timer 28a, creation of line number data (transfer control management table 37: see FIG. 11), starting of the transfer destination number request standby timer 28b and starting of the transfer notification control unit 25, the transfer destination input request notice is outputted to the transfer control terminal 12-i (step P7: see steps E1 to E10 of FIG. 21 and step H6 of FIG. 24).

Accordingly, in the transfer control terminal 12-i, a message of "input transfer destination telephone number" or the like is displayed on the displaying unit 123. In this condition, if the user does not dial the transfer destination telephone number within a specified time for one reason or another, in the call controller 11b, time out occurs in the transfer destination number request timer 28b of the transfer monitoring control unit 28 (step P8 of FIG. 16).

Then, as shown in FIG. 25, the transfer monitoring control unit 28 confirms that the timed-out timer is a transfer destination number request standby timer 28b (YES route of step J4). The control unit 28 then resets the timer 28b (step J17).

Then, the transfer monitoring control unit 28 refers to the index of the transfer destination registration table 33 by using the logical number of the transfer control terminal 12-i as a key and reads the registered information (transfer destination telephone number information) of the relevant area (step J18). Based on the read information, the control unit 28 then decides a transfer destination and extracts the transfer destination (step J19). If the transfer destination is correctly extracted, the transfer monitoring control unit 28 then sets the transfer destination telephone number information as information inputted to the transfer control unit 27 and starts the transfer control unit 27 (outputs a starting request to the transfer control unit 27: from YES route of step J20 to step J21).

Then, as shown in FIG. 19, since the inputted information is the starting request from the transfer monitoring control unit 28 (YES determination in step C7), the transfer control unit 27 checks which has been received as the inputted information, transfer line number information or transfer destination telephone number information (steps C8 and C9).

Since the transfer destination telephone number information has been set by the transfer monitoring control unit 28 as described above, the transfer control unit 27 transfers the transfer destination telephone number information automatically extracted by the transfer monitoring control unit 28 to the transfer destination control unit 23 and then the transfer destination control unit 23 is started (from YES route of step C9 to step C17).

Then, the transfer destination control unit 23 performs such operations as resetting of the transfer destination number request standby timer 28b, creation of line number data (transfer control management table 37: see FIG. 11), starting of the i=47 transfer regulation control unit 24 and starting of the transfer notification control unit 25 (see steps F1 to F14 of FIG. 22). Then, as shown in FIG. 16, the transfer notification control unit 25 sends a message of incoming call transfer to the transfer destination telephone terminal 12-i (step P9) and a message of "transfer succeeded" to the transfer control terminal 12-i (step P10).

In other words, the transfer destination control unit 23 creates transfer destination data based on a transfer destination registered beforehand in the transfer destination registration table 33 if no line number information is inputted from the transfer control terminal 12-i (if no transfer destination telephone number information is detected even when time out occurs in the timer 28b of the transfer monitoring control unit 28).

Also in this case, if a message of "transfer failed" is given to the transfer control terminal 12-i, the user (transfer controller) transmits a transfer failure avoidance control request to the switching system 11 within a specified time (before time out occurs in the transfer failure avoidance request standby timer 28c) (step P11) and thereby transfer failure avoidance control (see steps L1 to L19 of FIGS. 29 and 30) can be performed by the call controller 11b.

With the incoming call controller 3, since data for deciding a transfer destination for an incoming call to be transferred is automatically created mainly by the controller 3 based on transfer destination information registered beforehand in the transfer destination registration table 33 even if no transfer destination telephone number is inputted from the user, non-creation of transfer destination data caused by non-inputting of transfer destination telephone number information and thus the impossibility of performing transfer for an incoming call can be prevented. Accordingly, processing for creating transfer destination data can always be performed correctly.

Furthermore, the user can leave the decision of a transfer destination to the controller 3 depending on situations, for instance if a transfer destination for an incoming call cannot be determined quickly or if its specifying is troublesome. Accordingly, the degree of flexibility during a transfer operation can be greatly increased.

Also, since transfer destination data is created based on the transfer destination information of the transfer destination registration table 33 if no transfer destination telephone number information is detected within a specified time (before time out occurs in the timer 28b) after a request for inputting a transfer destination telephone number is made, a delay in the operation for creating transfer destination data for over a specified time after the inputting of the transfer destination telephone number is requested can be surely prevented. Accordingly, processing for creating transfer destination data (processing for deciding transfer destination) can always be performed quickly.

Figure 27:
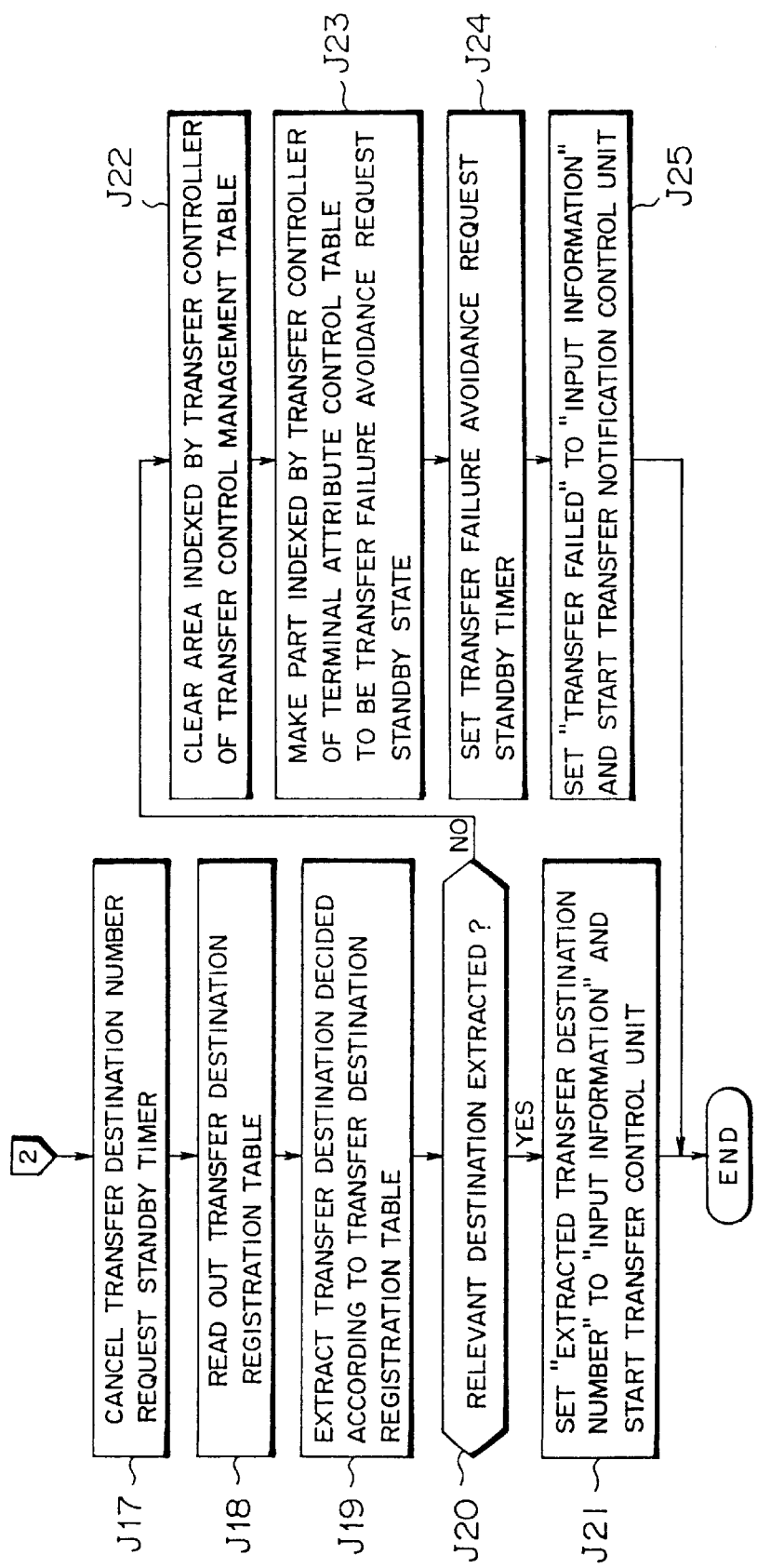

If the transfer monitoring control unit 28 cannot extract a transfer destination number correctly in step J20 of FIG. 27 (NO determination in step J20), the transfer monitoring control unit 28 then clears all information registered in the relevant area of the transfer control management table 37 (step J22) and changes the relevant area of the terminal attribute management table 32 to a "transfer failure avoidance request standby state (logical value 3)" (step J23). Then, the transfer failure avoidance request standby timer 28c of the transfer monitoring control unit 28 is started (step J24), "transfer failed" is set as information inputted to the transfer notification control unit 25 and the transfer notification control unit 25 is started (step J25). From the transfer notification control unit 25, a message of "transfer failed" is sent to the transfer control terminal 12-i.

(b-2-4) Neither transfer line number information nor transfer destination telephone number information is inputted Next, an operation performed when after a notice for promoting the input of transfer line number information is given to the transfer control terminal 12-i as described above with reference to step B4 of FIG. 14, the transfer line number information is not inputted from the transfer control terminal 12-i within a specified time and also when after a notice for promoting the input of transfer destination telephone number information is given to the transfer control terminal 12-i as described above with reference to step B7 of FIG. 14, the transfer destination telephone number information is not inputted from the transfer control terminal 12-i within a specified time will be described in detail.

Figure 17:
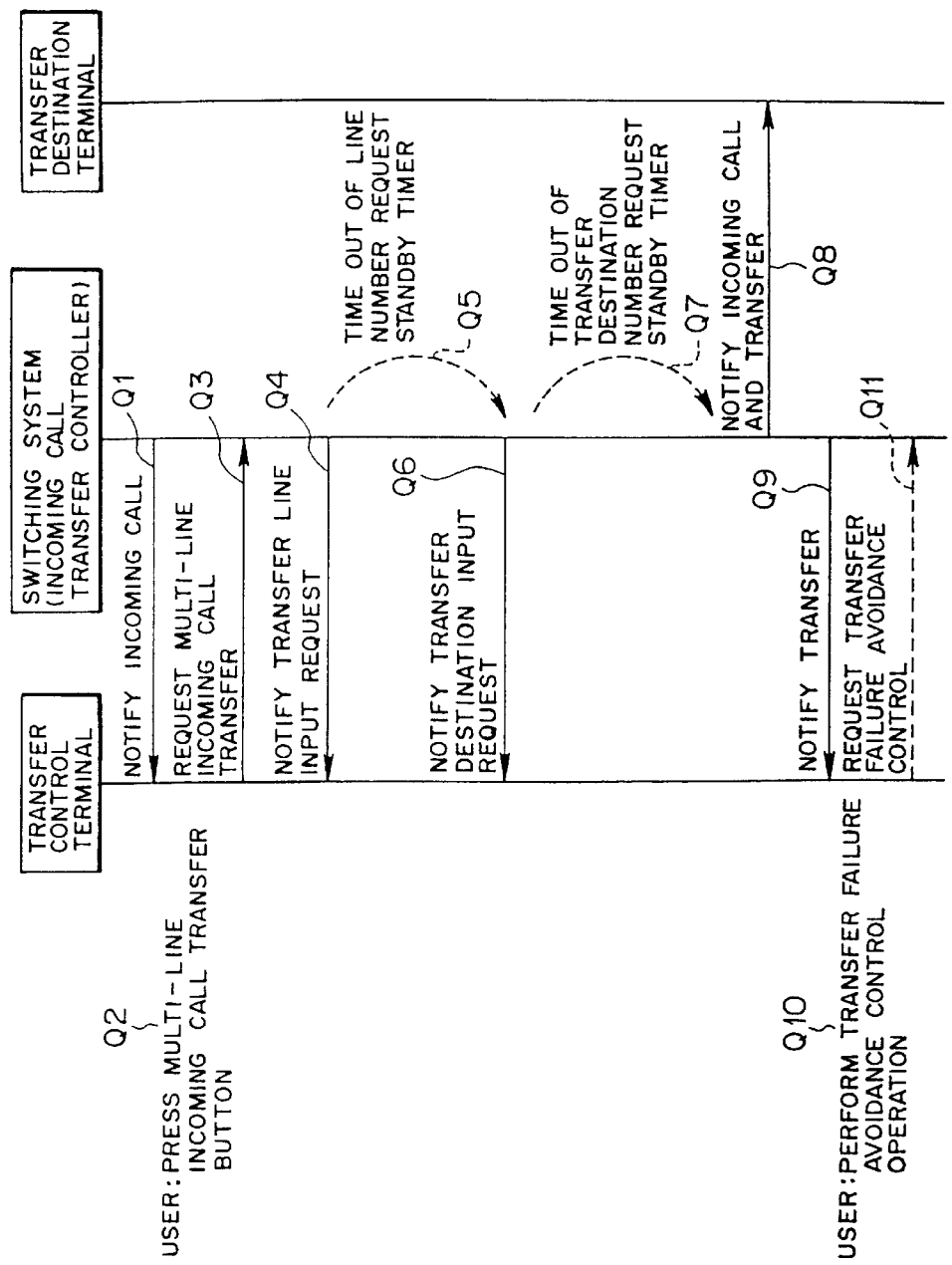

First, as shown in FIG. 17, a call comes into a certain line number of a given telephone set 12-i from the switching system 11 (call controller 11b) (step Q1). Then, in the telephone set 12-i, a ring tone is sounded, the display lamp 124-i corresponding to the line number of the incoming call is turned ON-and-OFF, information regarding the originator of the call (caller telephone number, and so on) is displayed on the displaying unit 123 and thereby the incoming call is notified to the user.

In this condition, if the user performs non-response transfer operation by pressing the transfer service button 126 (step Q2), a transfer start request (multi-line incoming call transfer request) is transmitted from the telephone set (transfer control terminal) 12-i to the switching system 11 (call controller 11b) (step Q3).

This transfer start request is received by the transfer control unit 27. The transfer control unit 27 then starts the transfer start control unit 21 (from YES route of step C2 of FIG. 19 to step C10 and from YES route of step C10 to step C11). Then, the transfer start control unit 21 performs such operations as changing of the STATUS of the terminal attribute control table 36 and starting of the timer 28a and the transfer notification control unit 25 (see steps D1 to D4 of FIG. 20). From the transfer notification control unit 25, a line number input request notice is outputted to the transfer control terminal 12-i [(step Q4): see from YES route of step H1 of FIG. 24 to step H5].

Then, in the transfer control terminal 12-i, a message of "select (input) line number" or the like is displayed on the displaying unit 123. In this condition, if the user does not press the line number button 124-i within a specified time for one reason or another, in the call controller 11b, time out occurs in the line number request standby timer 28a of the transfer monitoring control unit 28 (step Q5).

Then, the transfer monitoring control unit 28 resets the timer 28a, refers to the indexes of the transfer line condition registration table 34 and the transfer line control table 32 and reads each registered information (steps J8 and J9). The control unit 28 automatically extracts (decides) transfer line number information based on the read information (condition), sets the transfer line number information as information inputted to the transfer control unit 27 and then starts the transfer control unit 27 (see step J7 to J12 of FIG. 26).

Then, the transfer control unit 27 transfers the transfer line number information automatically extracted by the transfer monitoring control unit 28 to the transfer line control unit 22 and starts the control unit 22. The transfer line control unit 22 then performs such operations as creating of line number data (transfer control management table 37: see FIG. 11) and starting of the transfer destination number request standby timer 28b and the transfer notification control unit 25 (see steps E1 to E10 of FIG. 21). Thereby, as shown in FIG. 15, a transfer destination input request notice for promoting the input of a transfer destination telephone number is outputted from the transfer notification control unit 25 to the transfer control terminal 12-i (step Q6).

Then, in the transfer control terminal 12-i, a message of "input transfer destination telephone number" or the like is displayed on the displaying unit 123. In this condition, if the user does not dial the transfer destination telephone number within a specified time for one reason or another, in the call controller 11b, time out occurs in the transfer destination number request timer 28b of the transfer monitoring control unit 28 (step Q7).

Then, the transfer monitoring control unit 28 performs such operations as resetting of the timer 28b and deciding (extracting) of a transfer destination based on the transfer destination registration table 33. The control unit 28 then sets the transfer destination telephone number information as information inputted to the transfer control unit 27 and starts the transfer control unit 27 (see steps J17 to J21 of FIG. 27). Then, the transfer control unit 27 transfers the transfer destination telephone number information received from the transfer monitoring control unit 28 to the transfer destination control unit 23 and starts the control unit 23 (from YES route of step C9 of FIG. 19 to step C17).

The transfer destination control unit 23 performs such operations as resetting of the transfer destination number request standby timer 28b, creating of line number data (transfer control management table 37: see FIG. 11) and starting of the transfer regulation control unit 24 and then starts the transfer notification control unit 25 (see steps F1 to F14 of FIG. 22). Then, as shown in FIG. 17, the transfer notification control unit 25 gives a message of incoming call transfer to the transfer destination telephone terminal 12-i (step Q8) and then a message of "transfer succeeded" to the transfer control terminal 12-i (step Q9).

Also, in this case, if a message of "transfer failed" is given to the transfer control terminal 12-i, the user (transfer controller) transmits a transfer failure avoidance control request to the switching system 11 within a specified time (before time-out occurs in the transfer failure avoidance request standby timer 28c) (step P11) and thereby transfer failure avoidance control (see steps L1 to L19 of FIGS. 29 and 30) can be performed by the call controller 11b.

With the incoming call transfer controller 3, even if neither transfer line information nor transfer destination telephone number information is inputted from the user, since data for deciding a transfer line number and transfer destination for an incoming call to be transferred is automatically created mainly by the controller 3 based on the selection condition registered beforehand in the transfer line condition registration table 34 and the transfer destination information registered beforehand in the transfer destination registration table 33, non-creation of line number data and transfer destination data caused by the non-inputting of the information and thus the impossibility of transferring an incoming call can be prevented. Accordingly, processing for creating each of the data can always be performed correctly.

In other words, the controller 3 automatically decides a transfer line number and a transfer destination upon receiving a multi-line incoming call transfer request from the user and thereby performs transfer control. Accordingly, the user can leave the decision of a transfer line number and a transfer destination to the controller 3 depending on situations, for instance if which line number of an incoming call should be selected for transfer and which destination the call should be transferred cannot be determined quickly or if specifying of a transfer line number and a transfer destination is troublesome. Therefore, the degree of flexibility during a transfer operation can be greatly increased.

With the incoming call transfer controller 3, since transfer control data (including line number data and transfer destination data) is dynamically created for each line number of the telephone terminal 12-i and transfer control is performed based on the transfer control data (transfer processing is executed by deciding a line number and a transfer destination for an incoming call to be transferred), even if calls simultaneously come into the plurality of line numbers of a certain telephone terminal 12-i, the user can quickly transfer each of the incoming calls to another telephone terminal 12-i without making any response thereto. Accordingly, a delay in dealing with each incoming call can be controlled to a minimum and service quality, for instance in telephone reception business, can be greatly improved.

Furthermore, even if a new call comes into another line number while a certain line number is engaged (during communication), the user can transfer the new incoming call to another telephone terminal 12-i without placing the call incoming to the line number which has been dealt with on hold or canceling the communication (communication is continued). Also in this case, service quality, for instance in telephone reception business, can be greatly improved.

(b-3) Others

According to the above-described embodiment, transfer destination data is created after the creation of line number data. However, line number data may be created after the creation of transfer destination data. Also, according to the embodiment, a transfer destination telephone terminal is basically a multi-line telephone set 12-i. However, one of the telephone sets 14a to 14c of the public network (see FIG. 3) can be decided as a transfer destination.

Furthermore, according to the embodiment, each specified time is counted by one of the line number request standby timer 28a and the transfer destination number request standby timer 28b. However, if this specified time is set to, for instance "0" (alternatively, if the timers 28a and 28b are omitted and the transfer line number control unit 22 and the transfer destination control unit 23 are started without giving any of transfer line number input and transfer destination number input requests to the user), the user only needs to transmit a multi-line incoming call transfer request to the switching system 11 so that a transfer line number and a transfer destination for an incoming call may be decided completely automatically and then transfer processing is executed.

Specifically, in this case, irrespective of the existence of transfer line number information or transfer destination telephone number information inputted from the user, the transfer line control unit 22 creates line number data based on the selection condition registered in the transfer line selection condition registration table 34 and the transfer destination data creating unit creates transfer destination data based on the transfer destination telephone number information registered beforehand in the transfer destination registration table 33.

Accordingly, since the user does not need to specify (input) a line number for specifying an incoming call to be transferred or transfer destination for the incoming call, a burden applied during a transfer operation can be greatly reduced. The above-described automatic creation may be performed for any one of line number data and transfer destination data.

According to the embodiment, as transfer control data, both line number data and transfer destination data are created. However, if it is not necessary to create any transfer destination data, for instance if the number of transfer destinations for an incoming call is set to only one beforehand, only line number data is created and thereby all incoming calls to the optional line numbers of a certain telephone set 12-i can be transferred to the telephone set.

Furthermore, according to the embodiment, both line number data and transfer destination data are created as transfer control data. In this case, it is only necessary to create data [specifically, data for enabling recognition of call management information 404 (see FIG. 38) used for managing a call to be transferred by referring to the indexes of the table (ETCM) 402 (see FIG. 36) and the table (TCM) 403 (see FIG. 37)] for at least realizing the above-described transfer control.

What is claimed is:

1. An incoming call transfer controller for performing control so as to transfer a call incoming to a telephone terminal to another telephone terminal without making any response by said former telephone terminal in a switching system which contains said telephone terminal capable of dealing with a plurality of line numbers, said incoming call transfer controller comprising:

an incoming call non-response transfer request detecting unit for detecting an incoming call non-response transfer request transmitted from said telephone terminal by a specified non-response transfer operation performed on that telephone terminal;

a line number data creating unit for creating line number data regarding an incoming call to be transferred for each line number of said telephone terminal as a transfer control terminal on which said non-response transfer operation was performed when said incoming call non-response transfer request is detected by said incoming call non-response transfer request detectinglunit;

a transfer destination data creating unit for creating transfer destination data regarding said incoming call for each line number of said transfer control terminal when said incoming call non-response transfer request is detected by said incoming call non-response transfer request detecting unit; and a transfer execution control unit for deciding a line number for said incoming call to be transferred and a transfer destination telephone terminal for a call incoming to said line number based on said line number data created by said line number data creating unit and said transfer destination data created by said transfer destination data creating unit and transferring said incoming call to said transfer destination telephone terminal.

2. An incoming call transfer controller as claimed in claim 1, wherein said line number data creating unit creates said line number data based on line number information inputted from said transfer control terminal.

3. An incoming call transfer controller as claimed in claim 2, wherein said line number data creating unit includes a line number input requesting unit for requesting said transfer control terminal to input line number information and a line number detecting unit for detecting said line number information inputted in response to a line number input request made by said line number input requesting unit, and creates said line number data based on said line number information detected by said line number detecting unit.

4. An incoming call transfer controller as claimed in claim 2, wherein said line number data creating unit includes a transfer line selection condition registering unit for registering a line number selection condition for an incoming call to be transferred for said telephone terminal beforehand, and creates said line number data based on said selection condition registered in said transfer line selection condition registering unit if none of said line number information is inputted from said transfer control terminal.

5. An incoming call transfer controller as claimed in claim 4, wherein said line number data creating unit includes a transfer line selection condition registering unit for registering a line number selection condition for an incoming call to be transferred for said telephone terminal beforehand, a line number input requesting unit for requesting said transfer control terminal to input line number information, a line number detecting unit for detecting said line number information inputted in response to a line number input request made by said line number input requesting unit and a line number input monitoring unit for monitoring detection of said line number information by said line number detecting unit within a specified time after said line number input request is made by said line number input requesting unit, and creates said line number data based on said selection condition registered in said transfer line selection condition registering unit if said line number detecting unit fails to detect line number information within said specified time.

6. An incoming call transfer controller as claimed in claim 1, wherein said transfer destination data creating unit creates said transfer destination data based on telephone number information inputted from said transfer control terminal.

7. An incoming call transfer controller as claimed in claim 6, wherein said transfer destination data creating unit includes a telephone number input requesting unit for requesting said transfer control terminal to input telephone number information and a telephone number detecting unit for detecting said telephone number information inputted in response to an input request made by said telephone number input request, and creates said transfer destination data based on said telephone number information detected by said telephone number detecting unit.

8. An incoming call transfer controller as claimed in claim 6, wherein said transfer destination data creating unit includes a transfer destination telephone number registering unit for registering transfer destination telephone number information for said line number of said telephone terminal beforehand, and creates said transfer destination data based on said transfer destination telephone number information registered in said transfer destination telephone number registering unit if none of said telephone number information is inputted from said transfer control terminal.

9. An incoming call transfer controller as claimed in claim 8, wherein said transfer destination data creating unit includes a transfer destination telephone number registering unit for registering transfer destination telephone number information for said line number of said telephone terminal beforehand, a telephone number input requesting unit for requesting said transfer control terminal to input telephone number information, a telephone number detecting unit for detecting said telephone number information inputted in response to an input request made by said telephone number input requesting unit and a telephone number input monitoring unit for monitoring detection of said telephone number information by said telephone number detecting unit within a specified time after said telephone number input request is made by said telephone number input requesting unit, and creates said transfer destination data based on said transfer destination telephone number information registered in said transfer destination telephone number registering unit if said telephone number detecting unit fails to detect said telephone number information within said specified time.

10. An incoming call transfer controller as claimed in claim 1, wherein said line number data creating unit includes a transfer line selection condition registering unit for registering a line number selection condition for an incoming call to be transferred for said telephone terminal beforehand, and creates said line number data based on said selection condition registered in said transfer line selection condition registering unit.

11. An incoming call transfer controller as claimed in claim 1, wherein said transfer destination data creating unit includes a transfer destination telephone number registering unit for registering transfer destination telephone number information for said line number of said telephone terminal beforehand, and creates said transfer destination data based on said transfer destination telephone number information registered in said transfer destination telephone number registering unit.

12. An incoming call transfer controller as claimed in claim 1, wherein said transfer execution control unit includes a transfer result notifying unit for notifying said transfer control terminal of a result of transfer-control of said incoming call to said transfer destination telephone terminal.

13. An incoming call transfer controller as clamed in claim 1, wherein said transfer execution control unit includes a transfer termination control unit for stopping transfer control when a transfer stop request is received from said transfer control terminal during said transfer control for said incoming call to said transfer destination telephone terminal.

14. An incoming call transfer controller as claimed in claim 1, wherein said transfer execution control unit includes a re-transfer control unit for performing re-transfer control for said incoming call based on line number data re-created by said line number data creating unit upon receiving a re-transfer control request from said transfer control unit when transfer control fails for said incoming call.

15. An incoming call transfer controller as claimed in claim 14, wherein said line number data creating unit includes a transfer line selection condition registering unit for registering a line number selection condition for an incoming call to be transferred for each telephone terminal beforehand, and re-creates said line number data based on said selection condition registered in said transfer line selection condition registering unit.

16. An incoming call transfer controller as claimed in claim 14, wherein said line number data creating unit re-creates said line number data based on transfer line number information re-inputted from said transfer control terminal.

17. An incoming call transfer controller as claimed in claim 14, wherein said re-transfer control unit is prevented from performing said re-transfer control if none of said re-transfer control request is inputted from said transfer control terminal within a specified time.

18. An incoming call transfer controller as claimed in claim 1, wherein said transfer execution control unit includes a re-transfer control unit for performing re-transfer control for said incoming call based on transfer destination data re-created by said transfer destination data creating unit upon receiving a re-transfer control request from said transfer control terminal when transfer control fails for said incoming call.

19. An incoming call transfer controller as claimed in claim 18, wherein said transfer destination data creating unit includes a failure time transfer destination telephone number registering unit for registering transfer destination telephone number information used when a failure occurs in transfer for each line number of said telephone terminal beforehand, and re-creates said transfer destination data based on said failure time transfer destination telephone number information registered in said failure time transfer destination telephone number registering unit.

20. An incoming call transfer controller as claimed in claim 18, wherein said transfer destination data creating unit re-creates said transfer destination data based on transfer destination telephone number information re-inputted from said transfer control terminal.

21. An incoming call transfer controller as claimed in claim 18, wherein said re-transfer control unit is prevented from performing said re-transfer control if none of said re-transfer control request is inputted from said transfer control terminal within a specified time.

22. An incoming call transfer controller as claimed in claim 1, wherein said transfer execution control unit includes a level registering unit for registering a transfer permissible level for said telephone terminal and a transfer regulating unit for regulating a transfer control of said incoming call to said transfer destination telephone terminal according to said transfer permissible level registered in said level registering unit.

23. An incoming call transfer controller as claimed in claim 22, wherein said transfer regulating unit compares a transmission terminal side transfer permissible level registered for a telephone terminal of an originator of said incoming call with a control terminal side transfer permissible level registered for said transfer control terminal by referring to said level registering unit and performs transfer control for said incoming call only when said control terminal side transfer permissible level is higher than said transmission terminal side transfer permissible level.

24. An incoming call transfer controller as claimed in claim 22, wherein said transfer regulating unit compares a control terminal side transfer permissible level registered for said transfer control terminal with a transfer destination terminal side transfer permissible level registered for said transfer destination telephone terminal by referring to said level registering unit and performs transfer control for said incoming call only when said control terminal side transfer permissible level is higher than said transfer destination terminal side transfer permissible level.

25. An incoming call transfer controller as claimed in claim 22, wherein said transfer regulating unit compares a transmission terminal side transfer permissible level registered for a telephone terminal of an originator of said incoming call with a transfer destination terminal side transfer permissible level registered for said transfer destination telephone terminal by referring to said level registering unit and performs transfer control for said incoming call only when said transmission terminal side transfer permissible level is higher than said transfer destination terminal side transfer permissible level.

26. An incoming call transfer controller for performing control so as to transfer a call incoming to a telephone terminal to another telephone terminal without making any response by said former telephone terminal in a switching system which contains said telephone terminal capable of dealing with a plurality of line numbers, said incoming call transfer controller comprising:

an incoming call non-response transfer request detecting unit for detecting an incoming call non-response transfer request transmitted from said telephone terminal by a specified non-response transfer operation performed on that telephone terminal; and a transfer execution control unit for creating line number data at least regarding an incoming call to be transferred for each line number of a transfer control terminal which performs a transfer operation when said incoming call non-response transfer request is detected by said incoming call non-response transfer request detecting unit, deciding a line number for said incoming call to be transferred based on said line number data and transferring a call incoming to said line number to a desired transfer destination telephone terminal.

27. An incoming call transfer controller for performing control so as to transfer a call incoming to a telephone terminal to another telephone terminal without making any response by said former telephone terminal in a switching system which contains said telephone terminal capable of dealing with a plurality of line numbers, said incoming call transfer controller comprising:

an incoming call non-response transfer request detecting unit for detecting an incoming call non-response transfer request transmitted from said telephone terminal by a specified non-response transfer operation performed on that telephone terminal; and a transfer execution control unit for creating transfer control data regarding said incoming call for each line number of said telephone terminal on which said transfer operation was performed when said incoming call non-response transfer request is detected by said incoming call non-response transfer request detecting unit and performing transfer control for said incoming call based on said transfer control data.

28. An incoming call transfer control method for performing control so as to transfer a call incoming to a telephone terminal to another telephone terminal without making any response by said former telephone terminal in a switching system which contains said telephone terminal capable of dealing with a plurality of line numbers, said incoming call transfer control method comprising the steps of:

detecting an incoming call non-response transfer request transmitted from said telephone terminal by a specified non-response transfer operation performed on that telephone terminal;

creating line number data and transfer destination data regarding an incoming call to be transferred for each line number of said telephone terminal on which said non-response transfer operation was performed when said incoming call non-response transfer request is detected in said detecting step;

deciding a line number and a transfer destination telephone terminal for said incoming call to be transferred based on said line number data and said transfer destination data; and transferring a call incoming to said line number to said transfer destination telephone terminal.

29. An incoming call transfer control method for performing control so as to transfer a call incoming to a telephone terminal to another telephone terminal without making any response by said former telephone terminal in a switching system which contains said telephone terminal capable of dealing with a plurality of line numbers, said incoming call transfer control method comprising the steps of:

detecting an incoming call non-response transfer request transmitted from said telephone terminal by a specified non-response transfer operation performed on that telephone terminal;

creating line number data at least regarding an incoming call to be transferred for each line number of said telephone terminal on which said non-response transfer operation was performed when said incoming call non-response transfer request is detected in said detecting step;

deciding a line number for said incoming call to be transferred based on said line number data; and transferring a call incoming to said line number to a desired transfer destination telephone terminal.

30. An incoming call transfer control method for performing control so as to transfer a call incoming to a telephone terminal to another telephone terminal without making any response by said former telephone terminal in a switching system which contains said telephone terminal capable of dealing with a plurality of line numbers, said incoming call transfer control method comprising the steps of:

detecting an incoming call non-response transfer request transmitted from said telephone terminal by a specified non-response transfer operation performed on that telephone terminal;

creating transfer control data regarding an incoming call for each line number of said telephone terminal on which said non-response transfer operation was performed when said incoming call non-response transfer request is detected in said detecting step; and executing transfer control for said incoming call based on said transfer control data.

* * * * *